United States Patent
Iwata et al.

[11] Patent Number: 6,012,797
[45] Date of Patent: Jan. 11, 2000

[54] METHOD FOR DRIVING AN INK JET RECORDING HEAD HAVING IMPROVED DISCHARGE STABILITY AND RECORDING APPARATUS HAVING THE SAME

[75] Inventors: Kazuya Iwata; Yoshiyuki Shimamura; Seiji Takahashi, all of Yokohama; Yasushi Koike, Tokyo, all of Japan

[73] Assignee: Canon Kabushiki Kaisha, Tokyo, Japan

[21] Appl. No.: 08/254,437

[22] Filed: Jun. 6, 1994

Related U.S. Application Data

[63] Continuation of application No. 07/859,322, Mar. 27, 1992, abandoned.

[30] Foreign Application Priority Data

| Mar. 29, 1991 | [JP] | Japan | 3-066754 |
| Oct. 18, 1991 | [JP] | Japan | 3-271032 |
| Mar. 6, 1992 | [JP] | Japan | 4-049736 |

[51] Int. Cl.⁷ .................................................... B41J 2/145
[52] U.S. Cl. ................................... 347/41; 347/9; 347/12
[58] Field of Search ................................ 347/12, 14, 40, 347/41, 9, 15, 37

[56] References Cited

U.S. PATENT DOCUMENTS

| 4,232,324 | 11/1980 | Tsao | 347/41 |
| 4,300,144 | 11/1981 | Isayama et al. | 347/12 |
| 4,313,124 | 1/1982 | Hara | 347/57 |
| 4,345,262 | 8/1982 | Shirato et al. | 347/10 |
| 4,346,393 | 8/1982 | Wallace et al. | 347/41 |
| 4,395,720 | 7/1983 | Grover et al. | 347/12 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,593,295 | 6/1986 | Matsufuji et al. | 347/41 |
| 4,630,076 | 12/1986 | Yoshimura | 347/9 |
| 4,630,946 | 12/1986 | Mizutari et al. | 400/121 |
| 4,723,129 | 2/1988 | Endo et al. | 347/56 |
| 4,740,796 | 4/1988 | Endo et al. | 347/56 |

(List continued on next page.)

FOREIGN PATENT DOCUMENTS

| 54-56847 | 5/1979 | Japan . |
| 55-34906 | 3/1980 | Japan . |
| 55-109672 | 8/1980 | Japan . |
| 57-2771 | 1/1982 | Japan . |
| 215351 | 12/1983 | Japan | 347/41 |
| 59-123670 | 7/1984 | Japan . |
| 59-138461 | 8/1984 | Japan . |
| 0046663 | 3/1985 | Japan | 346/76 PH |
| 60-71260 | 4/1985 | Japan . |
| 0202468 | 8/1988 | Japan | 346/76 PH |
| 59349 | 2/1990 | Japan | 347/12 |
| 2-81954 | 11/1990 | Japan | 347/12 |

*Primary Examiner*—N. Le
*Assistant Examiner*—Craig A. Hallacher
*Attorney, Agent, or Firm*—Fitzpatrick, Cella, Harper & Scinto

[57] ABSTRACT

An ink jet recording apparatus records using a recording head. The head comprises a plurality of discharge ports for discharging ink, a common liquid chamber for supplying ink to the plurality of discharge ports, and a plurality of discharge elements for causing ink to be discharged from the plurality of discharge ports. The apparatus further comprises driving elements for substantially simultaneously driving said discharge elements corresponding to a first plurality of discharge ports which are not adjacent to each other, among said plurality of discharge ports, and for driving said discharge elements corresponding to a second plurality of discharge ports which are respectively adjacent to said first plurality of discharge ports, not simultaneously with said discharge elements corresponding to said first plurality of discharge ports, but at predetermined intervals within a drive period.

55 Claims, 47 Drawing Sheets

U.S. PATENT DOCUMENTS

| | | | |
|---|---|---|---|
| 4,748,453 | 5/1988 | Lin et al. | 347/41 |
| 4,809,016 | 2/1989 | Padalino | 347/41 |
| 4,920,355 | 4/1990 | Kalerberg | 347/41 |
| 4,967,203 | 10/1990 | Doan et al. | 347/41 |
| 4,972,270 | 11/1990 | Kurtin et al. | |
| 4,978,971 | 12/1990 | Goetz et al. | 347/41 |
| 4,999,646 | 3/1991 | Trask | 347/41 |
| 5,070,345 | 12/1991 | Lahut et al. | 347/41 |
| 5,121,142 | 6/1992 | Iwazawa et al. | 347/41 |
| 5,237,344 | 8/1993 | Tasaki et al. | 347/9 |
| 5,353,051 | 10/1994 | Katayama et al. | 347/14 |

FIG. 7
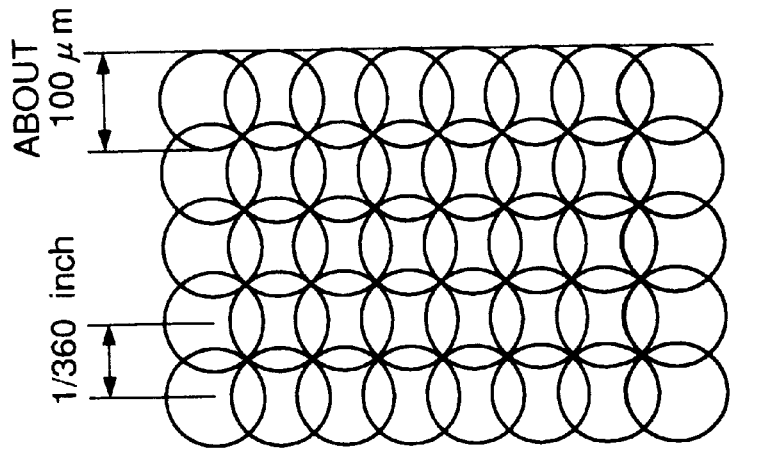
(b)
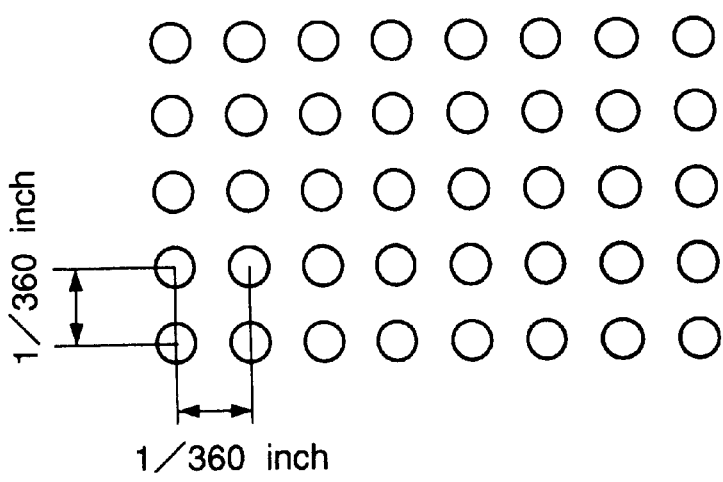
(a)

FIG. 11
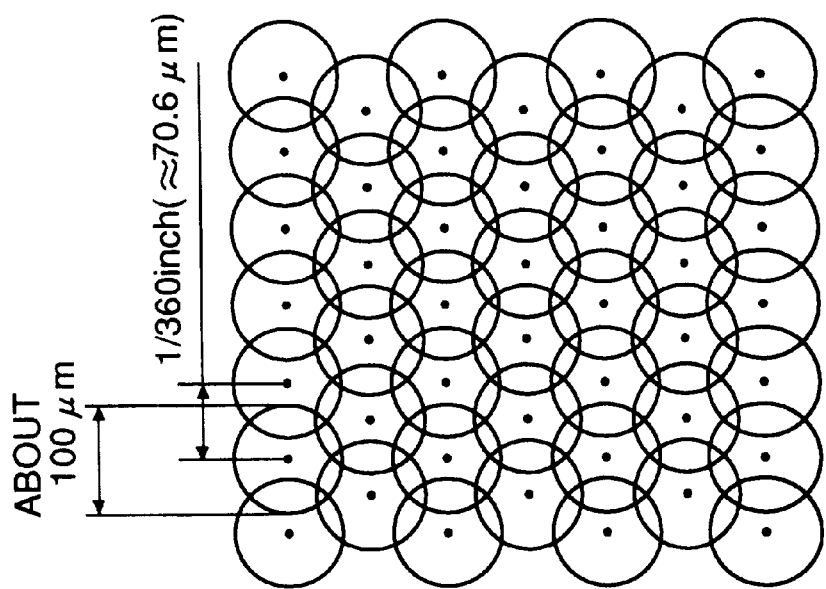
(b)
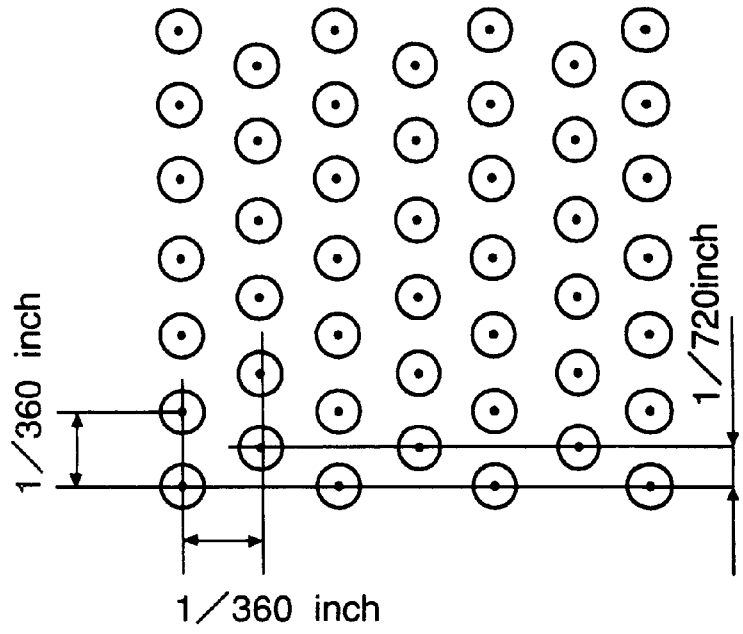
(a)

F I G. 21
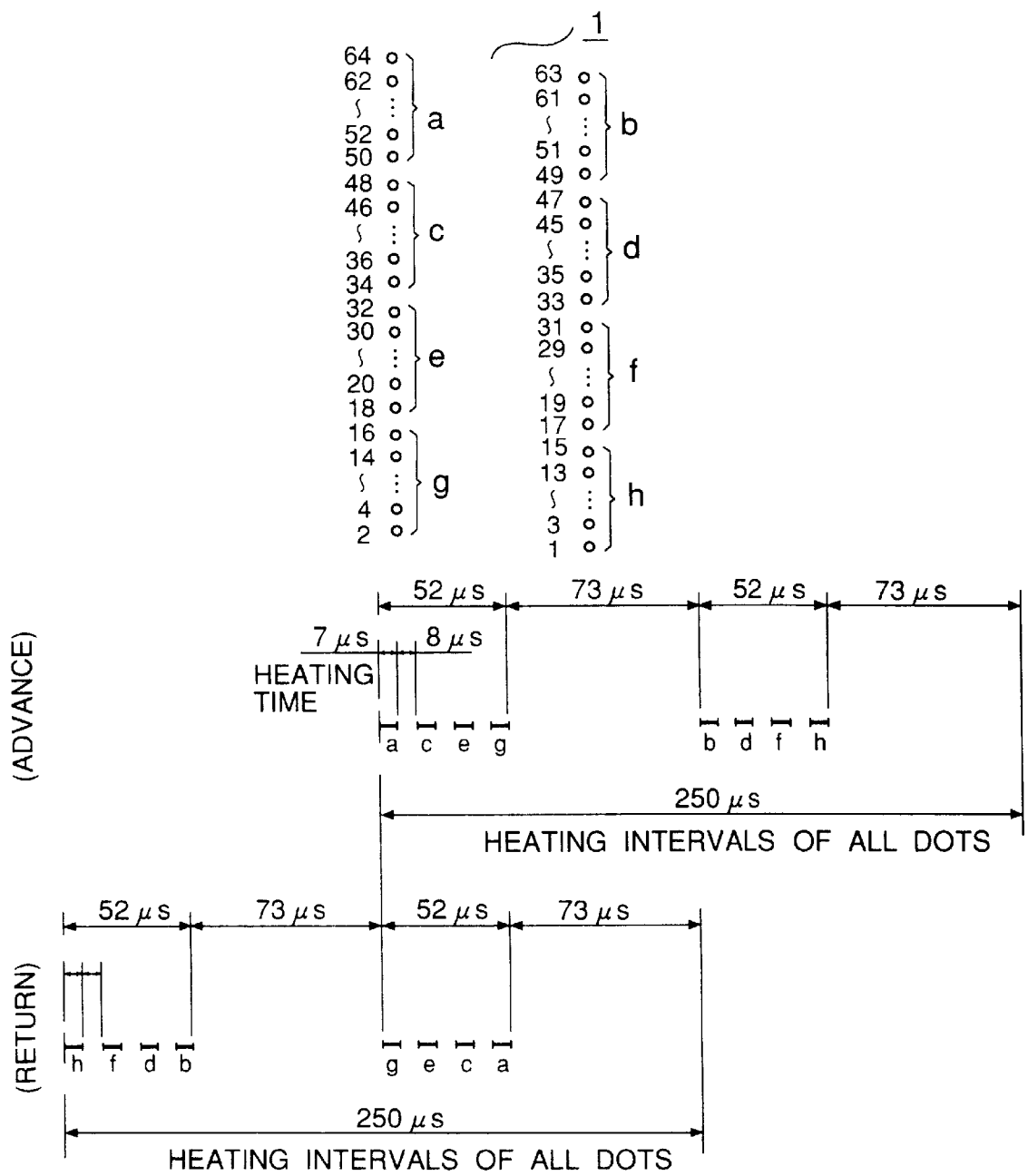

FIG. 36
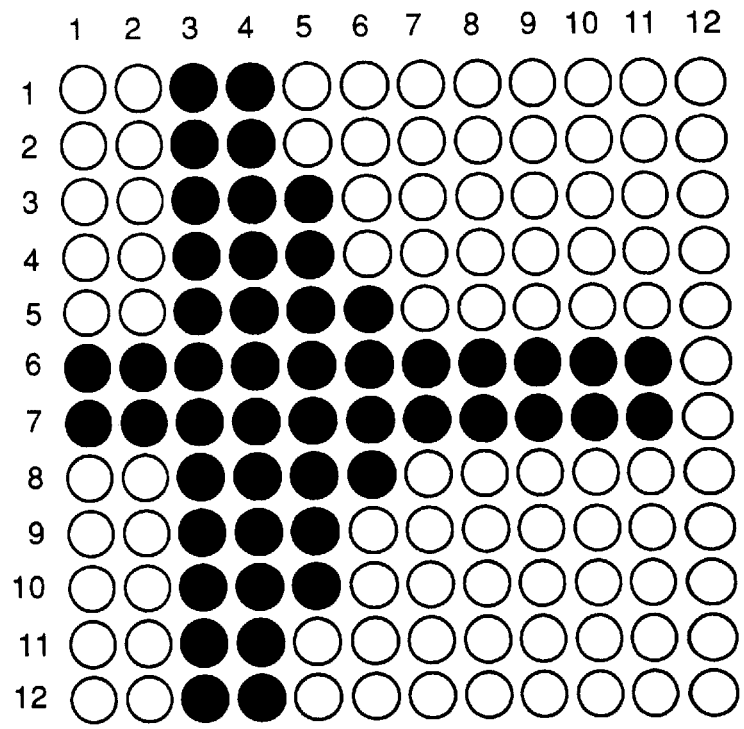
(a)
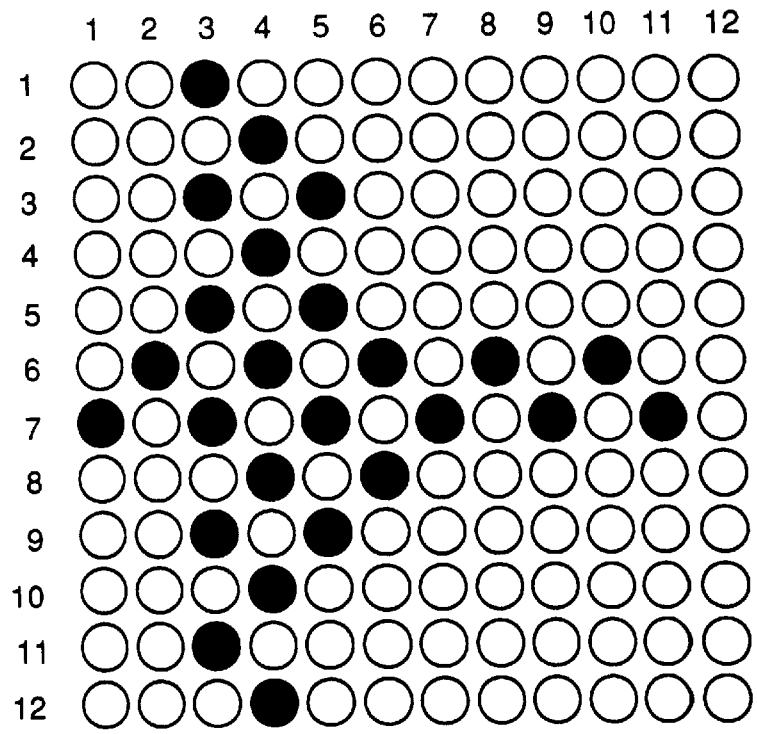
(b)

F I G. 38
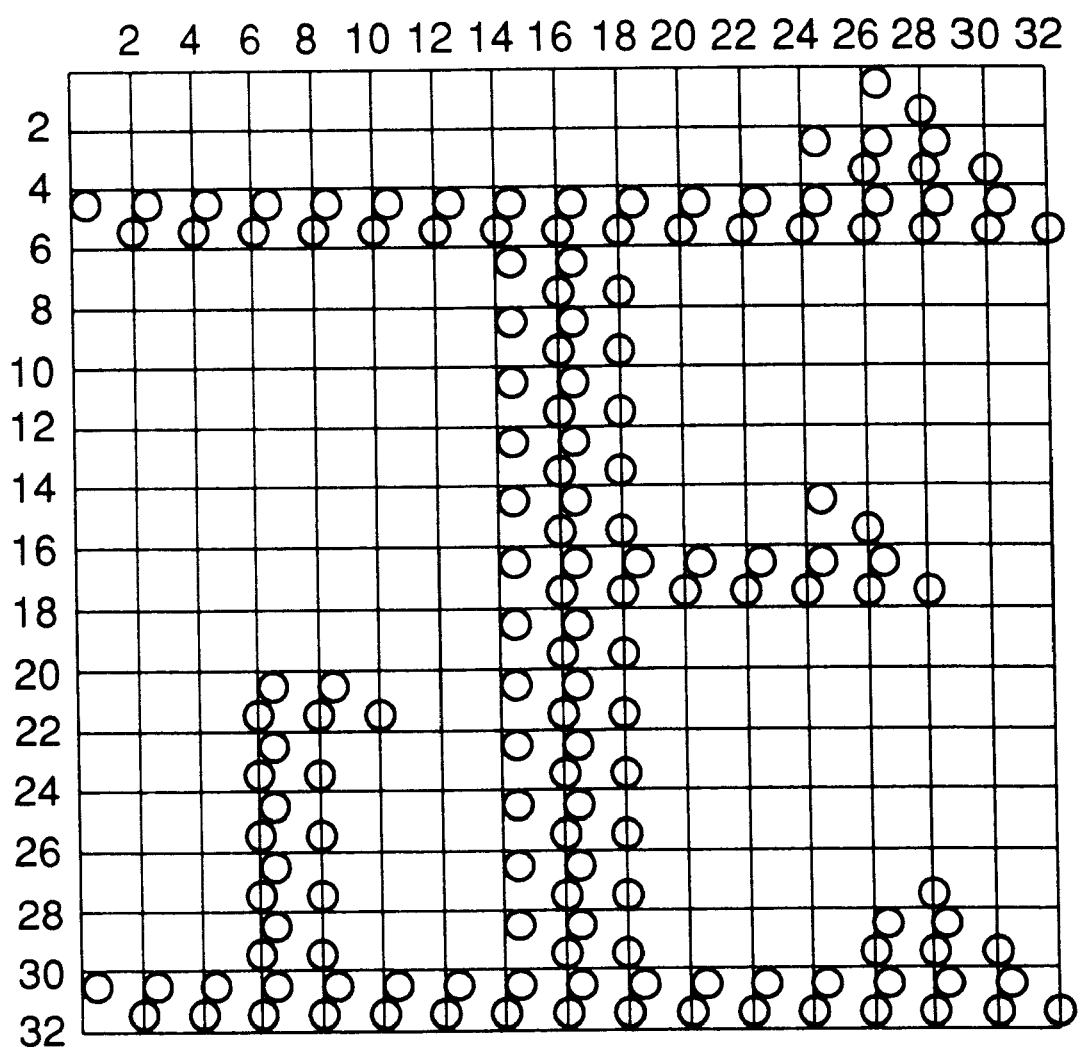

METHOD FOR DRIVING AN INK JET RECORDING HEAD HAVING IMPROVED DISCHARGE STABILITY AND RECORDING APPARATUS HAVING THE SAME

This application is a continuation of application Ser. No. 07/859,322 filed Mar. 27, 1992, now abandoned.

BACKGROUND OF THE INVENTION

1. Field of the Invention

The present invention relates generally to methods of driving ink jet recording heads fit for use in general business machines such as printers, facsimile machines, ink jet recording apparatus and the like, and more particularly to a method of driving a recording head that has an ink tank as an integrated part, or most suitably that is removable from a recording apparatus itself.

2. Background Art

A thermal energy recording system which utilizes film boiling in conventional ink jet recording heads and apparatus is superior to what utilizes piezoelectric elements and has been put in practical use as superior to thermal energy recording using optical energy.

It is also well known that a recording head has a specific range of driving frequencies provided the recording head is configured as prescribed and that recording will be accomplished without any problem if driving conditions in that range are given.

Although such a recording head satisfies predetermined response characteristics, there may arise a case where the recording has to be made under the condition beyond its characteristics. Moreover, some of the recording characteristics are seen to deteriorate when those which ought to be stable are affected unfavorably. FIGS. 2 and 3 illustrate the problems addressed by the present invention. Arrows in these drawings designate the relative direction in which the recording head and recording paper move. As illustrated, the recording head has 32 discharge ports in the vertical direction, showing partitions of characters formed with a 32×32matrix. Numeral 6 in FIG. 2 shows a part in which a recording line is formed with substantially two liquid droplets (equivalent to a minimum recording unit). The part 6 normally poses no problem when a character is formed. However, the printing density in this part of an image tends to become slightly thin or blurred in comparison to the remaining part.

In the case of rotary printing for use in word processors, on the other hand, the number of parts to be formed by two droplets with respect to the relative direction of movement shown by the arrow is seen to increase greatly as shown in FIG. 3. Although the problem posed in reference to FIG. 3 is not always common to all recording parts formed with substantially two droplets (a minimum recording unit), relatively many density-reduced parts 17 equivalent in position to the 23rd and 32nd discharge ports are produced even with a similar recording head. When no problem is associated with the part 17, a slight reduction in density may be observed in a part 16 equivalent to the first to fourth discharge ports on some occasions.

Moreover when about two droplets (a minimum recording unit) concentrate on the boundary region between the character partitions, an adjoining character-forming partition is infected with a small amount of droplet which may lower the whole image quality. High-density character formation at relatively high speed may sometimes cause the number of density-reduced parts to gradually increase and a serious problem may consequently be induced with the parts ignorable from the initial general image quality as a trigger.

In the case of a recording head which has incorporated an ink tank into a head portion and is removable from the recording apparatus(i.e. replaceable therefrom), a serious problem still arises from the fact that a reduction in density precariously occurs when the suction pressure of a sponge fluctuates as natural force deriving from capillarity is relied upon against the suction pressure of the sponge as an absorber in the ink tank. In order to solve this problem, an attempt may be made to lower the suction pressure of the sponge to eliminate the influence thereof; however, it still remains unpractical as leakage of ink from the ink tank is induced.

SUMMARY OF THE INVENTION

An object of the present invention made to solve the foregoing problems inherent in the related art described above is to provide a liquid jet recording head capable of preventing phenomena resulting from droplets formed in a state of disorder under the influence of the characteristics of the recording head or for some unknown reason and to provide a recording apparatus using the same.

Another object of the present invention is to provide a recording head capable of the solving the foregoing problems, irrespective of the construction of such a liquid jet recording head and the recording frequency, and a recording apparatus.

Still another object of the present invention is to provide a method of making substantially simultaneously derivable a plurality of discharge ports which are not adjacent to each other, out of the plurality of discharge ports of a recording head having a discharge means for causing ink to be discharged therefrom, and making substantially simultaneously derivable the adjacent discharge ports at predetermined intervals with a discharge drive period.

A further object of the present invention is to provide a liquid jet recording apparatus having a driving means for driving a plurality of thermal-energy generating elements for varying conditions including forming liquid bubbles and a control means for substantially simultaneously driving the plurality of thermal-energy generating elements which are not adjacent to each other, out of the plurality of them, and for driving the adjacent thermal-energy elements not simultaneously but at predetermined intervals within a discharge energy drive period during which the adjacent thermal energy elements are driven at minimum intervals. According to this invention, the recording is carried out under desired conditions without being affected by the recording head and the image thus obtained is excellent.

Under the driving method described above (hereinafter called 'shift printing'), the nozzle of the recording head is divided into two sections at one-dot intervals and discharge timing is shifted to make the conventional vertical-horizontal grid pattern an inclined grid pattern in printing. Further, force acting on the side opposite to the discharge port at the time of ink discharge is utilized to shorten the length of time required to resupply ink, which has heretofore posed a critical problem in raising the discharge frequency. This a stable satisfactory image is obtained.

A still further object of the present invention is to provide a liquid jet recording apparatus for obtaining a good recording image at high speed by applying shift printing to reciprocal printing.

An additional object of the present invention is to provide an ink jet recording apparatus capable of shift printing intended to prevent image quality deterioration of a vertical rule, when the characteristics of a recording head deteriorate, a resulting from difference in level at a joint where the recording pattern bridged over a plurality of lines and a difference in density at a joint resulting from the double impression of ink at the joint.

In order to accomplish the objects stated above, the ink jet recording apparatus combines a first driving means for making ordinary printing with a second driving means for making shift printing and employs the first driving means for recording when a desired recording pattern is bridged over a plurality of lines and the second driving means for recording when the pattern is not bridged over the plurality of lines, whereby when recording characteristics such as ink landing accuracy of the recording head deteriorate, good recording results are obtained without contrasting difference in level even in the recording pattern bridged over a plurality of lines.

The ink jet recording apparatus is further provided with a recording mode in which the first and second driving means are combined and another recording mode in which only the second driving means is used for performing the shift printing. The recording mode maybe user selectable, so that a difference in level at the joint is reduced by allowing the user to select the latter recording mode (shift printing) when the difference in level is contrasted by the deterioration of a recording image due to delay in ink refilling resulting from the is division of the ink droplet.

Moreover, the liquid jet recording apparatus according to the present invention provides high image quality while minimizing a difference in density between a superimposed part and the remaining image portion by thinning out the superimposed parts when the image bridged over a plurality of lines is recorded by shift printing.

Further, the liquid jet recording apparatus according to the present invention provides high image quality while reducing a difference in level in the recording image bridged over a plurality of lines and a difference in density with the remaining image portion by combining the method of selectively making recordings using the combination of the first and second driving means with the recording method implemented by thinning out the superimposed parts described above.

At any rate, the present invention is intended to accomplish not only the improvement of recording response efficiency but also the stabilization of image quality by ensuring that the liquid is quickly supplied to the liquid channels and the discharge ports.

The recording head according to the present invention is designed to ensure that recording with improved response efficiency is implemented. The present invention is not limited to the claims enumerated above but applicable to piezo-electric elements, optical energy, optomechanical conversion elements or optothermal conversion elements in addition to thermal-energy generating elements as liquid jet recording elements.

BRIEF DESCRIPTION OF THE DRAWINGS

FIGS. 7a and 7b are views illustrating a dot matrix in ordinary printing.

FIGS. 11a and 11b are views illustrating a dot matrix in shift printing recording data.

FIG. 21 is a view illustrating printing timing in reciprocal printing according to the present invention.

FIG. 36a and 36b are views illustrating dots to be thinned out.

FIG. 38 is d view illustrating a recording pattern in shift recording by thinned-out printing.

DETAILED DESCRIPTION OF THE PREFERRED EMBODIMENTS

Referring to the accompanying drawings, Embodiments of the present invention will subsequently be described.

Figure 4:
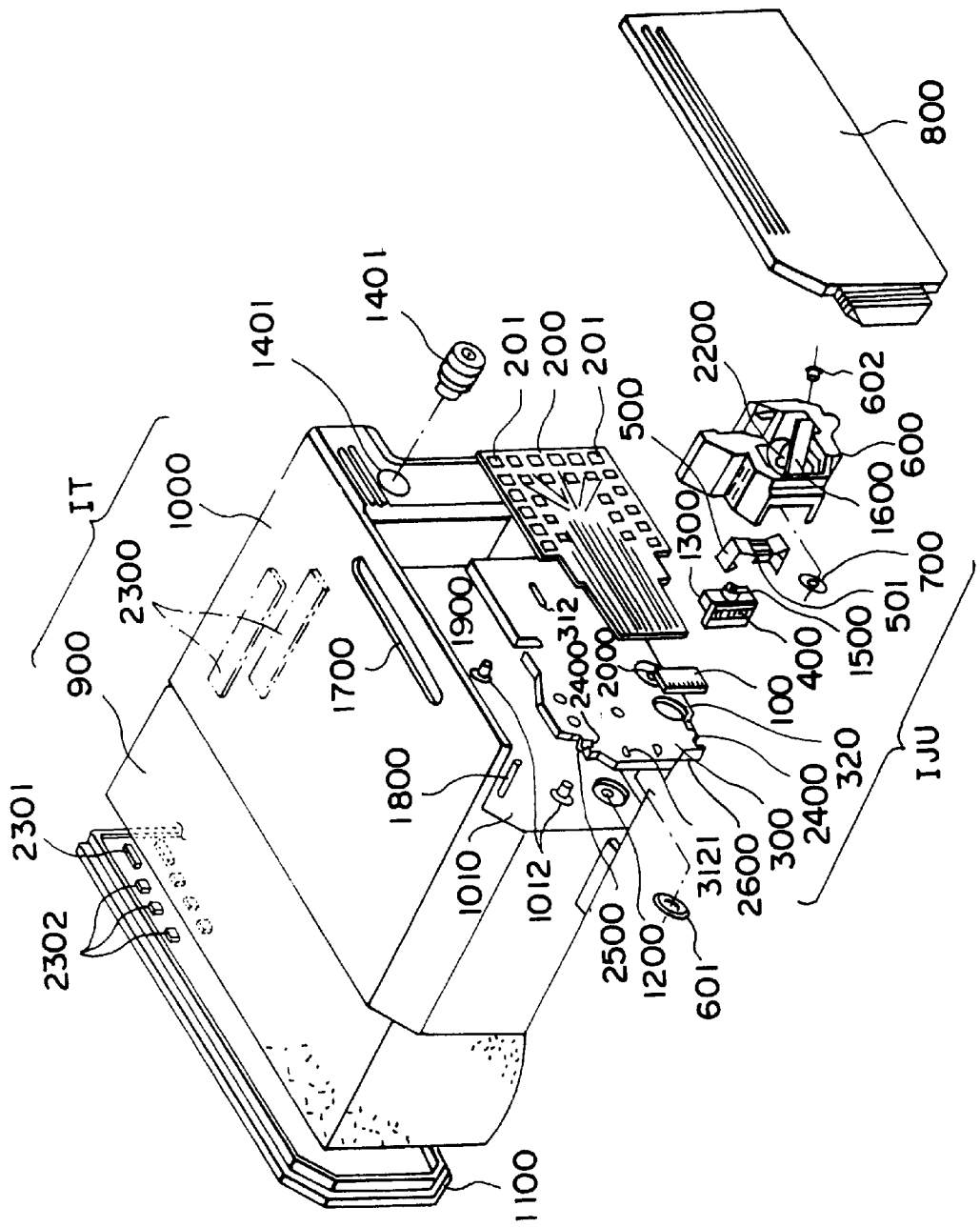
FIG. 4 is an exploded perspective view of an example of an ink jet cartridge according to the present invention.
Figure 5:
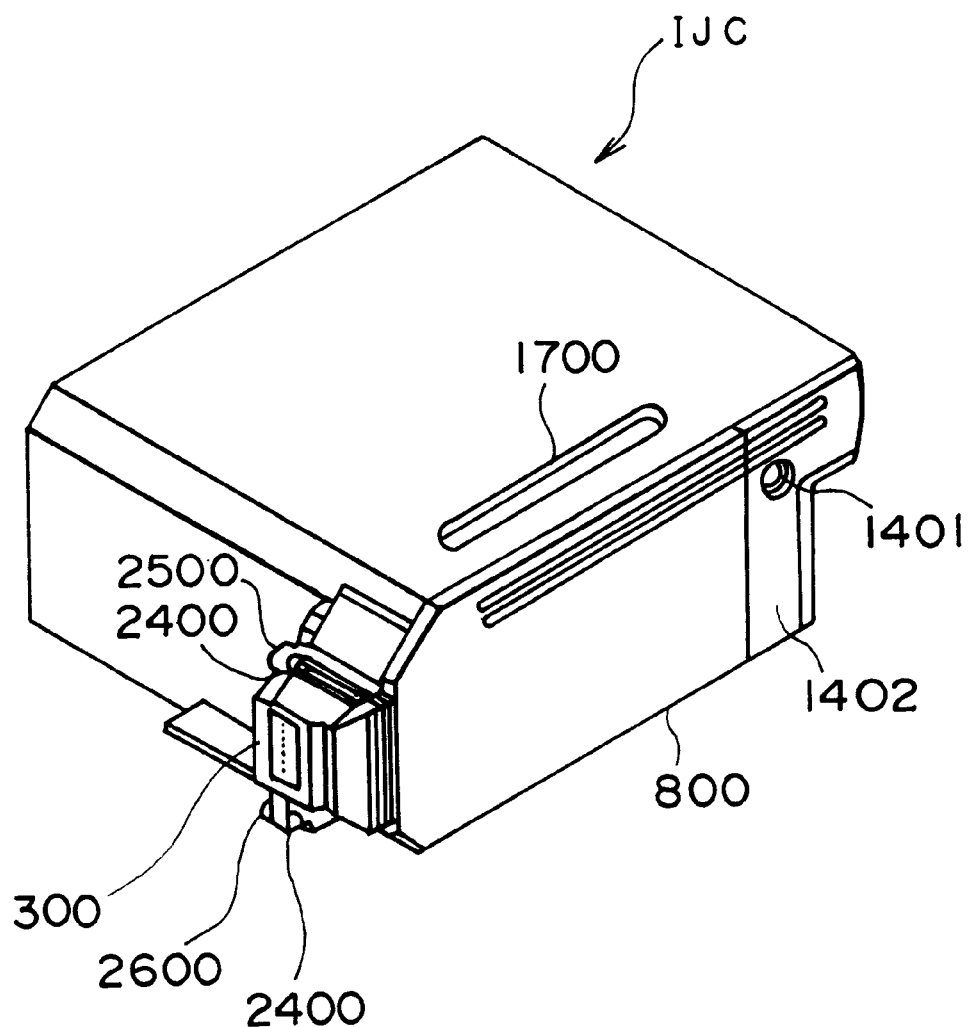
FIG. 5 is a schematic perspective view of an ink jet cartridge according to the present invention.
Figure 6:
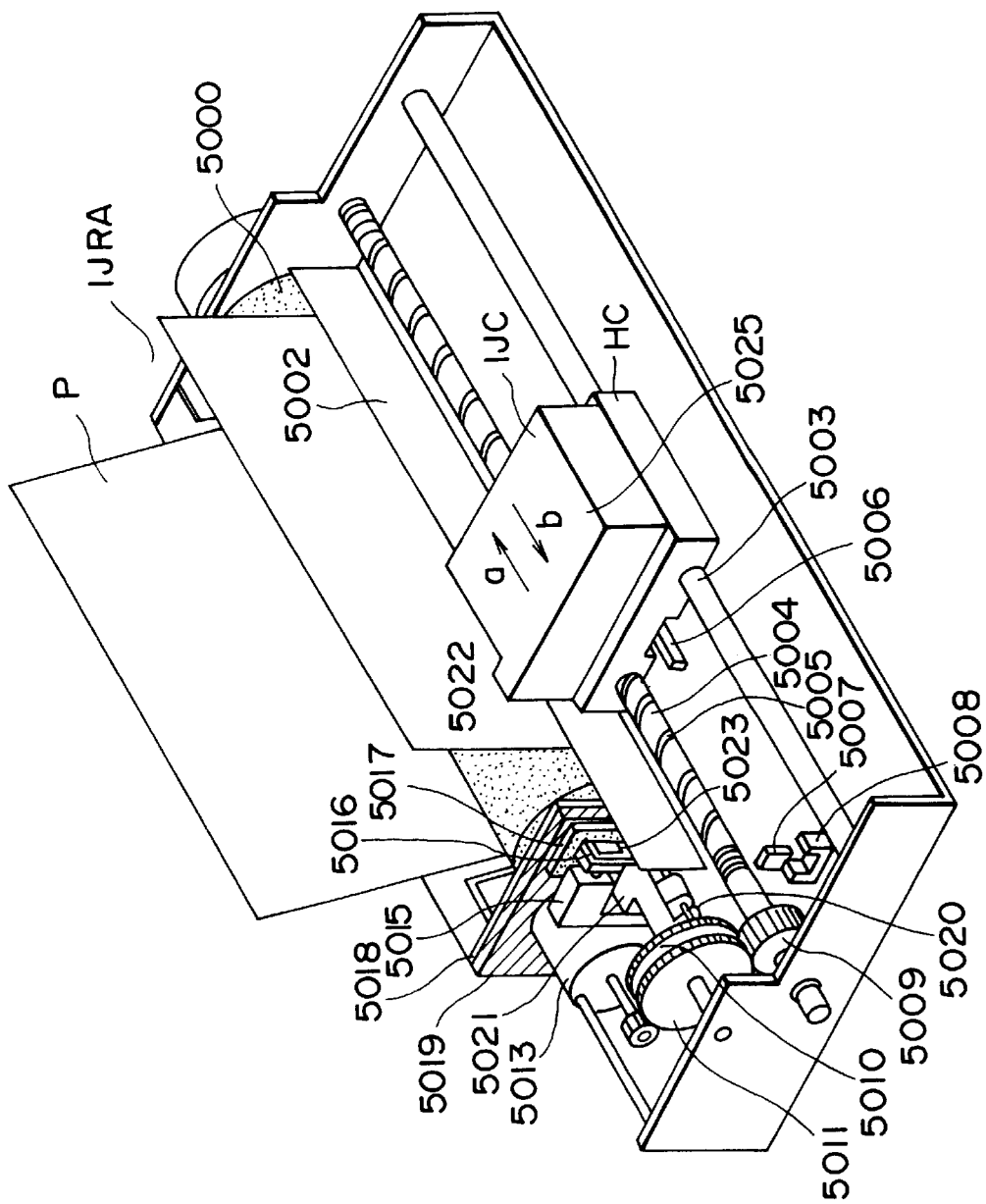
FIG. 6 is a schematic perspective view of an ink jet recording apparatus according to the present invention.

FIGS. 4 to 6 inclusive, illustrate components fit for use in implementing or realizing the present invention, including an ink jet unit IJU, an ink jet head IJH, an ink tank IT, an ink jet cartridge IJC, an ink jet recording apparatus proper IJRA and a carriage HC, and the individual relation between them.

Referring these drawings, the construction of each component will be described.

As shown in a perspective view of FIG. 5, the ink jet cartridge IJC in this embodiment is constructed so that the percentage of ink to be contained therein is set greater. As a result, the leading end portion of the ink jet unit IJU is slightly protruded in configuration from the front plane of the ink tank IT. The ink jet cartridge IJC is firmly supported by means for positioning the carriage HC (FIG. 6) mounted on the ink jet recording apparatus proper IJRA and by electric contacts. Moreover, the ink jet cartridge IJC is of a replaceable type as it is removable from the carriage HC. As a number of novel technical features have been embodied in the completion of the present invention, the overall configuration will be described by reference to the construction of each component.

1) Description of the construction of the ink jet unit IJU.

The ink jet unit IJU is of an ink jet type in which an electrothermal converter for generating thermal energy that causes ink to produce film boiling in response to an electric signal is used to make recordings.

In FIG. 4, numeral 100 denotes a heater board made up of a plurality of electrothermal converters (discharge heaters) arranged in a row on an Si substrate and electric wiring of A1 or the like for supplying power to them, the film forming technique being employed for forming the converters and the wiring. Numeral 200 denotes a wiring board for the heater board 100, this board having wiring corresponding to the wiring of the heater board 100 (e.g., connected by wire bonding) and pads 201 located at the ends of the wiring and used for receiving electric signals from tile apparatus proper.

Numeral 1300 denotes d grooved top plate having partitions for dividing a plurality of ink channels, a common liquid chamber for containing ink to be supplied to the respective ink channels and the like. The grooved top plate is formed integrally with an ink inlet port 1500 for receiving the ink supplied from the ink tank IT and introducing it into the common liquid chamber and an orifice plate 400 having a plurality of discharge ports corresponding to the respective ink channels. Although polysulfone is preferred as a material for integrally forming the grooved top plate, any other forming resin material may be used.

Numeral 300 denotes a metal support, for instance, for supporting the back surface of the wiring board 200 and it serves as the bottom plate of the ink jet unit. Numeral 500 denotes an M-shaped press spring for lightly pressing the common liquid chamber with the center of the M-shape and simultaneously concentrated pressing part of each liquid channel, preferably the region near each discharge port with its apron 501. The legs of the cap spring are passed through respective holes 3121 and mated with the backside of the support 300 to engage the heater board 100 with the top plate 1300 while holding them therebetween, whereby the heater board 100 and the top plate 1300 are tightly secured by means of the press spring 500 and the concentrated energizing force of its apron 501. Moreover, the support 300 has two projections 1012 for positioning the ink tank IT and positioning holes 312, 1900, 2000 into which positioning and heat fusion holding projections 1800, 1800 (not shown) are fitted. Positioning projections 2500, 2600 with respect to the carriage HC of the apparatus proper IJRA are also fitted to the rear side of the support 300. In addition, the support 300 has a hole 320 for making an ink supply pipe 2200 (described later) pass therethrough, the ink supply pipe having the ink from the ink tank supplied. In this case, an adhesive or the like is used for fitting the wiring board 200 to the support 300. Recesses 2400, 2400 of the support 300 are provided near (the backside of) the positioning projections 2500, 2600, respectively. A cover member 800 forms the outer wall of the ink jet cartridge IJC and also a space for use n accommodating the ink jet unit IJU with the ink tank. An ink supply member 600 is formed in such a way that an ink conduit 1600 continuous to the ink supply pipe 2200 serves as a cantilever with the side of the supply pipe 2200 being fixed. A sealing pin 602 is also inserted into the ink supply member 600 to secure a capillary on the fixed side of the ink conduit with the ink supply pipe 2200. Numeral 601 denotes a packing for sealing the joint between the ink tank IT and the supply pipe 2200 and 700 a filter provided in the end portion on the tank side of the supply pipe.

2) Description of the construction of the ink tank IT.

The ink tank comprises a cartridge body 1000, an ink absorber 900 and a cover member 1100 for sealing the ink absorber 900 that has been inserted from the side opposite to the fitting side of the unit IJU of the cartridge body 1000.

The absorber 900 is impregnated with ink and disposed in the cartridge body 1000. A supply port 1200 is used for supplying ink to the unit IJU consisting of the component parts 100–600 described above and also is used as an injection port for impregnating the absorber 900 with ink by injecting the ink from the supply port 1200 before the unit is arranged in a portion 1010 of the cartridge body 1000.

An air vent port and the supply port constitute a portion from which ink can be supplied in this embodiment. However, as an air existing area in the tank formed with a rib 2300 in the body 1000 and partial ribs 2302, 2301 of the cover member 1100 for use in smoothing the supply of ink from the ink absorber is provided from the side of the air vent port 1401 continuously over the remotest angular portion from the ink supply port 1200, it is essential to supply ink from the supply port 1200 to the absorber stably and uniformly. This method is practically very effective. The rib 2300 has four ribs parallel to the direction in which the carriage moves to prevent the absorber from adhering to the rear face. Moreover, the partial ribs 2302, 2301 are provided on the inner wall of the cover member 1100, located on the extended line corresponding to the rib 2300. Unlike the rib 2300, they are in a separated state, thus increasing the existing air space as compared with the former. In this case, the partial ribs 2302, 2301 remain dispersed on a face accounting for half the total area of the cover member 1100. With these ribs, the ink of the ink absorber in an area of the remotest angular portion from the tank supply port 1200 can be led by capillary force to the supply port 1200 surely and stably. The air vent port 1401 is provided in the cover member to make the interior of the cartridge communicate with the air. A liquid repellent material 1400 is arranged inside the air vent port 1401 to prevent ink from leaking out of the air vent port 1401.

The space used to accommodate the ink in the ink tank IT is rectangular and since the longitudinal sides are long, the arrangement of the ribs described above is especially effective. When the long sides extend in the direction in which the carriage moves or when a cubic body is employed, the supply of ink from the ink absorber 900 may be stabilized by providing such ribs over the whole cover member 1100. Although a rectangular cubic shape is fit for storing as much ink as possible in a limited space, importance should be attached to the provision of ribs capable of acting on a two-plane area in close contact with the angular area as described above to allow the ink thus stored to be used for recording purposes without waste. The inner ribs of the ink tank IT in this embodiment are substantially uniformly arranged in the direction of the thickness of the rectangular cubic ink absorber. This arrangement is important in that while the distribution of atmospheric pressure is uniformed, the residual quantity of ink is reducible to substantially zero in comparison with the ink consumption of the whole absorber. A detailed description will further be given of a technical advance in the arrangement of the ribs. When a circular arc with the long side as a radius is drawn around the position in which the ink supply port 1200 of the ink tank is projected on the surface of a quadrilateral of the rectangular cubic, it becomes important to dispose the ribs on a face outside the circular arc in order that the atmospheric state is quickly provided for the absorber positioned outside the circular arc. In this case, the location of the air vent port of the tank is restricted to this definition as long as the air is readily introduced in the area where the ribs are disposed.

The rear face of the ink jet cartridge IJC with respect to the head is made planar in this embodiment to minimize the space required and to maximize the quantity of ink to be stored when it is built into the apparatus. Consequently, the apparatus can be reduced in size. Furthermore the frequency of replacing the cartridge can be decreased effectively moreover, by utilizing the rear portion of the space for use in integrating the ink jet unit IJU, the protruded portion for the air vent port 1401 is formed therein and hollowed out. Then an atmospheric pressure supply space 1402 corresponding to the whole thickness of the absorber 900 described above is formed further. With this arrangement, an excellent cartridge that has not previously been produced is provided. The atmospheric pressure supply space 1402 is by far greater than the prior art space and as the air vent port 1401 is located above the supply space, ink may temporarily be held in the atmospheric pressure supply space 1402 even though the ink is withdrawn from the absorber to ensure that it is recoverable into the absorber. Therefore, an excellent cartridge free from waste can be provided.

The ink tank IT is so formed as to enclose the unit IJU excluding its lower opening when it is encased with the cover 800 after being installed. However, as the lower opening where the carriage HC is to be mounted is situated close to the carriage HC, the ink jet cartridge IJC is caused to form a substantially enclosed space. As a result, the heat generated from the head IJH, though it is effectively usable for retaining heat in the space, may result in slightly increasing the temperature therein if the head is operated continuously for hours. For this reason, there is provided a slit 1700 narrower than the space in the upper face of the ink jet cartridge IJC to assist in the natural radiation of heat from the support and thus preventing a temperature rise. The uniform temperature distribution over the whole unit IJU is thus unaffected by the environment.

When the ink jet cartridge IJC is completely assembled, ink is supplied from the cartridge into the supply tank 600 via the hole 320 bored in the support 300 and an inlet port provided in the intermediate rear side of the supply tank 600. After passing through the supply tank 600, the ink flows from the outlet port into the common liquid chamber properly via the supply pipe and the ink inlet port 1500 of the top plate 1300. A connection for letting ink pass therethrough is provided with packing of silicone rubber or Butyl rubber, for instance, whereby sealing is effected. An ink supply route is thus secured.

3) General description of the apparatus.

FIG. 6 is a schematic view of an ink jet recording apparatus as an application of the present invention. The carriage HC meshing with a spiral groove 5004 of a lead screw 5005 rotating via drive force transmission gears 5011, 5009 interlocking with the reciprocal rotation of a drive motor 5013 has a pin (not shown) and makes reciprocal movements in direction of arrows a, b. Numeral 5002 denotes a paper cap plate for pressing paper against a platen 5000 over the direction in which the carriage moves. Numerals 5007, 5008 denote photo couplers as home position detection means for confirming the presence of the lever 5006 of the carriage in this region and switching the direction in which the motor 5013 rotates. Numeral 5016 denotes a member for supporting a cap member 5022 for capping the front panel of a recording head and 5015 a sucking means for sucking the contents of the cap and for recovering the suction function of the recording head via an opening 5023 in the cap. Numeral 5017 denotes a cleaning blade and 5019 a member for making the blade longitudinally movable, these being supported by a body support plate 5018. The blade in another configuration may needless to say be applicable to this embodiment. Numeral 5021 denotes a lever for causing the commencement of the suction thus recovered. The lever 5021 moves as a cam 5020 meshing with the carriage moves and its movement is controlled by a known transmission means for switching the drive force derived from the drive motor by means of a clutch or the like.

Although the capping, cleaning and suction recovery operations have been so arranged that the carriage, when it has reached the region on the home position side, is capable of performing the process desired at the corresponding position because of the function of the lead screw 5005, this arrangement is applicable to this embodiment, provided the carriage is made to perform the desired operation at a known timing. The system configuration described above is excellent when the present invention is based thereon in a single or multiple form and it exemplifies a preferred example of the present invention.

Referring to the accompanying drawings in addition to FIGS. 4 to 6, the present technology-oriented invention will subsequently be described in detail.

(Embodiment 1)

In concept, this embodiment is summarized as follows; an ink jet recording apparatus comprising a head for making recordings by discharging ink onto recording media, a plurality of nozzles for discharging the ink to the head, and a common liquid chamber for supplying the ink to the nozzles is characterized by a dot matrix for printing in such a form that a grid of vertical and horizontal dots combined at predetermined intervals is replaced with an inclined grid thereof formed by dot-to-dot moving the position of a given number of dots vertically and then horizontally (by shifting discharge timing) by the ratio of the predetermined interval.

In a conventional ink jet recording apparatus, a character or an image has been expressed by means of a dot matrix having a grid of vertical and horizontal intersection points combined at intervals of 1/360 inch, for instance, as shown in FIG. 7. FIG. 7 (*a*) indicates the grid according to the present invention stated above, whereas FIG. 7(*b*) shows a state in which dots are superimposed when dots of about 100 $\mu$m in diameter are typed (in solid black) at every position shown in 7(*a*).

Figure 8:
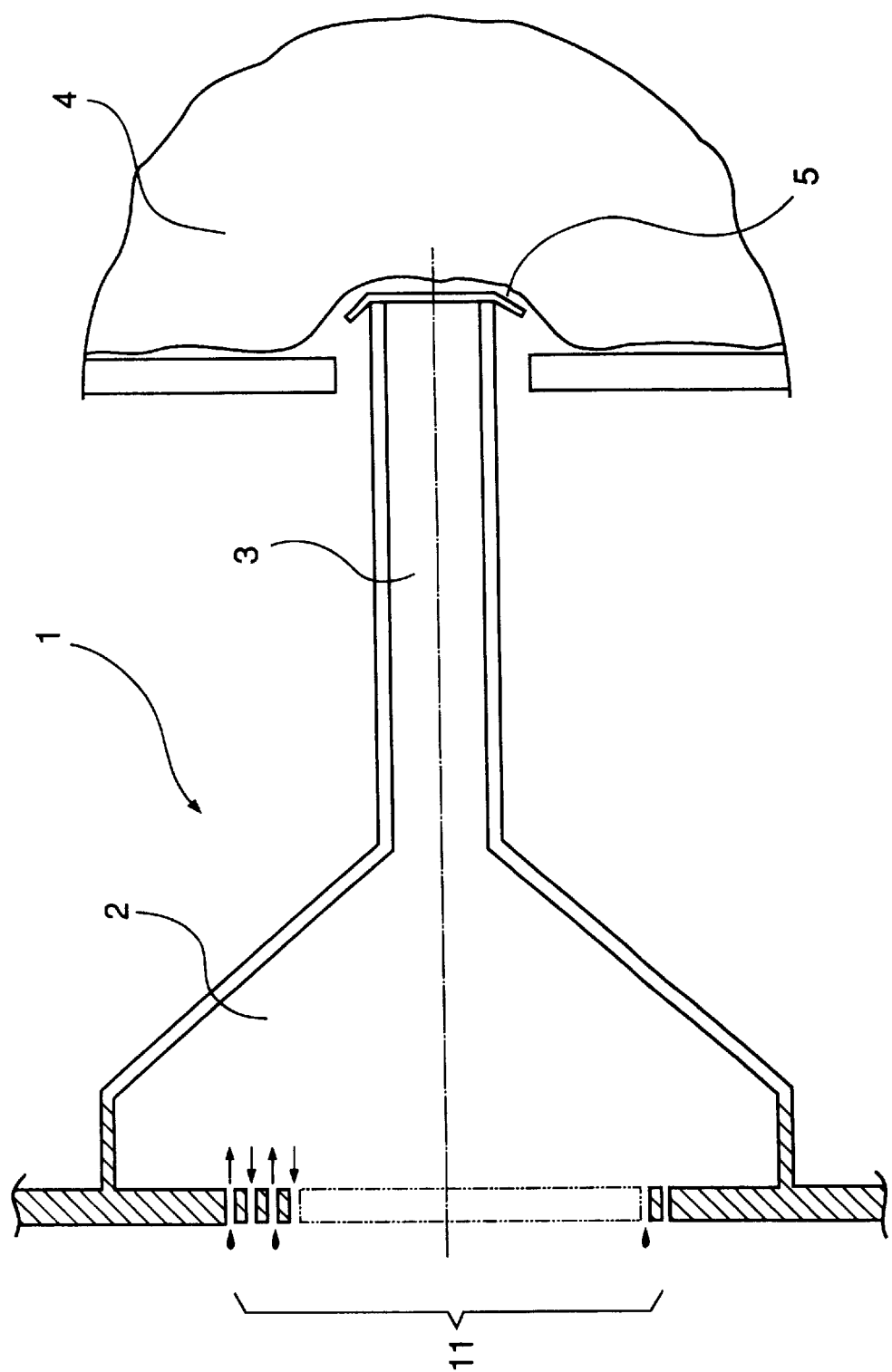
FIG. 8 is a view illustrating part of an ink jet recording head cartridge.

FIG. 8 illustrates the exemplary construction of a exchangeable ink cartridge head with an ink tank and a head as an integrated body. Numeral 1 denotes a nozzle unit having 64 nozzles, 2 a common liquid chamber for temporarily storing ink to be supplied to each nozzle, 3 a pipe called a chip tank for connecting the ink tank and the common liquid chamber 2, 4 a sponge in the ink tank, the sponge holding ink to prevent its leakage, and 5 a filter for preventing bubbles from entering the chip tank.

The ink for use contains about 90% moisture, 7% solvent and 3% of dyes. The resolution of the head is set at 360 DPI (dots per inch), the discharge quantity at 70 ng per nozzle and the drive voltage at 24 V.

Figure 9:
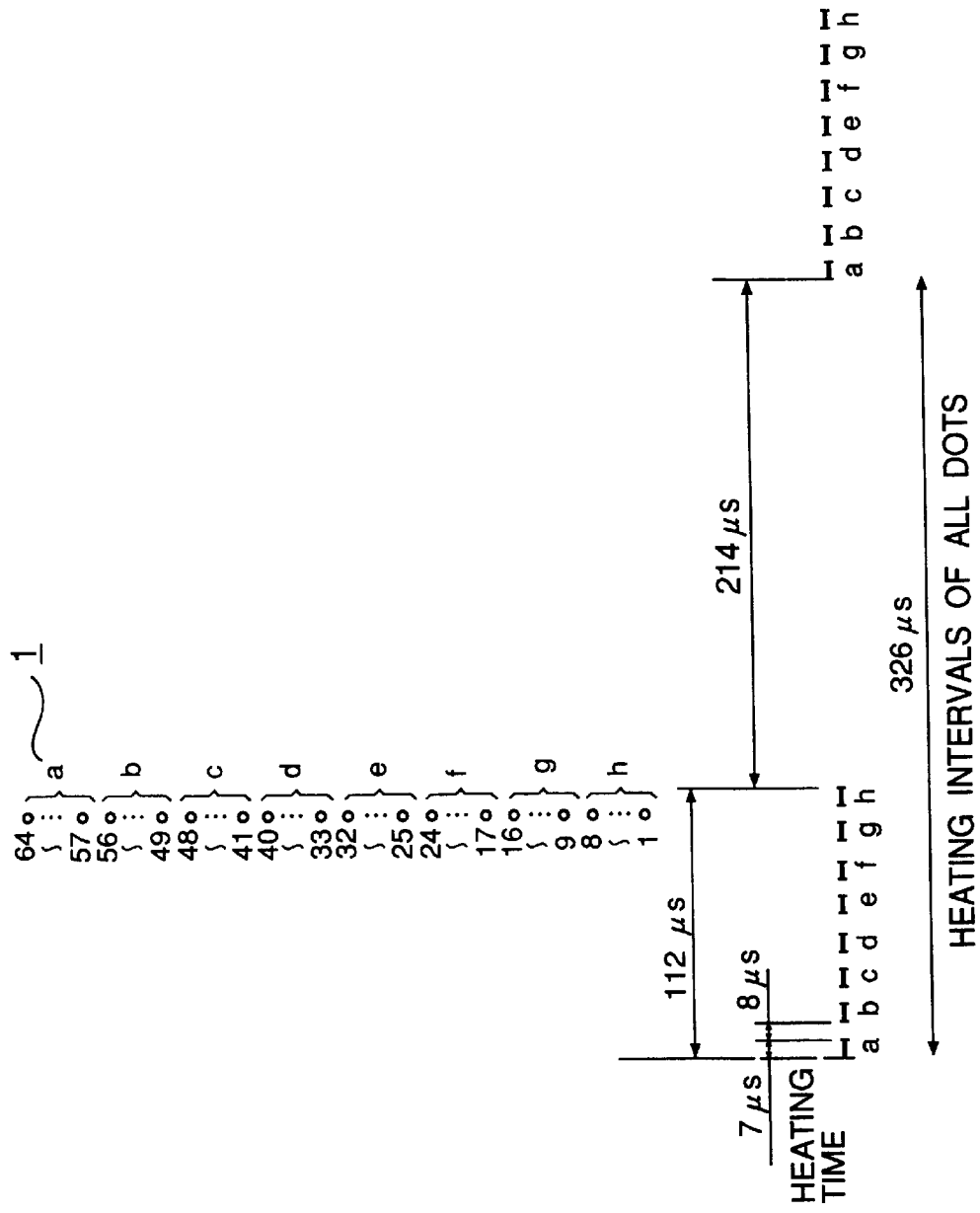
FIG. 9 is a view illustrating printing timing in ordinary printing.

FIG. 9 is a chart showing energizing timing of heaters. The heaters of the 64 nozzles are not simultaneously supplied with power, which is supplied 8 times to 8 nozzles each time to lower the maximum current. The 64 nozzles are divided into 8 blocks a–h, so that power is supplied to each block starting with a in sequence for 7$\mu$ seconds with an interruption of 8$\mu$ seconds. Printing speed is set at 64 CPS and discharge frequency at 3,072 Hz; in other words, any given dot at the time of continuous discharge is heated at intervals of about 326$\mu$ seconds, that is, 1/3,072 Hz as 48 dots×64 CPS. When continuous discharge is effected, the resupply (hereinafter called refilling) of ink, to be carried out after the discharge, has to be completed during a drive period of those 326$\mu$ seconds.

Figure 10:
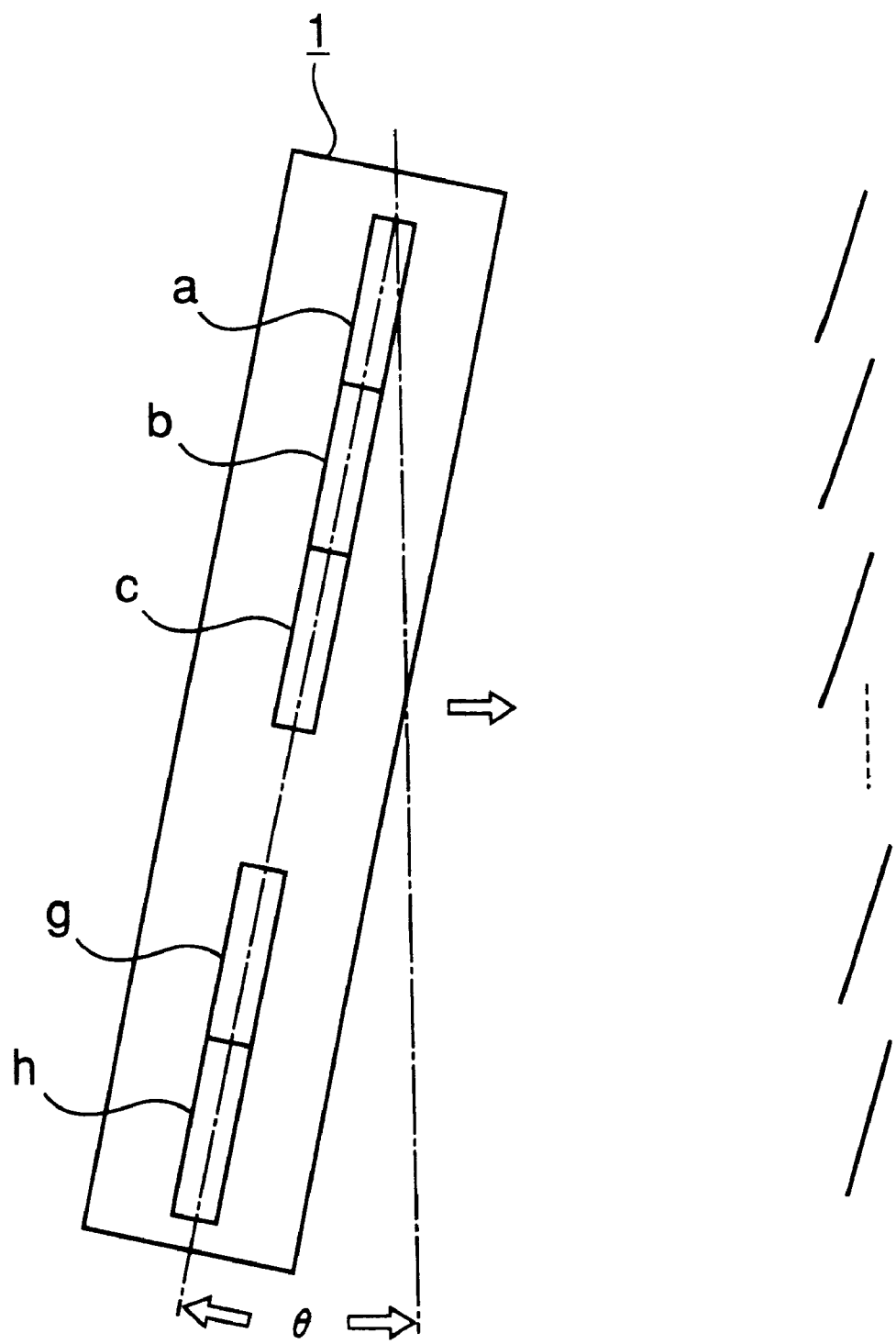
FIG. 10 is a view illustrating an inclination of a recording heed in a scanning direction and an image according to the present invention.

Since a subtle difference in printing timing arises between the nozzle blocks in a case where recordings are made by time division driving on a block basis, the printing position may shift block-to-block by a very small distance in the printing direction. Consequently, an inclined nozzle train of the recording head is mounted as shown in FIG. 10 to use the ink droplets discharged from each nozzle without causing them to shift in the printing direction.

The discharge frequency needs improving in order to increase the printing speed of the ink jet recording apparatus.

When it is attempted to improve the discharge frequency in the conventional ink jet recording apparatus, especially in the system in which the ink tank and the head portion have been combined and made exchangeable as shown in FIG. 4, the problem is that the time required for refilling after the discharge will have to be shortened to normalize the continuous discharge. In this embodiment, there is used a dot matrix for printing in such a form that a grid of vertical and horizontal dots combined at predetermined intervals is replaced with an inclined grid thereof formed by dot-to-dot moving the positions of a given number of dots vertically and then horizontally by half the predetermined interval, whereby its becomes feasible to shorten by a large margin the time required for refilling during the process of discharge and without this measure it would be difficult to improve the discharge frequency of the head.

FIG. 11(*a*) and (*b*) illustrate a dot matrix for printing by means of the ink jet recording apparatus embodying the present invention. As shown in 11(*a*), a grid of dots at 1/360 inch intervals provides a basic form. The inclined grid is formed by dot-to-dot shifting the dots vertically by one interval and then horizontally by ½ of one interval or 1/720 inch. FIG. 11(*b*) shows a state of superimposed dots when dots about of 100 $\mu$m in diameter are typed (in solid black) at every position shown in (a). Gaps are seen to be substantially uniformly filled.

Figure 12:
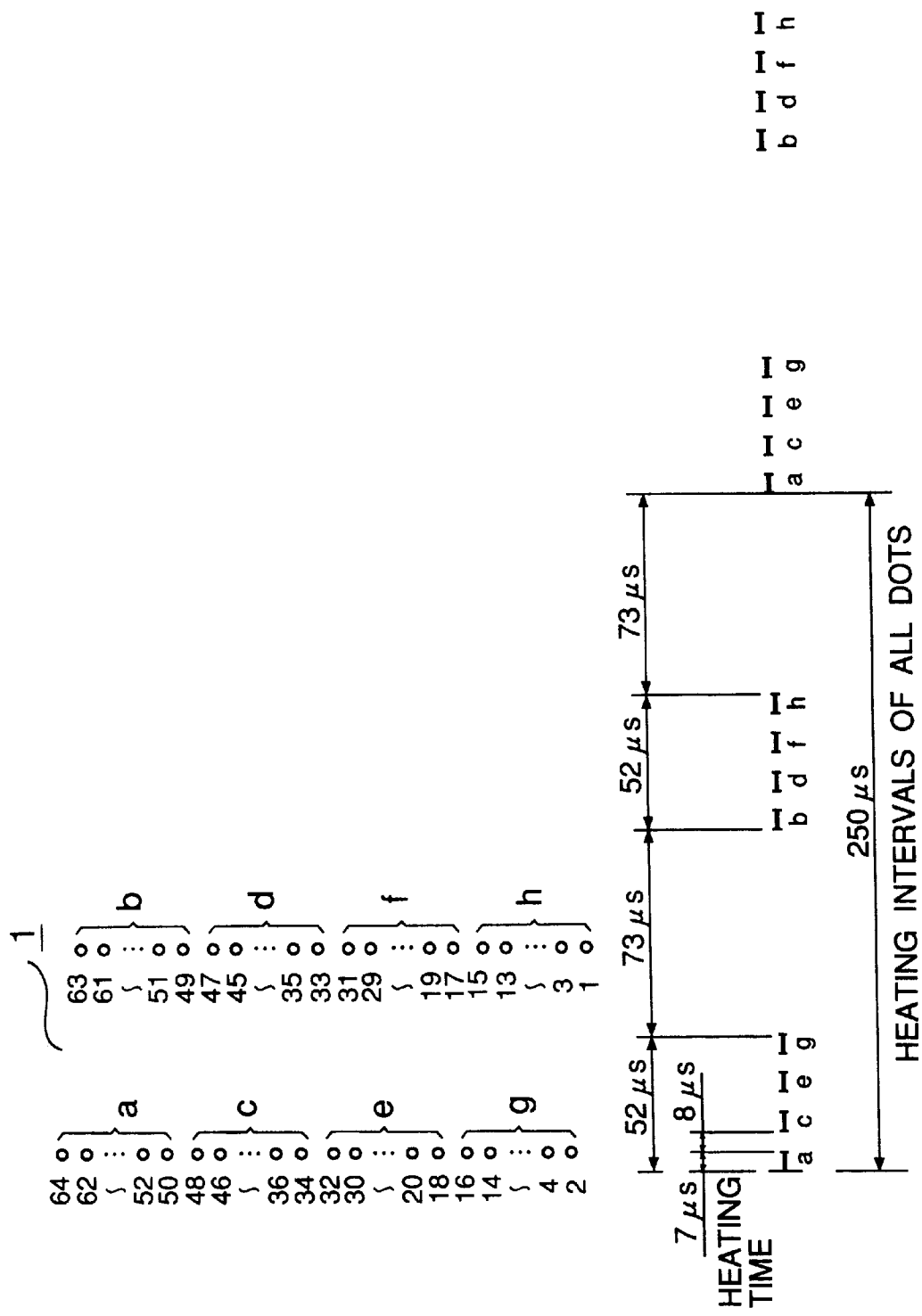
FIG. 12 is a view illustrating printing timing of a recording head in shift printing.

FIG. 12 is a chart showing energizing timing of heaters. Power is supplied 8 times to 8 nozzles each time to lower the maximum current as in the conventional case. However, the way of dividing the nozzles into 8 blocks a–h is changed as shown in FIG. 12 so that a, c, e, g and b, d, f, h are grouped (the discharge units may be arranged in the recording head accordingly) and heated alternately. The dot matrix with the dots shifted dot-to-dot by 1/720 inch can thus be printed. The heating of each group is completed in 52$\mu$ seconds by intermittently supplying power to a, c, e, g in sequence for 7$\mu$ seconds each at 8$\mu$ second intervals. With a period of time during which no power is supplied, the group of b, d, f, h are heated likewise. The printing speed at this time has been raised up to even 83.3 cps. As the discharge frequency is 4,000 Hz, that is, 48 dots×83.3 cps, the heating intervals of certain dots at the time of continuous discharge become 250$\mu$ seconds, that is 1/4,000 Hz. When the continuous discharge is carried out, refilling to be effected after the discharge is completed within 250$\mu$ seconds.

Figure 13:
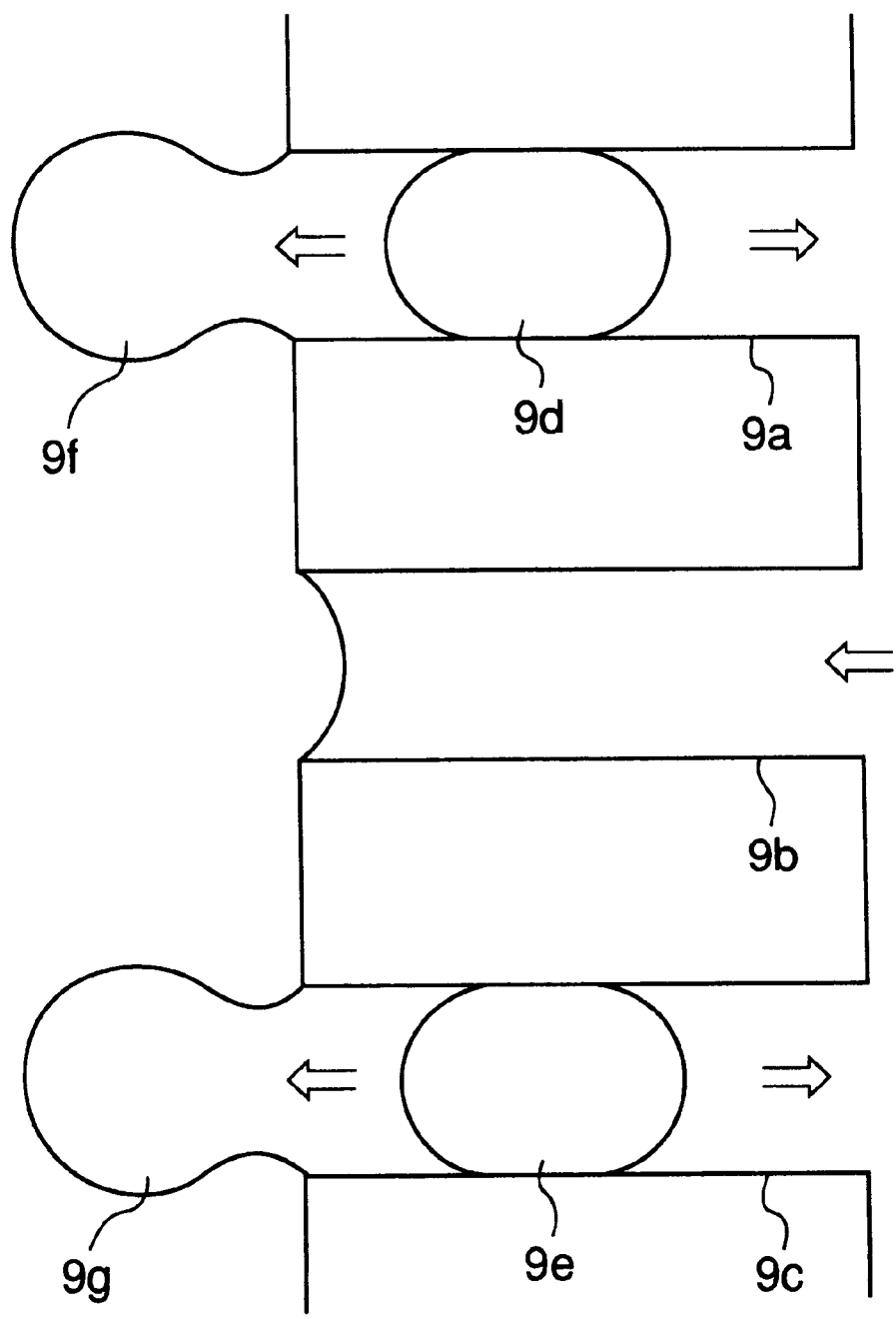
FIG. 13 is a view illustrating parts in the vicinity of discharge ports of an ink jet recording head according to the present invention.

Referring to FIGS. 8, 13, the reason for the refilling to be made at high speed will be described. FIG. 13 is an enlarged view of discharge ports making recordings by shift printing. At the time of continuous discharge, discharge timing is shifted by 125$\mu$ seconds from that of the adjoining nozzle. As is obvious from the timing, an adjoining nozzle 9*b* is in the process of refilling when nozzles 9*a*, 9*c* are heated, thus causing bubbles 9*d*, 9*e* to expand. As shown by arrows, while ink in the vicinity of the discharge ports is energized as the bubbles expand in 9*a*, 9*c*, pressure is also directed to the common liquid chamber. The pressure is transmitted via the common liquid chamber and acts in such a way as to assist the nozzle 9b in the process of refilling to be refilled. The effect resulted therefrom shortens the time required for refilling and even though the continuous discharge is effected by replacing a heating interval of 326μ seconds shown in FIG. 9 with 250μ seconds in FIG. 12, refilling may be accomplished. This makes possible smooth discharge.

Figure 14:
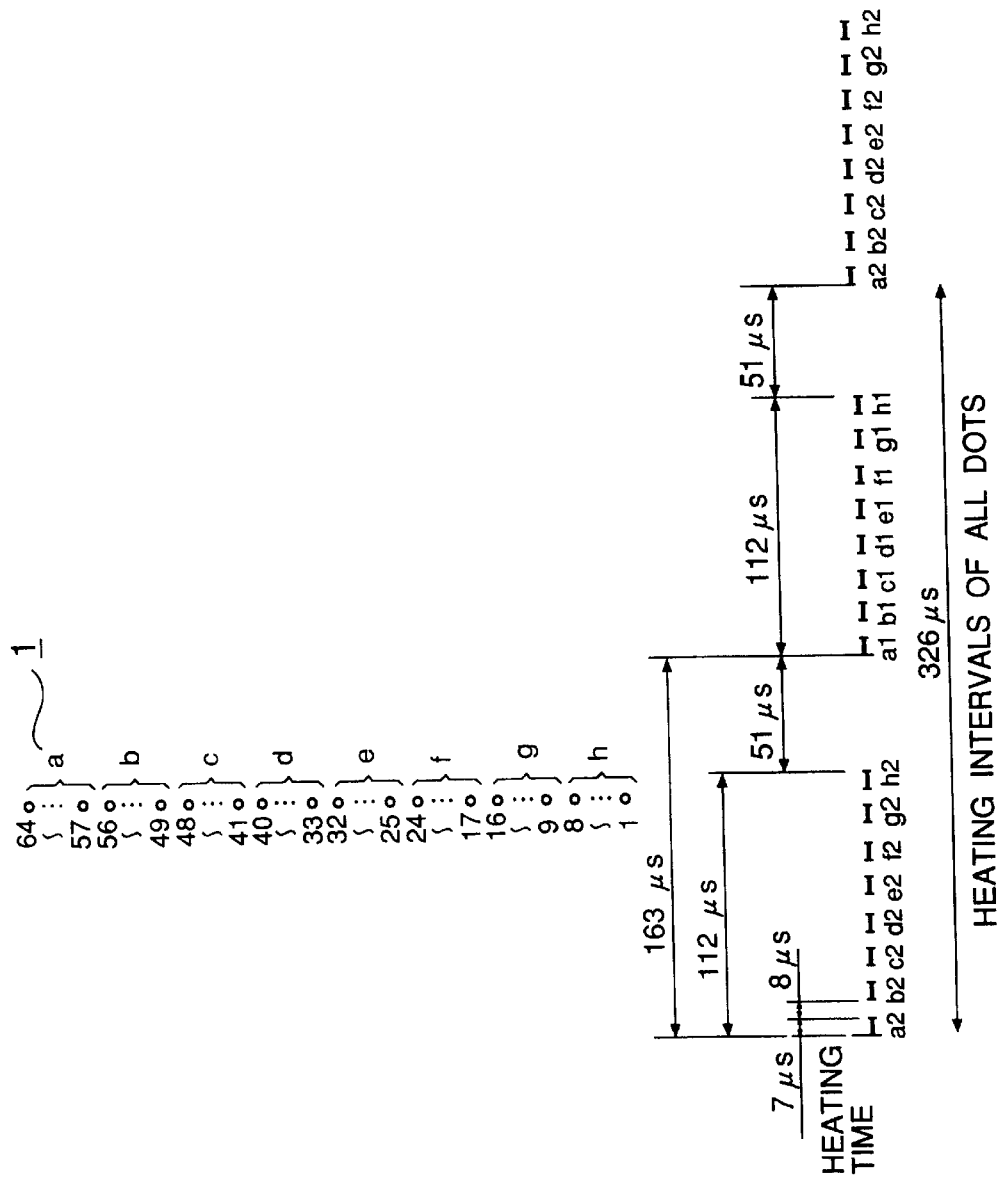
FIG. 14 is a view illustrating printing timing of another recording head in shift printing.

FIG. 14 exemplifies an application of the present invention to a head of the conventional construction, though this construction is not in conformity with what is shown in FIG. 12. As shown in FIG. 14, ink is not discharged to all dots for 112μ seconds. The a–h blocks are dot-to-dot divided further to form a group of a2–h2 discharge ports of even numbers and that of a1–h1 discharge ports of odd numbers. The heaters are energized at 112μ seconds interval from a point of time after half the heating interval of all dots, that is, 326μ second/2=162μ seconds is delayed. Even this method is possible to contribute to refilling and to prevent the so-called defective discharge phenomenon.

Figure 15:
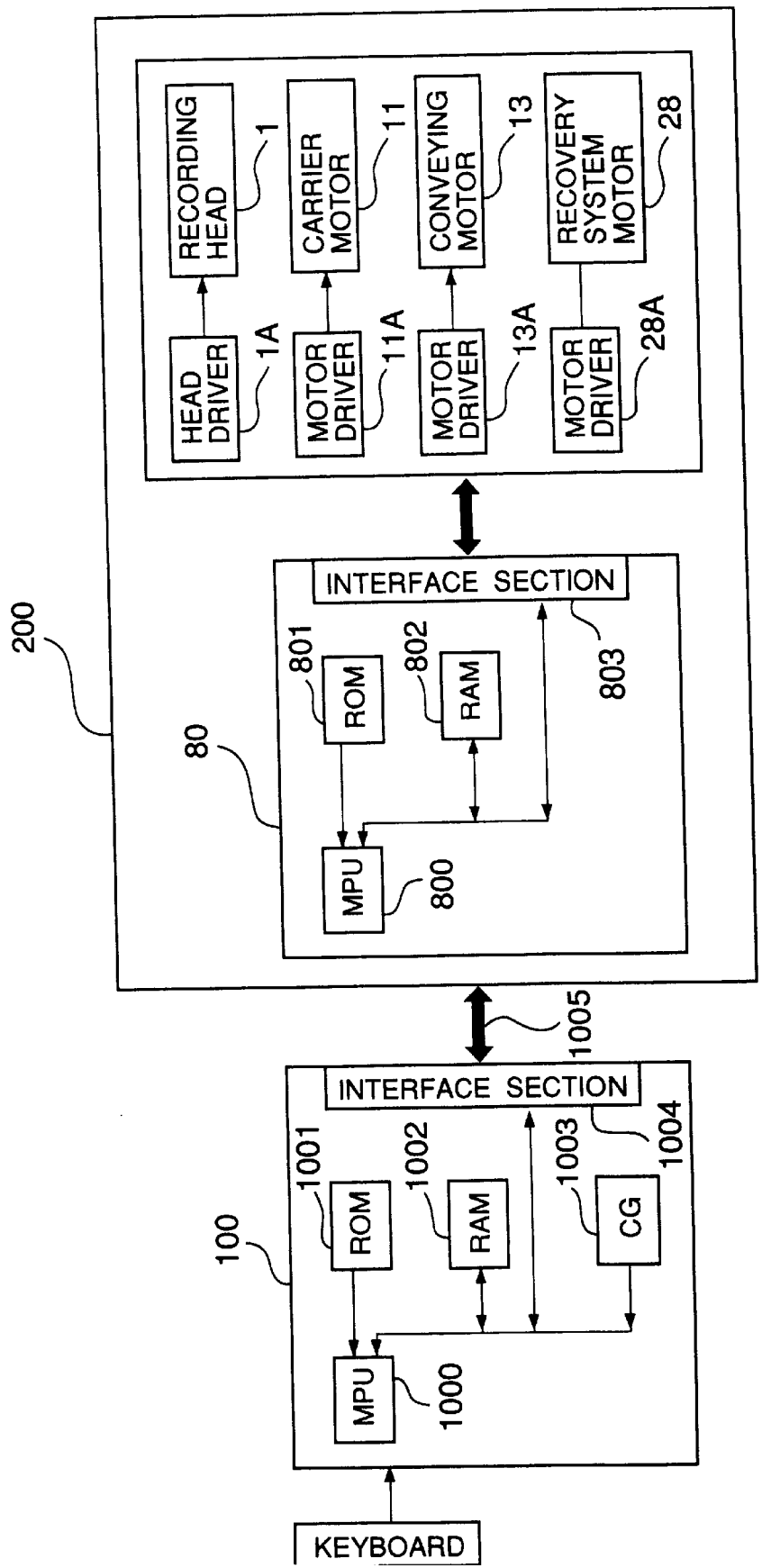
FIG. 15 is a block control diagram of an ink jet recording apparatus according to the present invention.
Figure 16:
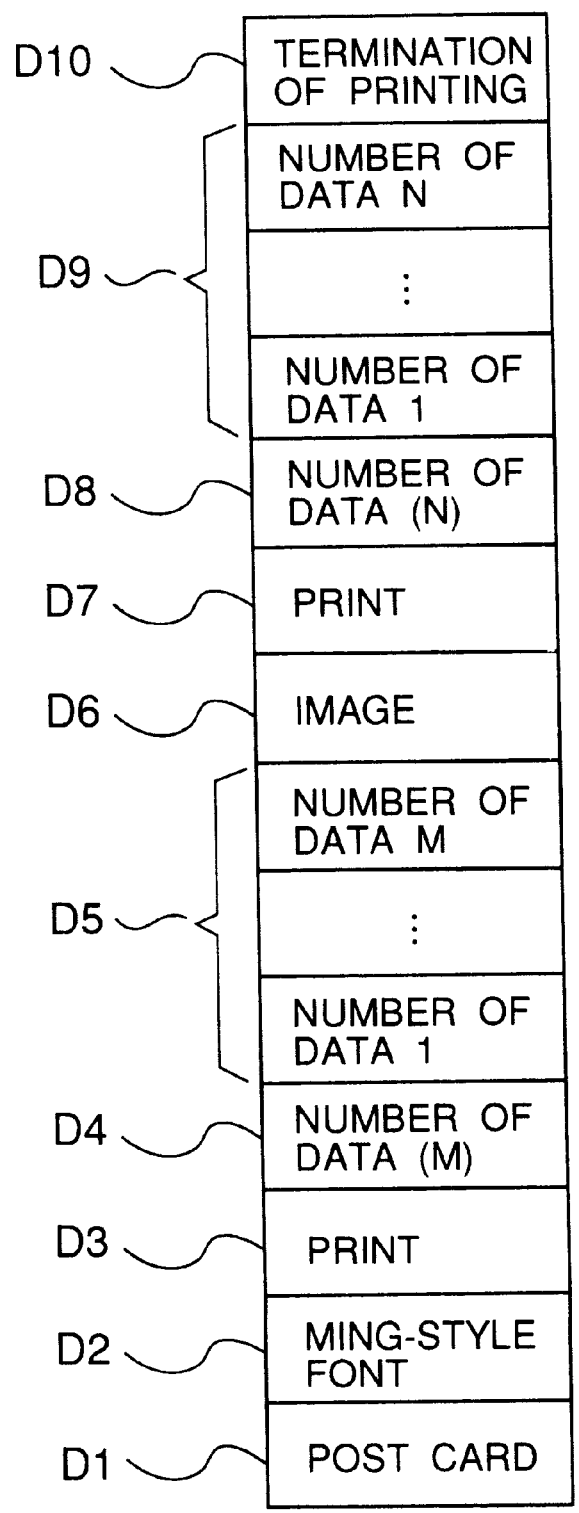
FIG. 16 is a view illustrating a pattern block of recording data according to the present invention.

The operation of driving will subsequently be described. On receiving data of D5, D9 of FIG. 16 transferred from a control unit 100, a printer control unit 80 stores data equivalent; to one nozzle train of the head in PAM 802 once as shown in FIGS. 15, 16.

Subsequently, data [10101010] in binary notation (AA in hexadecimal notation), for instance, is obtained from ROM 801 and then the 8-bit data and what has previously been stored are obtained from the block a sequentially on an 8 bit basis before being bit-to-bit ANDed. In other words, the results are sequentially transferred to a head driver 1A via an interlace section 803 by masking even bits to have them printed by a recording head 1. With the timing delayed by 163μ seconds, data [01010101] (55 in hexadecimal notation), for instance, is subsequently obtained from ROM 801 before being bit-to-bit ANDed likewise, that is, printed by masking odd dots. The control process described above is repeated to implement the printing above.

Figure 17:
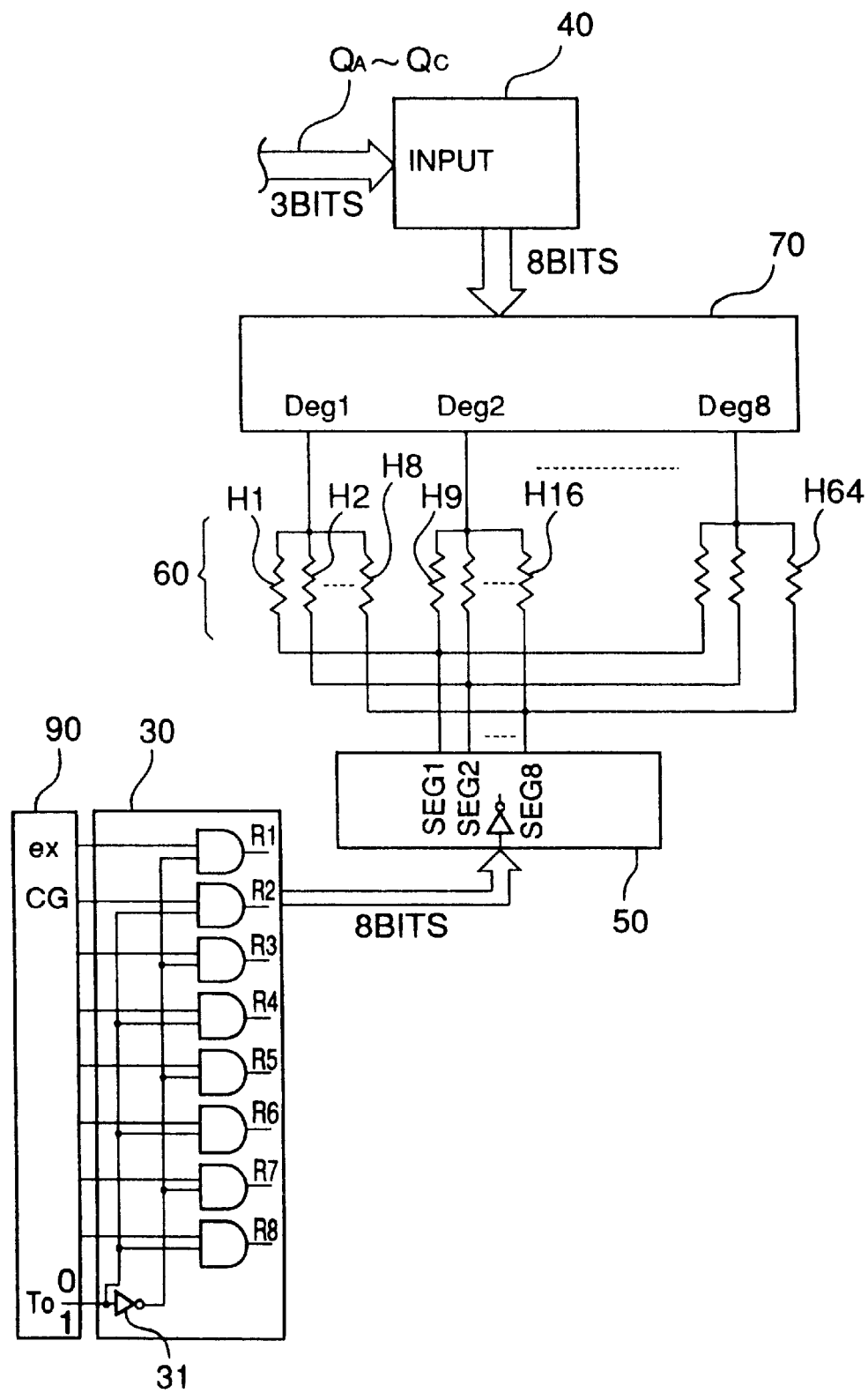
FIG. 17 is a circuit for control process as shown in FIGS. 5 and 6.

FIG. 17 illustrates a circuit for implementing the control described above, wherein H1–H64 denote heaters provided for respective nozzles of the head and Deg 8, 7,. . . 1 with 8 heaters as a group correspond to the respective groups of nozzles a, b,. . . h shown in FIG. 14. Deg 8–Deg 1 are output from a digit circuit 70 in response to 8-bit signals from a decoder 40. Moreover, 3-bit data for use in heating the respective group from a character generator 90 are distributed by a selector 30 to even and odd nozzles and supplied to respective segments Seg 1–8. R1, R2, . . . R8 are AND circuits. Binary values 0 and 1 from To and an inventor 31 selectively determine whether the even or odd nozzles are heated.

In this embodiment, though the discharge timing is dot-to-dot shifted, the present invention is not restricted to that technique. No problem arises even when the discharge timing is shifted every two dots or on a two-dot basis, for instance.

Although the shifting of the discharge timing in this embodiment has been restricted to half the discharge interval, it may be other than just half the value.

Figure 18:
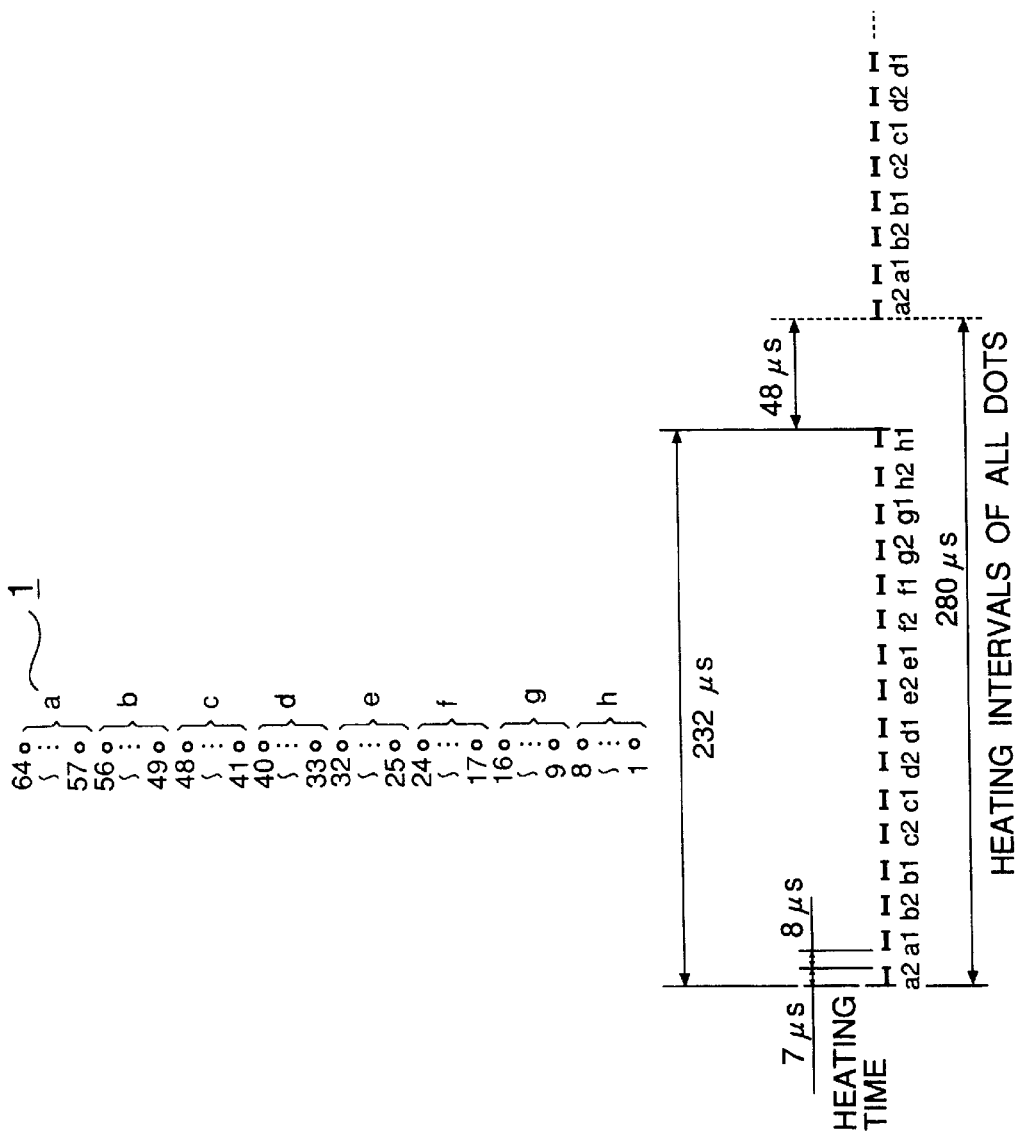
FIG. 18 is a view illustrating different printing timing in shift printing.

In this embodiment, moreover, there have been shown two examples of the energizing timing of the heaters to implement the present invention, wherein the heating of the odd nozzles is effected after the heating of the even nozzles out of all nozzles is terminated. However, the present invention is not limited to this technique but what drives each of all blocks with even nozzles separated from odd ones. FIG. 18 shows heating timing in that case. Even nozzles are separated from odd ones in each of the blocks a–h and 8 blocks are driven in the following order: even nozzles in block a (a2), add nozzles in block a (a1), even nozzles in block b (b2). . . It effectively assists in refilling that a maximum of four nozzles are heated at a time together with the short heating intervals of adjoining nozzles. Even though the heating intervals of all dots are assumed to be 280 μs, it still satisfactorily serves the purpose of refilling.

As illustrated, the data ANDed with [10101010] is first printed and subsequently what is ANDed with [01010101] is printed in this embodiment so that upper left-hand data in order remains alive in consideration of the left-to-right recording direction. However, the present invention is not limited to this arrangement and it is quite acceptable to print the data ANDed with [01010101] first and subsequently what is ANDed with [10101010] so as to make the upper left-hand data delay in order.

Although a description has been given of the shift printing system as applied to in the recording apparatus of this embodiment, the present invention is not restricted to that system but may be implemented by providing a switching switch to allow the user to select either ordinary or shift printing.

Figure 45:
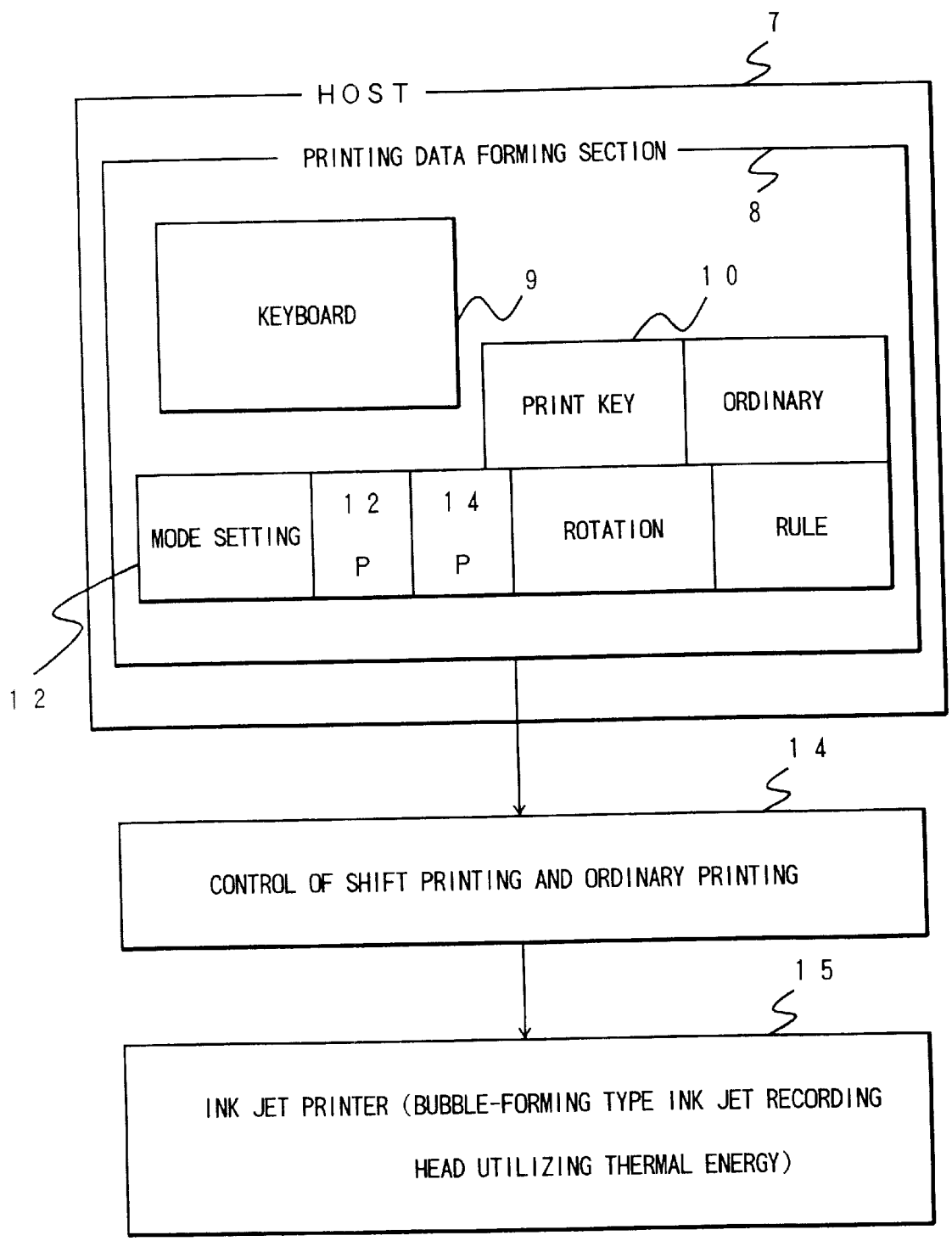
FIG. 45 is a view illustrating the selection of driving means according to the present invention.

FIG. 45 illustrates a control system configuration in this case. Numeral 7 denotes a host, 8 a printing data forming section, 9 a keyboard, and 10 a print key. In order that shift printing may automatically be employed only at the time of 12, 14 point printing, rotary printing, rule printing and the like that are prone to produce defective prints, the recording apparatus may be made to select a printing mode in accordance with printing contents by means of mode setting 12. Numeral 1412 denotes a control of shift printing and ordinary printing, and 1512 an ink jet printer.

Moreover, two kinds of shift printing using modified character fonts for shift printing and ordinary printing using ordinary fonts may be provided thus allowing either the user to select one of them or one to be automatically selected.

As set forth above, there is used a dot matrix for printing in such a form that a grid of vertical and horizontal dots combined at predetermined intervals is replaced with the inclined grid thereof formed by dot-to-dot moving the positions of the dots vertically and then horizontally by half the predetermined interval, whereby with this easy-to-implement contrivance relevant to control, it becomes possible to shorten by a large margin the time required for refilling during the process of discharge. Otherwise it would be difficult to improve the discharge frequency of the head. This is an art extremely useful for improving the printing speed of ink jet recording apparatus.

(Embodiment 2)

A description will subsequently be given of a control method for reciprocal printing to which the shifting printing described in the first embodiment is applied. As an apparatus for use in this embodiment is similar in configuration to what has been described in the embodiment 1, the description of tho apparatus will be omitted.

When the shift printing is applied to the reciprocal printing in which printing is made during the return operation after the scanning of the recording head, advance recording is seen to shift slightly from return recording to the extent that printing timing is dot-to-dot shifted. That delicate shift tends to conspicuously appear in the case of recording a rule, an enlarged character or the like bridging over more than one line.

Figure 2:
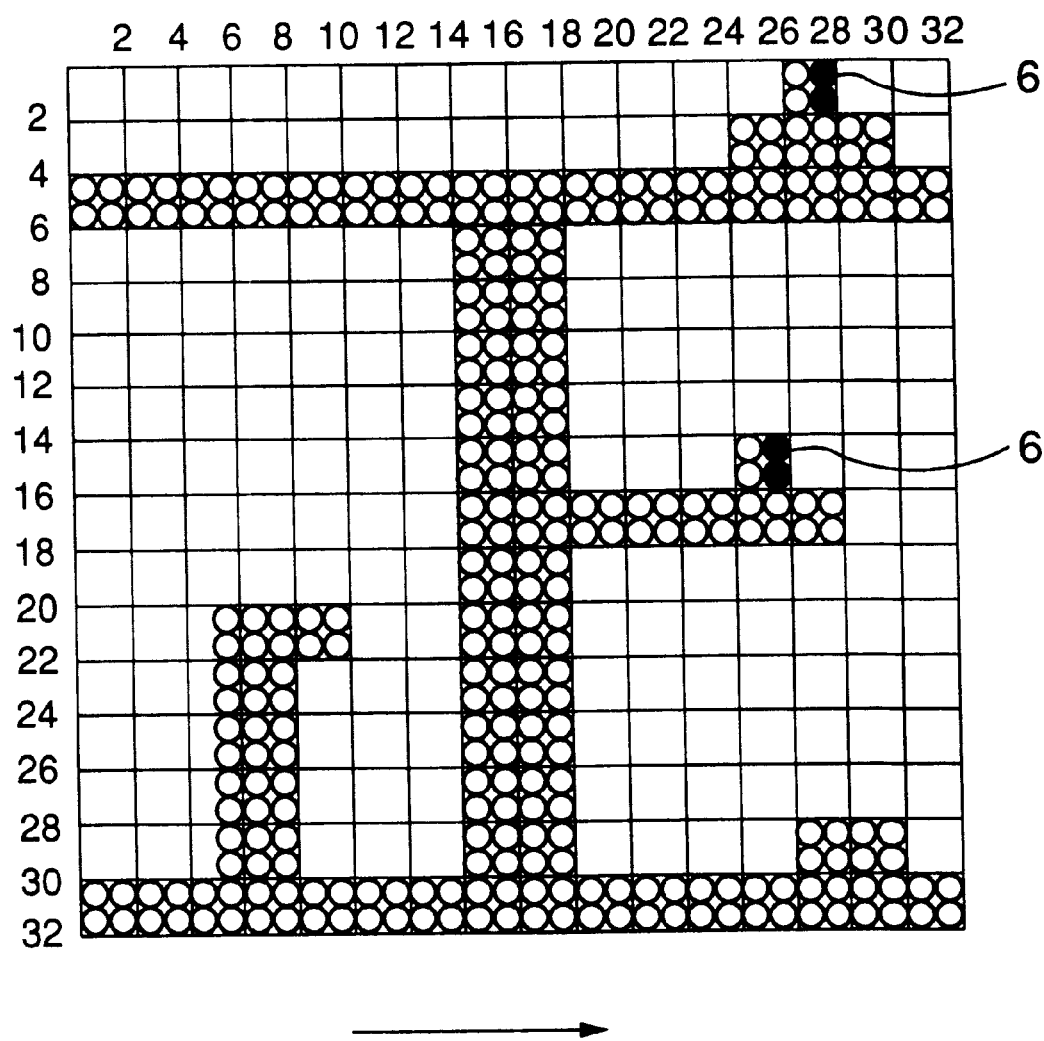
FIG. 2 is a view illustrating a recording image in a normal recording mode according to the present invention.
Figure 3:
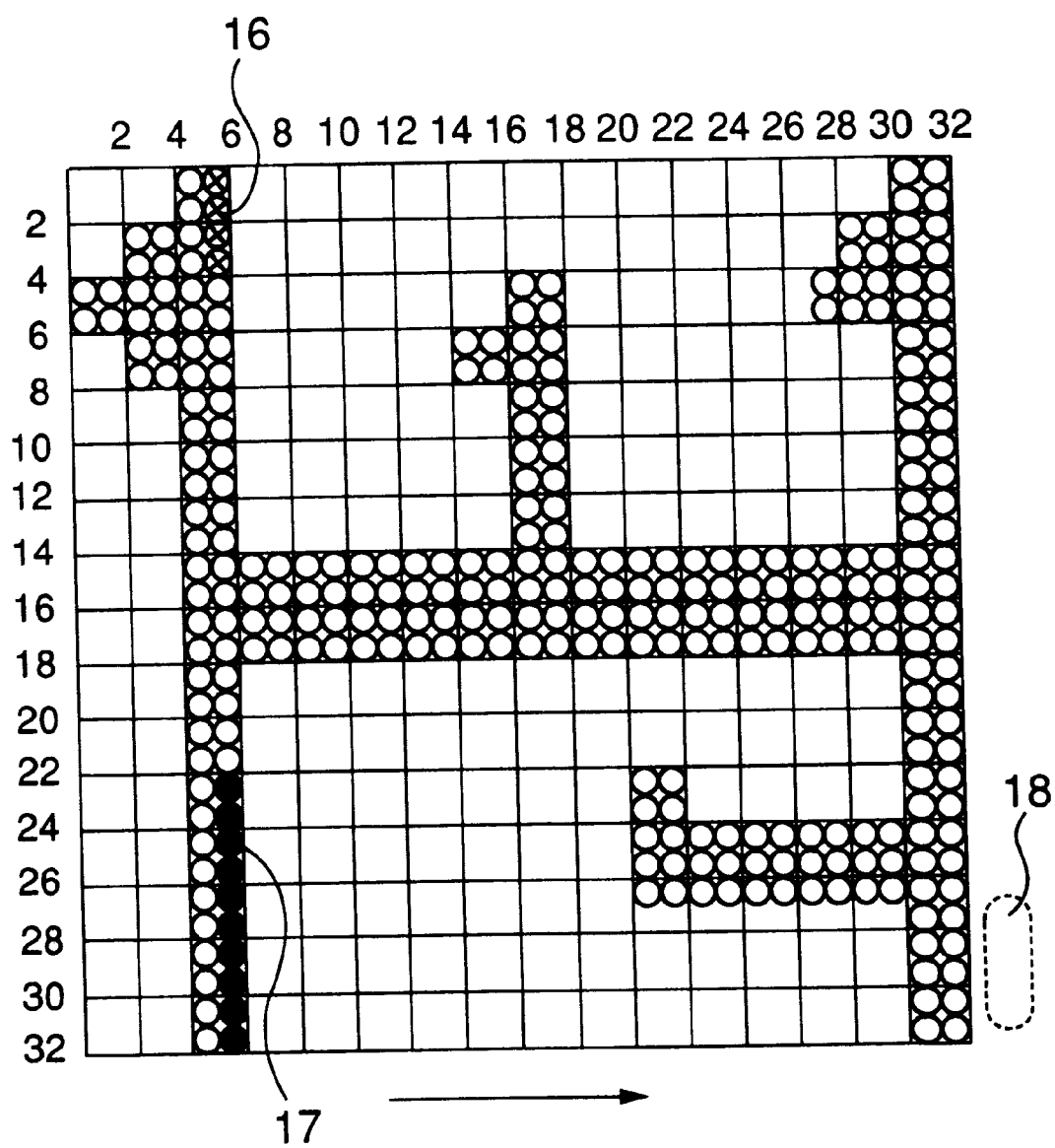
FIG. 3 is a view illustrating problems in ordinary printing with reference to a rotary printing image.
Figure 19:
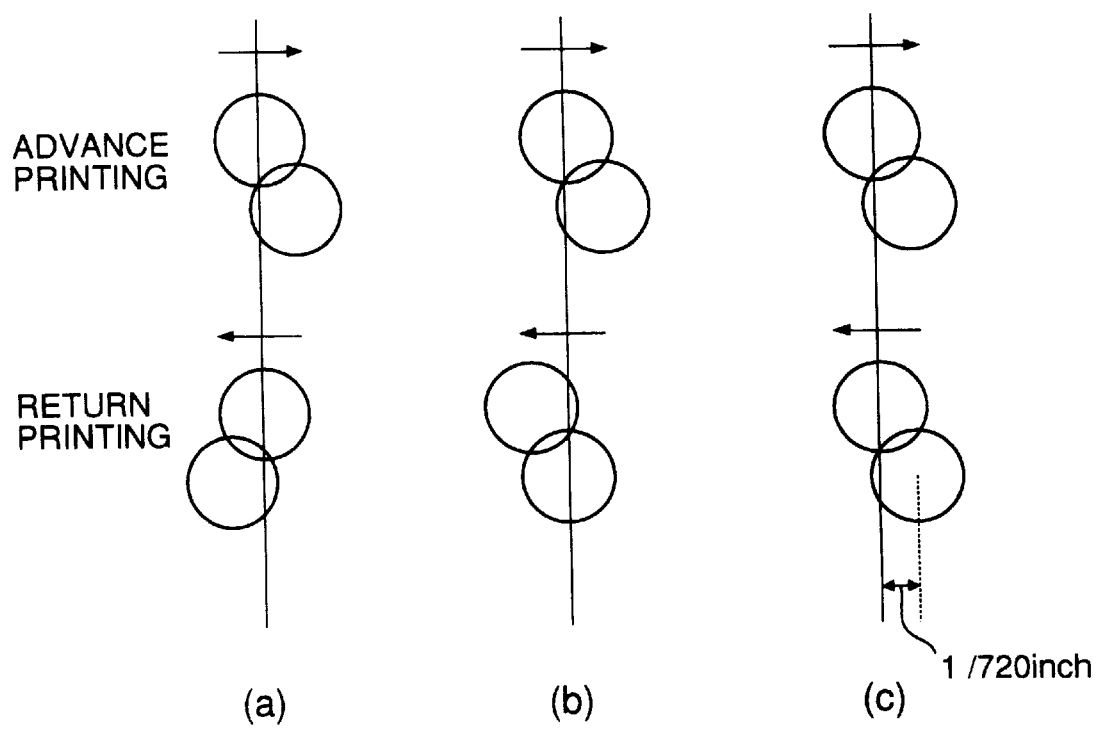
FIG. 19a–c are views illustrating timing of advance and return printing in reciprocal printing and shifts in shift printing.

When the conventional recording pattern shown in FIG. 2 is printed, the same recording pattern is obtainable from simple advance-return operations. As described in the embodiment 1, however, the inclined nozzle train is mounted on the recording head as shown in FIG. 10 to use the ink droplet discharged from each nozzle for recording without shifting in the printing direction. Consequently, it is only necessary to reverse the order of grouped nozzles to be heated during advance printing like h, g, f. . . a during return printing. (U.S. Ser. No. 759,815 filed Aug. 30, 1991) If, however, return printing is made at the same timing at the time of reciprocal printing in shift printing, a recording pattern available shifts in the opposite direction unlike the case of advance printing as shown in FIG. 19(a). In order to obtain the same pattern that has been obtained from the advance printing, the operation of initially ANDing with [AA] and subsequently with [55] in the advance printing should be reversed, that is, the operation of initially ANDing with [55] and then with [AA] should be performed. FIG. 19(b) shows the result of the operation thus performed and printing timing that has been shifted, though the figure is similar to what has been shifted in the advance printing.

Figure 1:
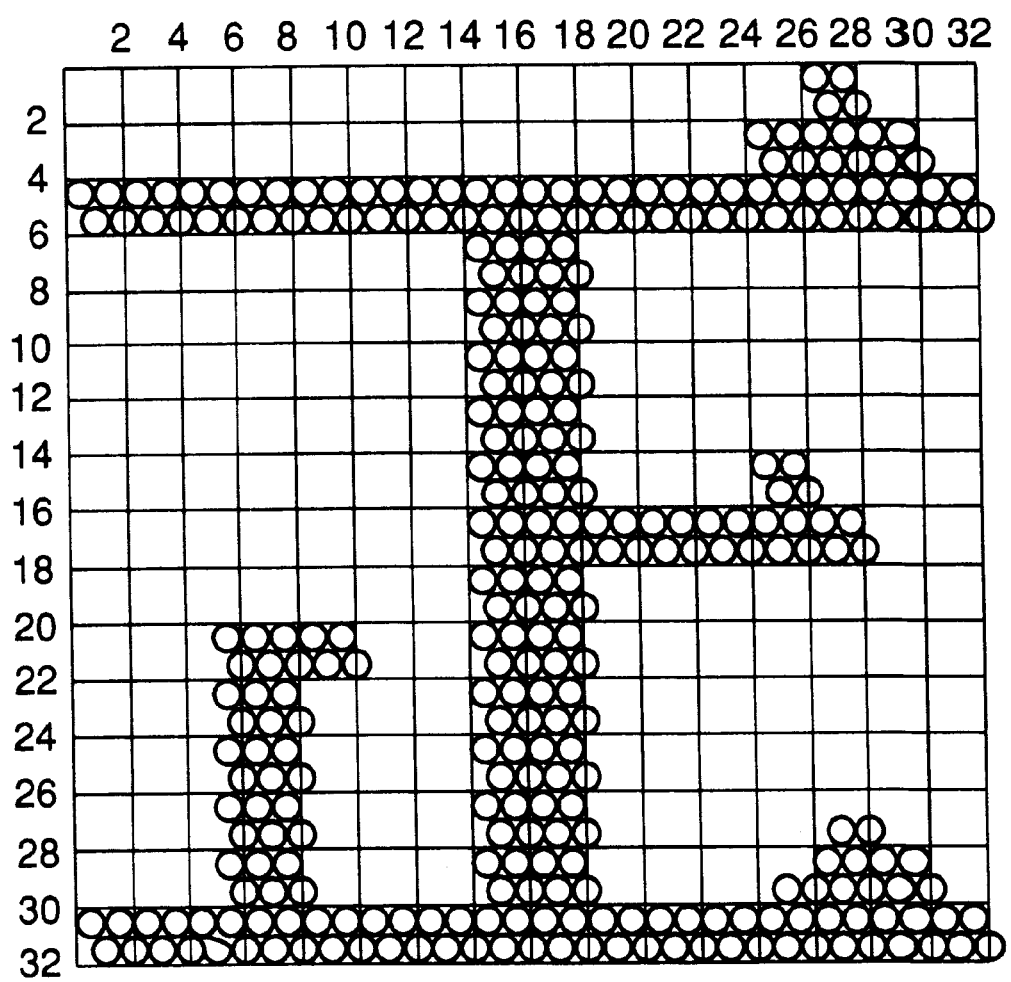
FIG. 1 is a view illustrating a shift printing image.

Therefore, the printing position is shifted further by 1/720 inch, that is, printing should be started 163μ seconds earlier as far as the recording timing is concerned. Moreover, the order of grouped nozzles to be heated likewise as in the case of the conventional recording pattern needs reversing. If the operation above is performed in the return printing, tile recording pattern in the shift printing shown in FIG. 1 will also be available in the return printing.

Figure 20:
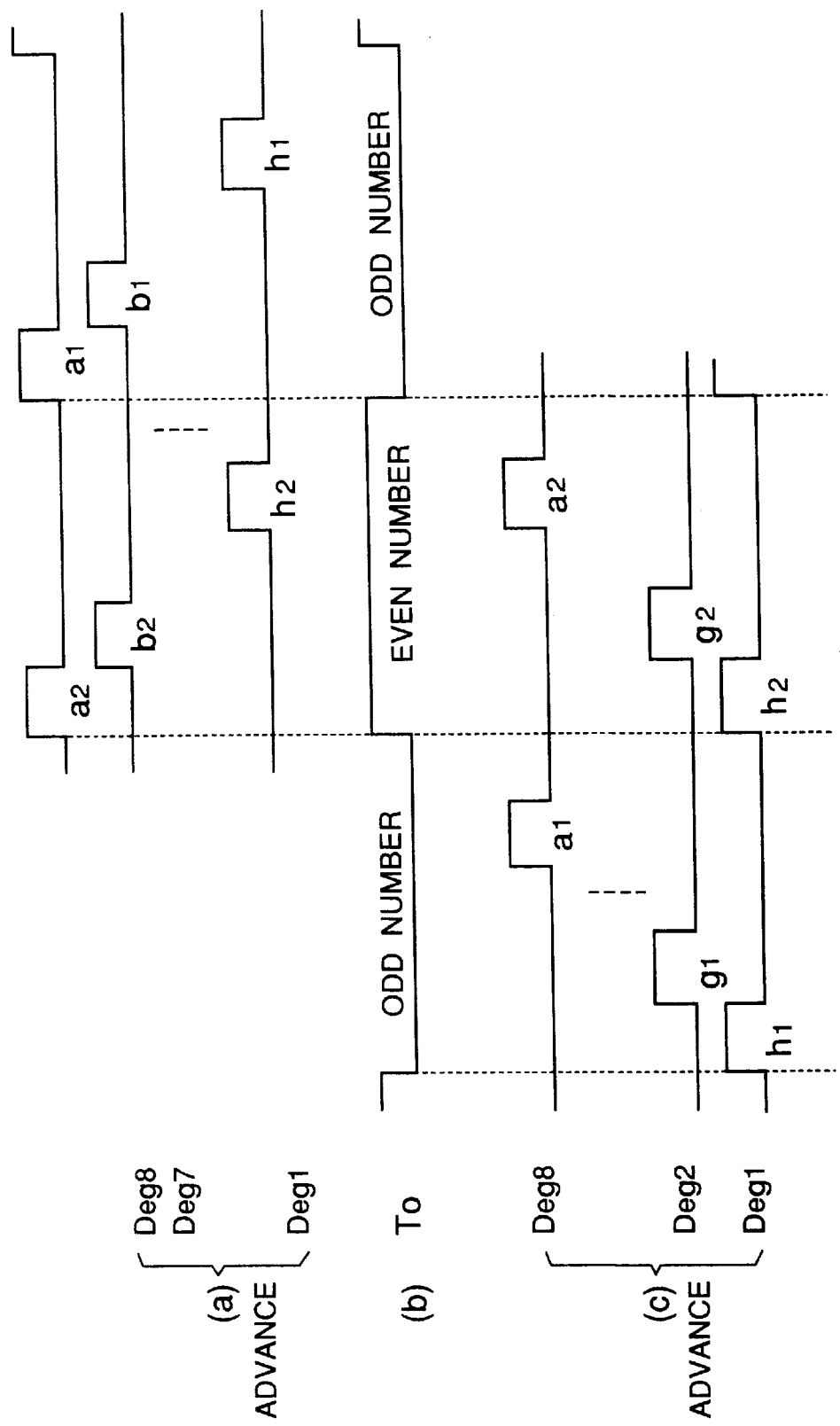
FIG. 20 is d view illustrating heating timing in reciprocal printing.

FIG. 20 shows heating timing in this embodiment. In the advance printing shown in FIG. 20 (a), even nozzles are first heated in the order of a, b,. . . h and odd nozzles are subsequently heated in the order of a, b . . . h. In the return printing shown in 20(c), printing is started earlier by half the heating internal of all nozzles than the advance printing and in contrast Lo the advance printing, the odd nozzles are first heated in the order of h, g,. . . a, whereas the even nozzles are then heated in the order of h, g,. . . a. A signal To in FIG. 20(b) determines whether even or odd nozzles are to be selected.

Figure 22:
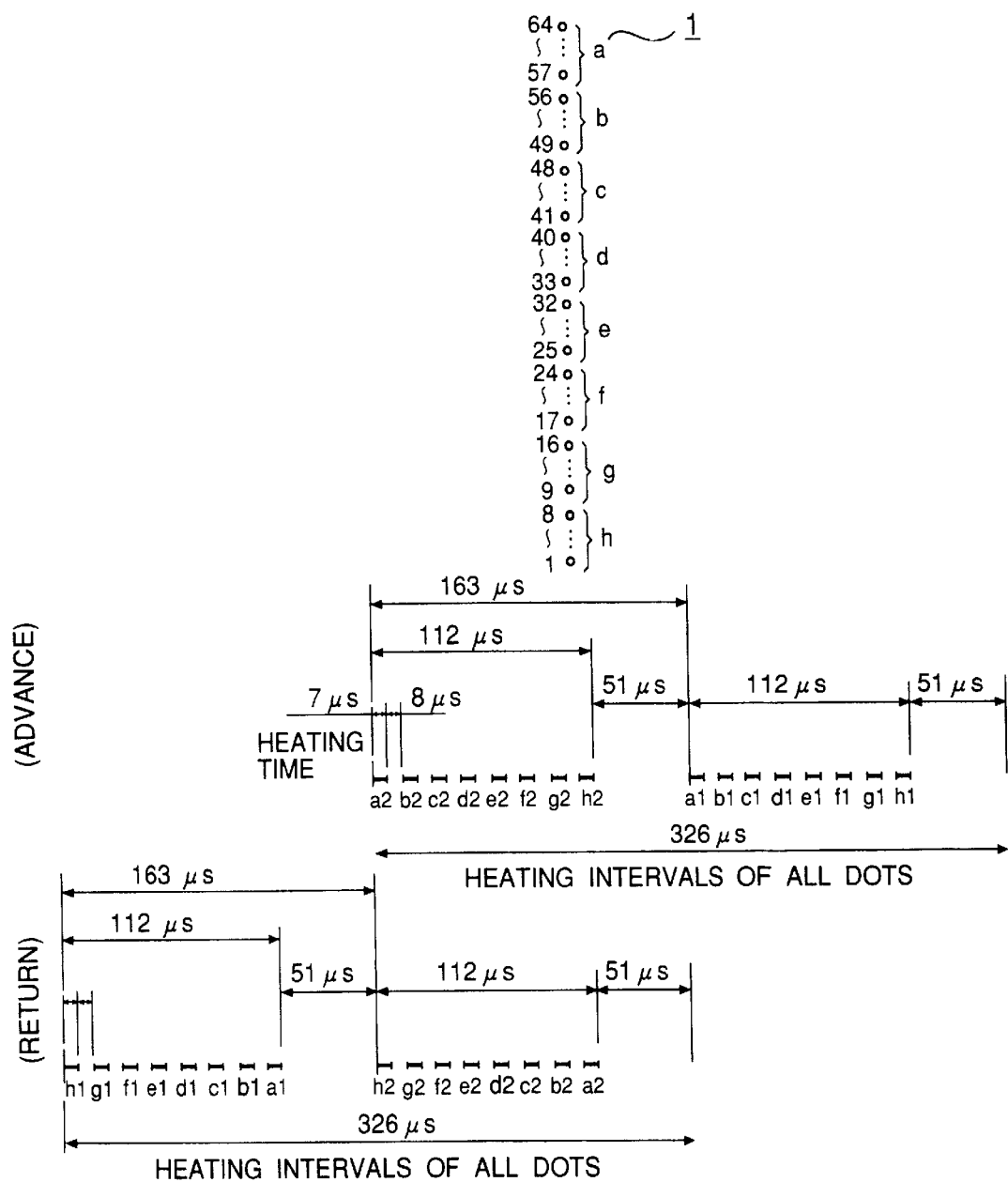
FIG. 22 is a view illustrating different printing timing in reciprocal printing according to the present invention.
Figure 23:
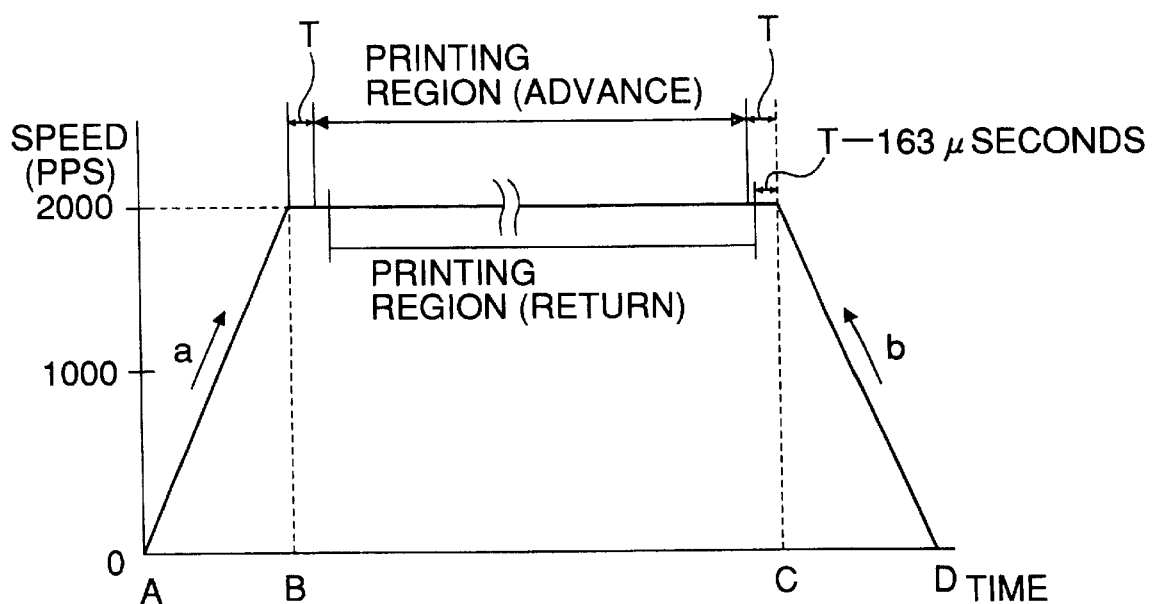
FIG. 23 is a view illustrating the starting of reciprocal printing in shift printing according to the present invention.
Figure 24:
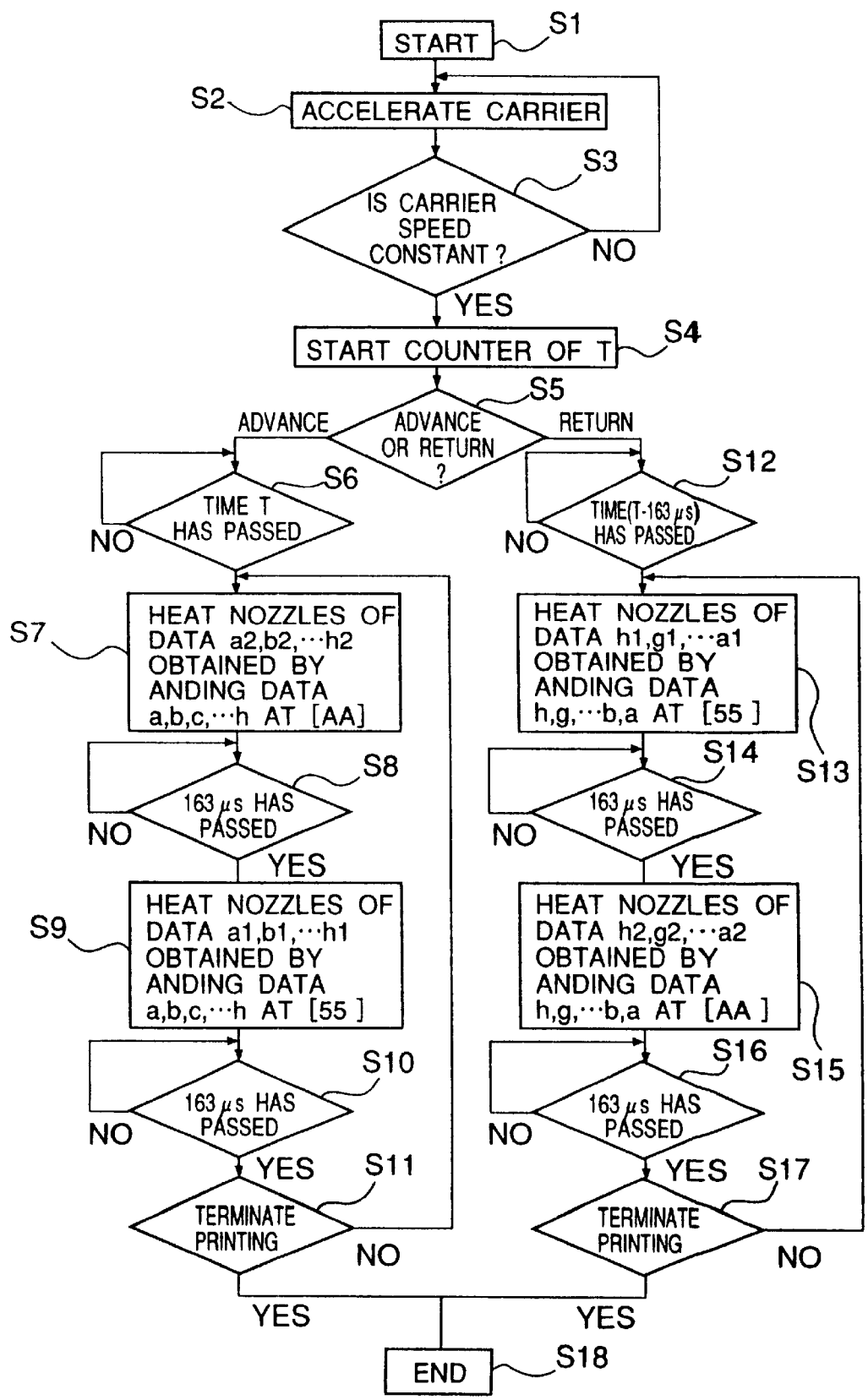
FIG. 24 is a view illustrating a reciprocal printing flowchart in shift printing according to the present invention.

FIG. 21 shows the timing of reciprocal printing corresponding to FIG. 12. As shown in FIG. 21, printing is started earlier by half the heating interval of all dots, that is, by 163μ seconds in view of timing as the dot in the return printing is typed at a position preceding by ½ of 1/720 inch of the basic grid in the advance printing. Moreover, the odd nozzles are heated first and the order of grouped nozzles to be heated in the advance printing is reversed in the return printing. FIG. 22 shows the timing of reciprocal printing corresponding to FIG. 14. FIG. 23 illustrates the timing of starting printing in the reciprocal printing. FIG. 24 shows a flowchart at the time the advance or return printing is made according to the present invention. As shown in FIG. 23, the carriage is accelerated until a predetermined speed is reached after it starts scanning and when time T has passed after the termination of acceleration, the advance printing is started (in the direction of a). In the case of the return printing (in the direction of b), as printing is started earlier by 163μ seconds, printing is started when T-163μ seconds have passed after the termination of acceleration of the carriage. The speed is defined by the pulse (pulse per second) applied to a carriage motor (pulse motor) for moving the carriage. Referring to FIG. 23 and the flow chart of FIG. 24, the flow of the reciprocal printing will subsequently be described. When the printing of one line is started, the carriage is accelerated until a predetermined speed is reached and when a constant speed is attained, a counter of T is started. In the case of the advance printing, a starting point is A (FIG. 23) and the counter of T is started at point 3 (FIG. 23). After time T has passed, the even nozzles are first used for printing and after 163μ seconds including heating and refilling time have passed, the odd nozzles are used for printing. Printing of the next line is made after the termination of heating and refilling the odd nozzles. The operations above are repeated until the printing of one line is terminated. In the case of the return printing, a starting point is D (FIG. 23) and the counter of T is started at point C (FIG. 23). After time (T-163μ seconds) has passed, the odd nozzles are first used for printing and after 163μ seconds including heating and refilling time have passed, the even nozzles are used for printing. Then printing of the next line is then made. The operations above are repeated until the printing of one line is terminated.

By repeating the operations above, the shifting printing is applicable to the reciprocal printing designed to make printing even during the return operation after the scanning of the recording head. The delicate shift resulting from the advance and return printing is obviated to the extent that the printing timing is shifted by shifting every dot. This makes possible the provision of a liquid jet recording apparatus capable of making excellent recording images at high speed.

As illustrated in this embodiment, the data ANDed with [AA] is first printed and subsequently what is ANDed with [55] is printed so that the order is set to render upper left-hand data alive in consideration of the left-to-right recording direction.

However, the present invention is not limited to this arrangement and it is quite acceptable to print the data ANDed with [55] first and subsequently what is ANDed with [AA] so as to make the upper left-hand data delay in order. In this case, the data are ANDed initially with [55] and subsequently with [AA] in the return printing.

Although the time at which the return printing is started has been hastened with the advance printing as a criterion in this embodiment, this may be reversed; in other words, the time at which the advance printing is started may be hastened to match the return printing.

(Embodiment 3)

A description will subsequently be given of a method of obviating image quality deterioration of vertical rules and the like when the characteristics of the recording head deteriorate, a difference in level at the joint when the recording pattern is bridged over a plurality of lines and a difference in density at the joint resulting from superimposing ink in typing in the ink jet recording apparatus capable of shift printing with reference to the first embodiment.

When recordings are made in accordance with the shift printing and particularly when rules and the like bridged over a plurality of lines are printed, there has been a case where image quality is lowered as the characteristics of the recording head deteriorate.

Figure 25:
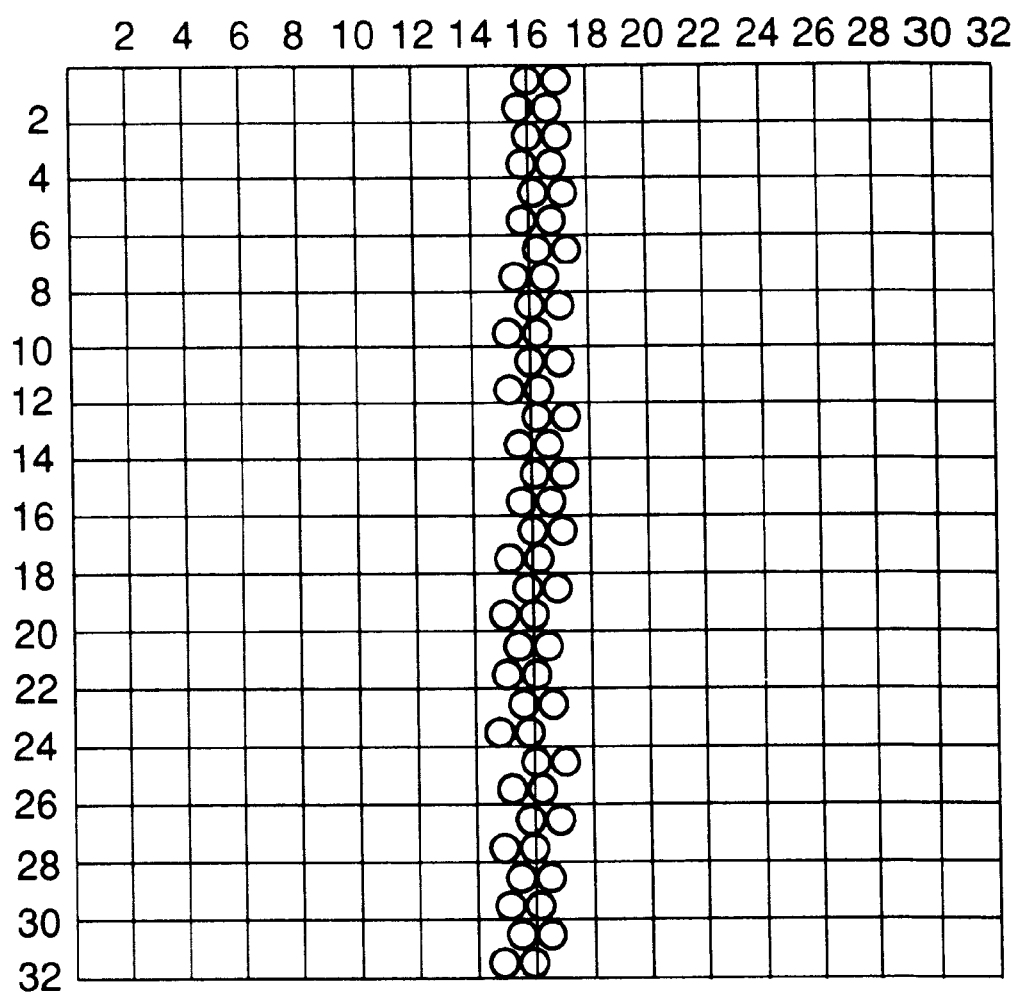
FIG. 25 is a view illustrating the results of shift printing made by a recording head whose ink shooting accuracy has deteriorated.
Figure 26:
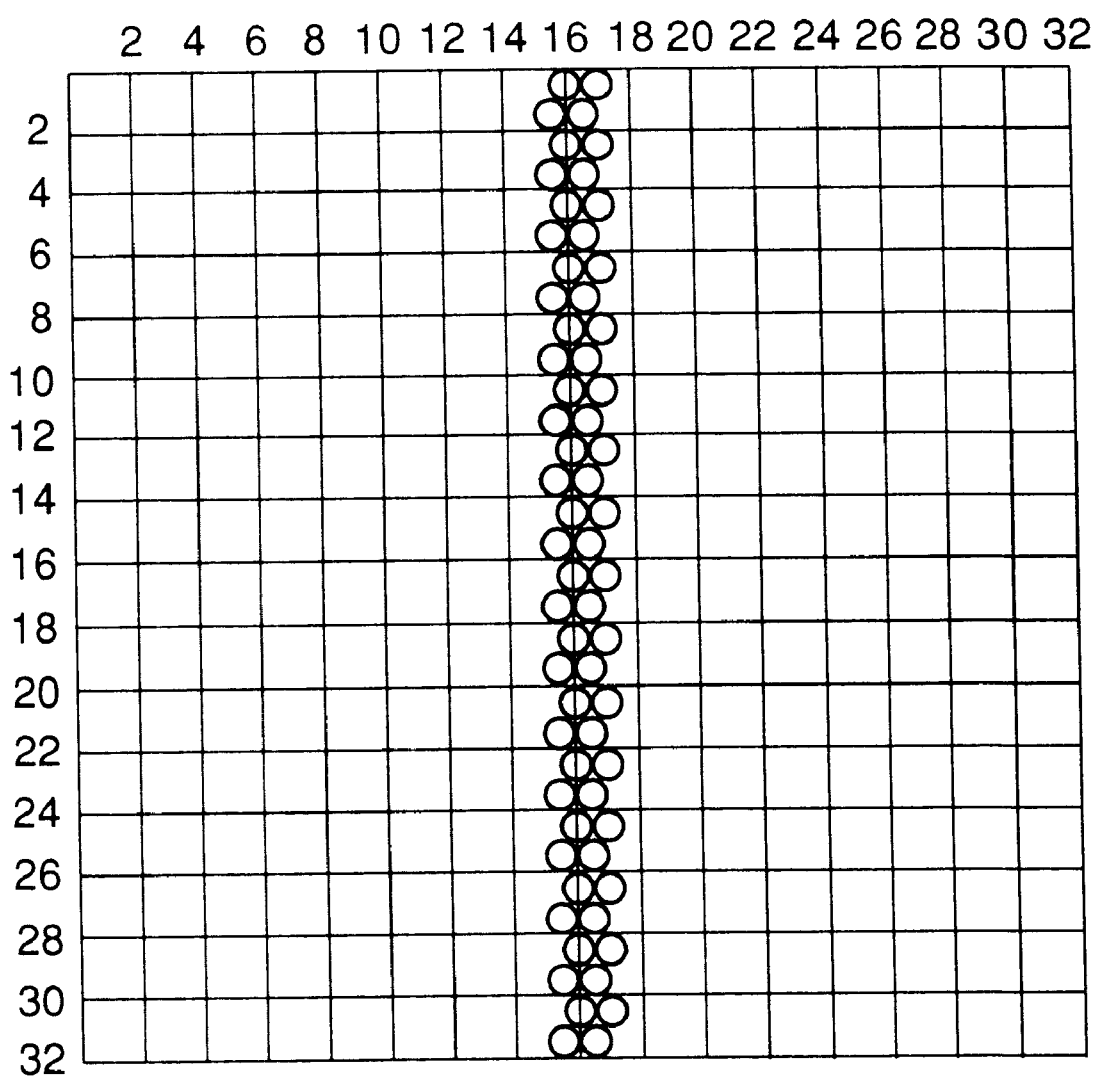
FIG. 26 is a view illustrating the results of shift printing made by a normal recording head.
Figure 27:
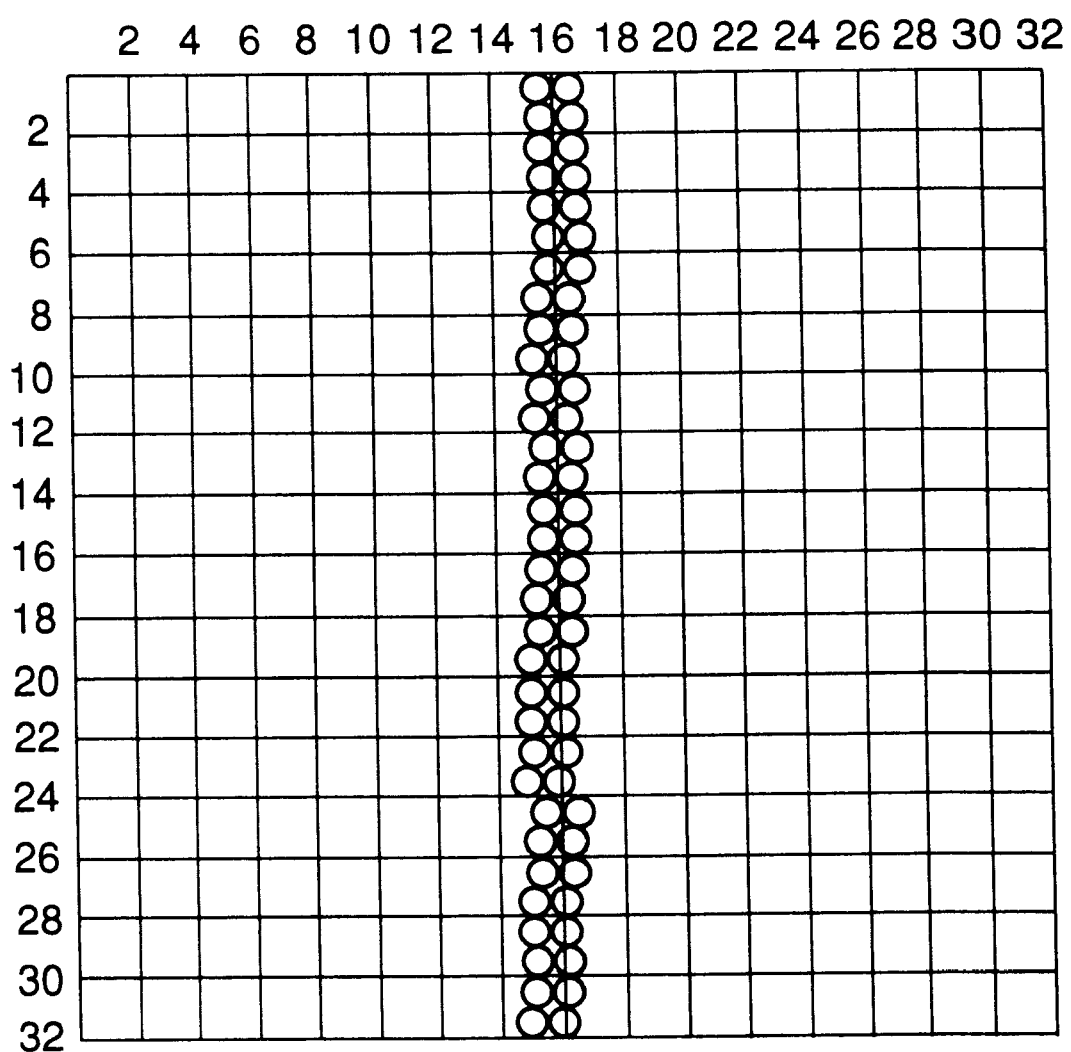
FIG. 27 is a view illustrating the results of ordinary printing made by a recording head whose ink shooting accuracy has deteriorated.
Figure 28:
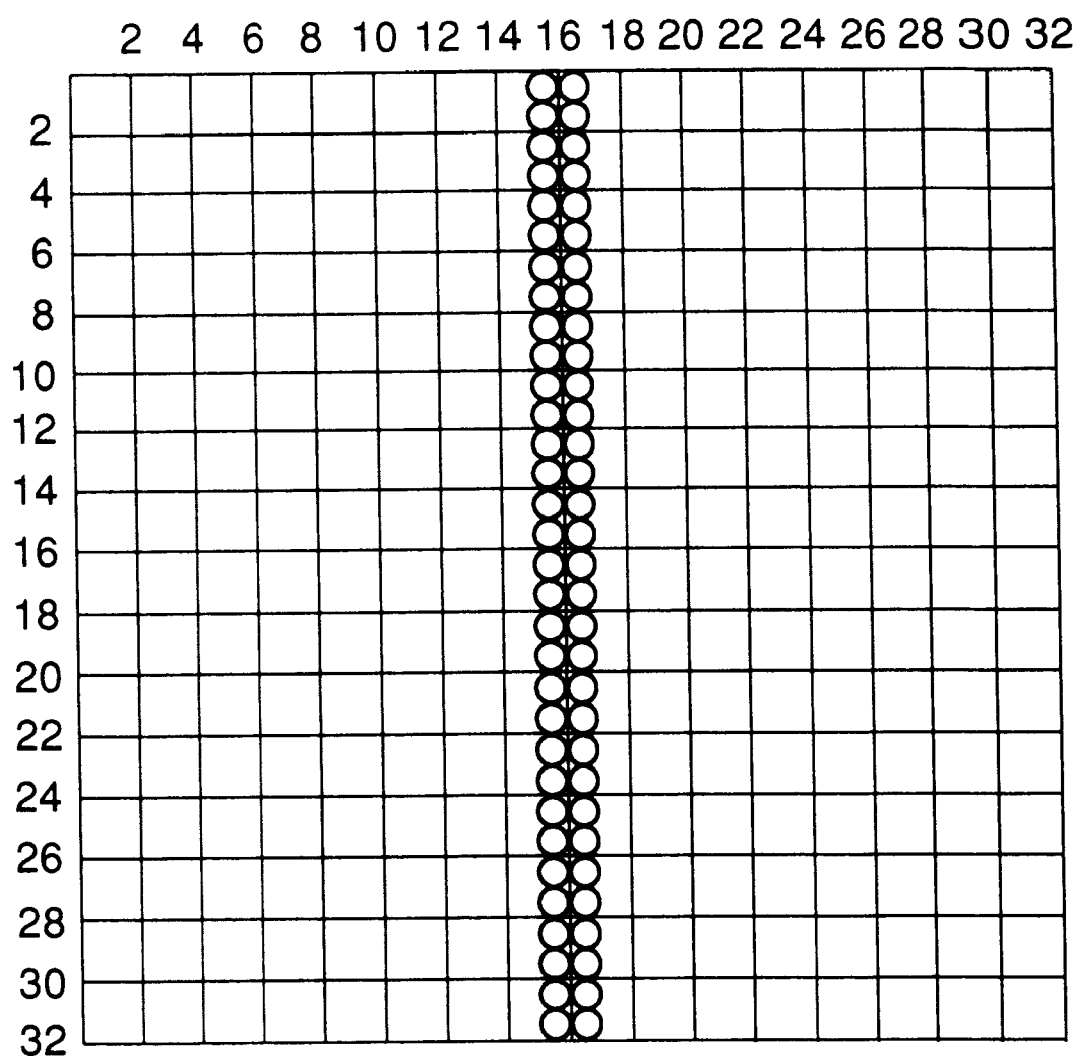
FIG. 28 is a view illustrating the results of ordinary printing made by a normal recording head.

FIG. 25 shows an example in which the characteristics of the recording head deteriorate when a vertical line horizontally having two dots and vertically 32 dots is recorded in accordance with the shift printing. In this example, the horizontal landing positions of ink droplets are seen to have fallen into disorder as the characteristics of the recording head deteriorate. FIG. 26 shows the results of recording when the characteristics of the recording head remains normal. FIGS. 27 and 28 show the corresponding results of recording made through an ordinary printing method without the application of the shift printing. Like FIG. 25, FIG. 27 shows the results of recording when the characteristics of the recording head have deteriorated, whereas like FIG. 26, FIG. 28 shows the results of recording while they remain normal.

Figure 29:
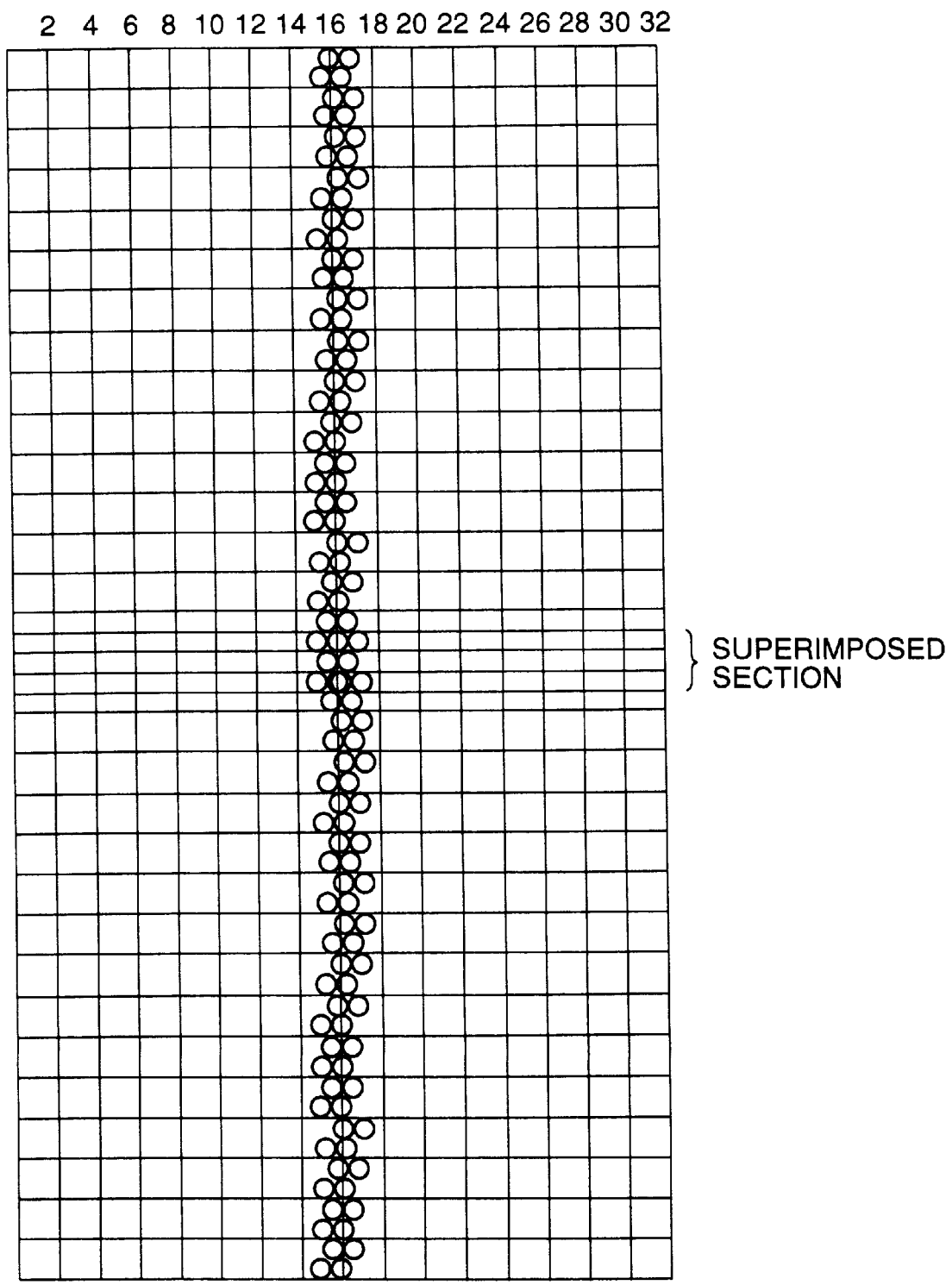
FIG. 29 is a view illustrating the results of recording over a plurality of lines in shift printing made by a recording head whose horizontal ink shooting accuracy has deteriorated.
Figure 30:
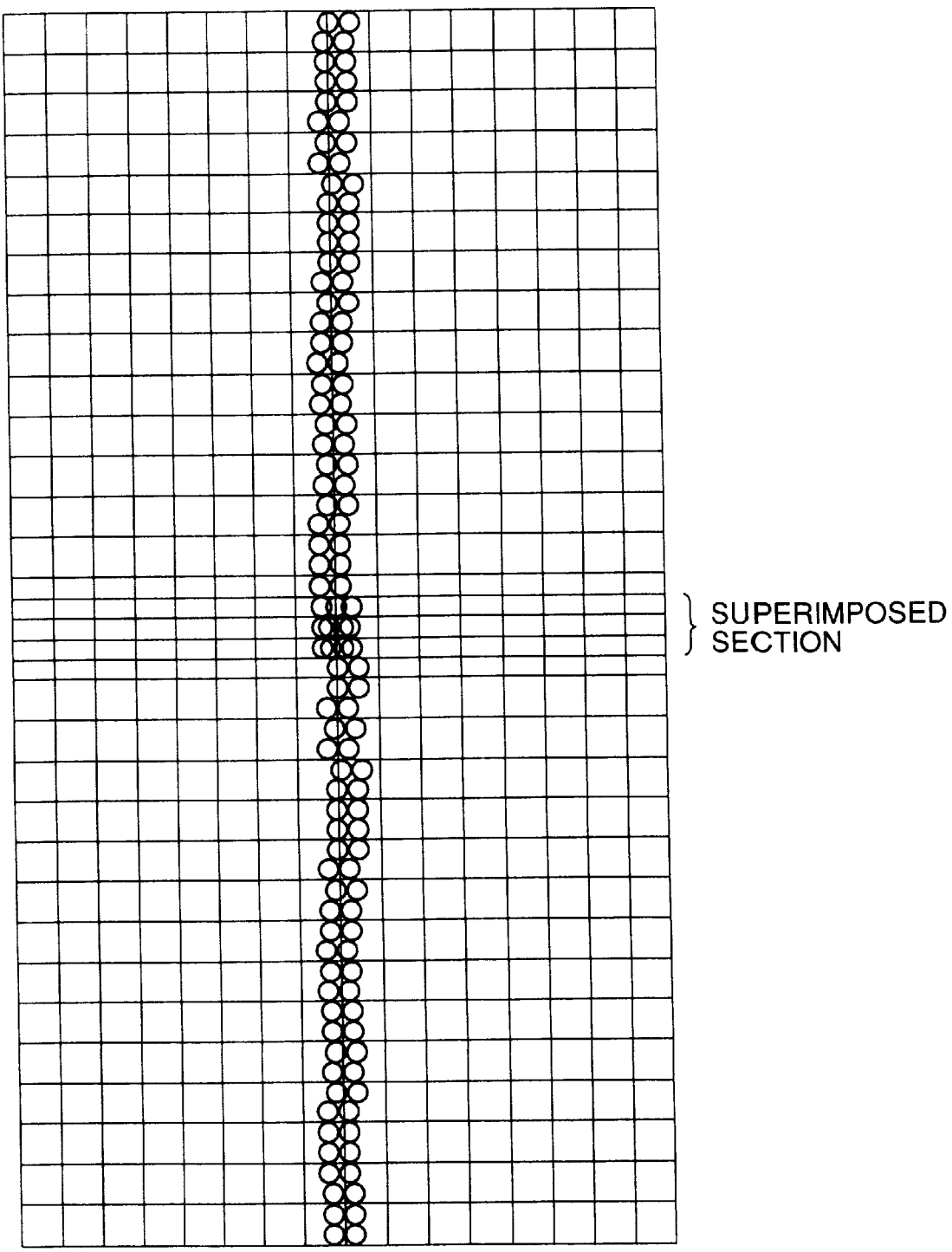
FIG. 30 is a view illustrating the results of recording over a plurality of lines in ordinary printing made by a recording head whose horizontal ink shooting accuracy has deteriorated.

In the case of recording the vertical rule bridged over a plurality of lines, the lowermost and uppermost portions of a recording pattern are so arranged that three dots, for instance, are superimposed to prevent the line-to-line joint from opening because of the variation of paper feed accuracy. Consequently, it poses a problem even at the line-to-line joint that the image falls into disorder as the characteristics of the recording head deteriorate. FIG. 29 shows a rule resulting from the deterioration of the characteristics of the recording head in shift printing and FIG. 30 what results from the deterioration of the characteristics of the recording head in ordinary printing. In printing the recording pattern bridged over a plurality of lines, a difference in level at the line-to-line joint in the shift printing is accentuated and becomes more conspicuous than that in the ordinary printing when the characteristics of the recording head have deteriorated.

Since the dot has been typed twice at the line-to-line joint, moreover, the density of the joint becomes higher than that of the remaining image portion. The difference in density may increase in the shift printing as the dot is typed again at the gap produced by shifting. for this reason, the difference in density at the line-to-line joint in the shift printing becomes more conspicuous than in the ordinary printing when the recording pattern bridged over a plurality of lines.

Figure 31:
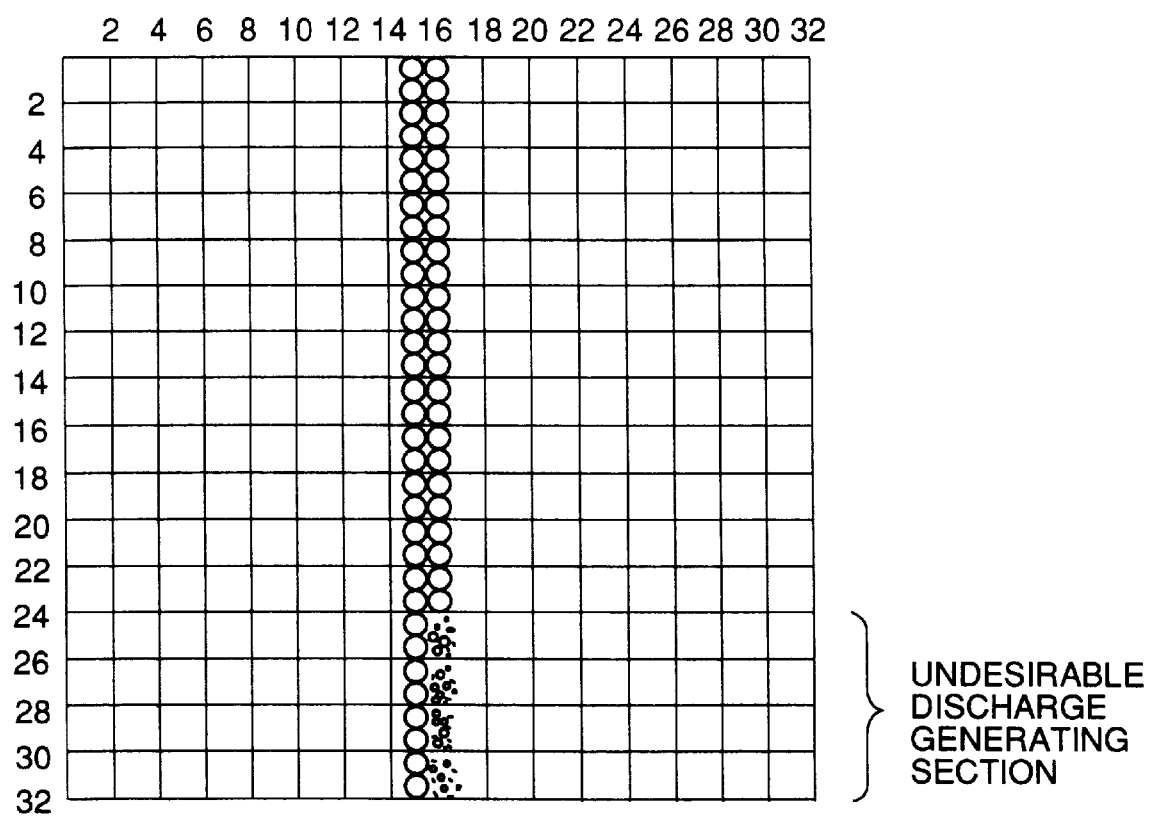
FIG. 31 is a view illustrating the deterioration of image quality due to delay in refilling in ordinary printing.

On the other hand, the reason for the difference in level at the joint in the ordinary printing is attributed to the fact that, as described with reference to the shift printing, not one ink droplet but several droplets are used because one droplet is divided into more than several droplets. As the refilling is delayed with respect to tho discharge frequency, power is supplied to the discharge heater before the nozzle is sufficiently filled with ink. Consequently, a liquid droplet of the size required for image formation is not formed. In other words, such a droplet may be divided into a plurality of droplets or discharged in the form of mist. This phenomenon, which is called undesirable discharge, tends to arise in the printing of rules or the like whore the whole nozzle train of the head is used for printing. FIG. 31 shows an example of the phenomenon in which image quality deterioration is seen in the lower part and this is because among the nozzles Lo be simultaneously driven, what is driven later is most likely to undergo a delay in refilling and because the nozzle train is driven sequentially in top-to-bottom order in this embodiment.

Figure 32:
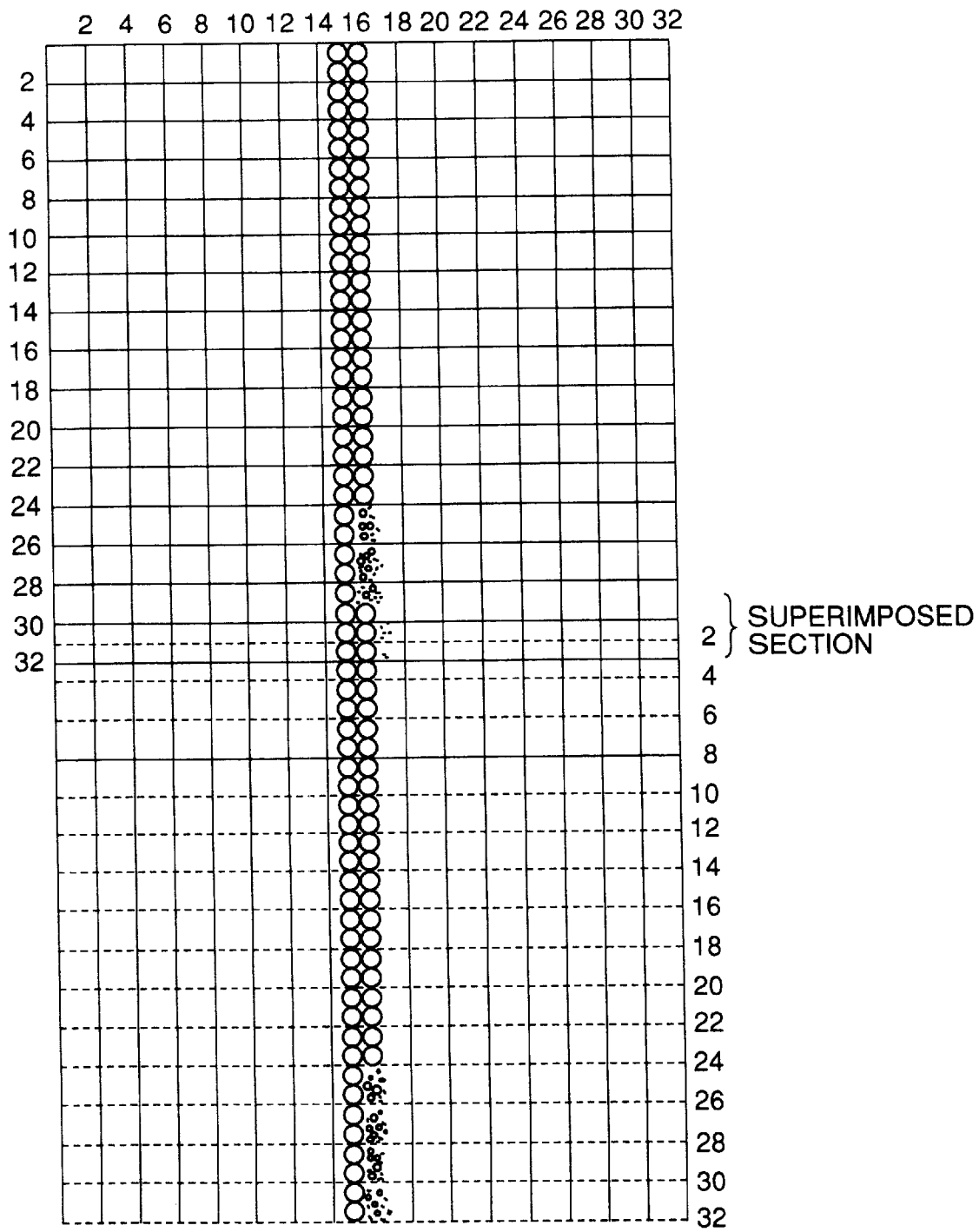
FIG. 32 is a view illustrating a case where deterioration of image quality over a plurality of lines results due to delay in refilling in ordinary printing.

FIG. 32 exemplifies a case where a plurality of lines are continuously recorded. As illustrated, a difference in level in a superimposed section between the lines presents a striking contrast.

The ink jet recording apparatus according to the present invention is made to solve the foregoing problems includes a first driving means for performing ordinary printing and a second driving means for performing shift printing. When a desired recording pattern is bridged over a plurality of lines, the first driving means is used for recording and when it is not bridged over the plurality of lines, the second driving means is used for recording, whereby adequate results of recording are made obtainable without contrasting a difference in level in the recording pattern bridged over the plurality of lines even when recording characteristics such as the ink landing accuracy of a recording head deteriorates.

Moreover, the ink jet recording apparatus is provided with a first recording mode in which the first and second driving means are combined and a second recording mode in which the second driving means for use mainly in shift urinling is used for recording. These recording modes are provided in such a way that the user is allowed to select either of them and when the difference in level is contrasted by the deterioration of a recorded image due to the division of an ink droplet causing a delay in refilling, the difference in level at the joint is can be reduced by selecting the second recording mode (shift printing).

Figure 33:
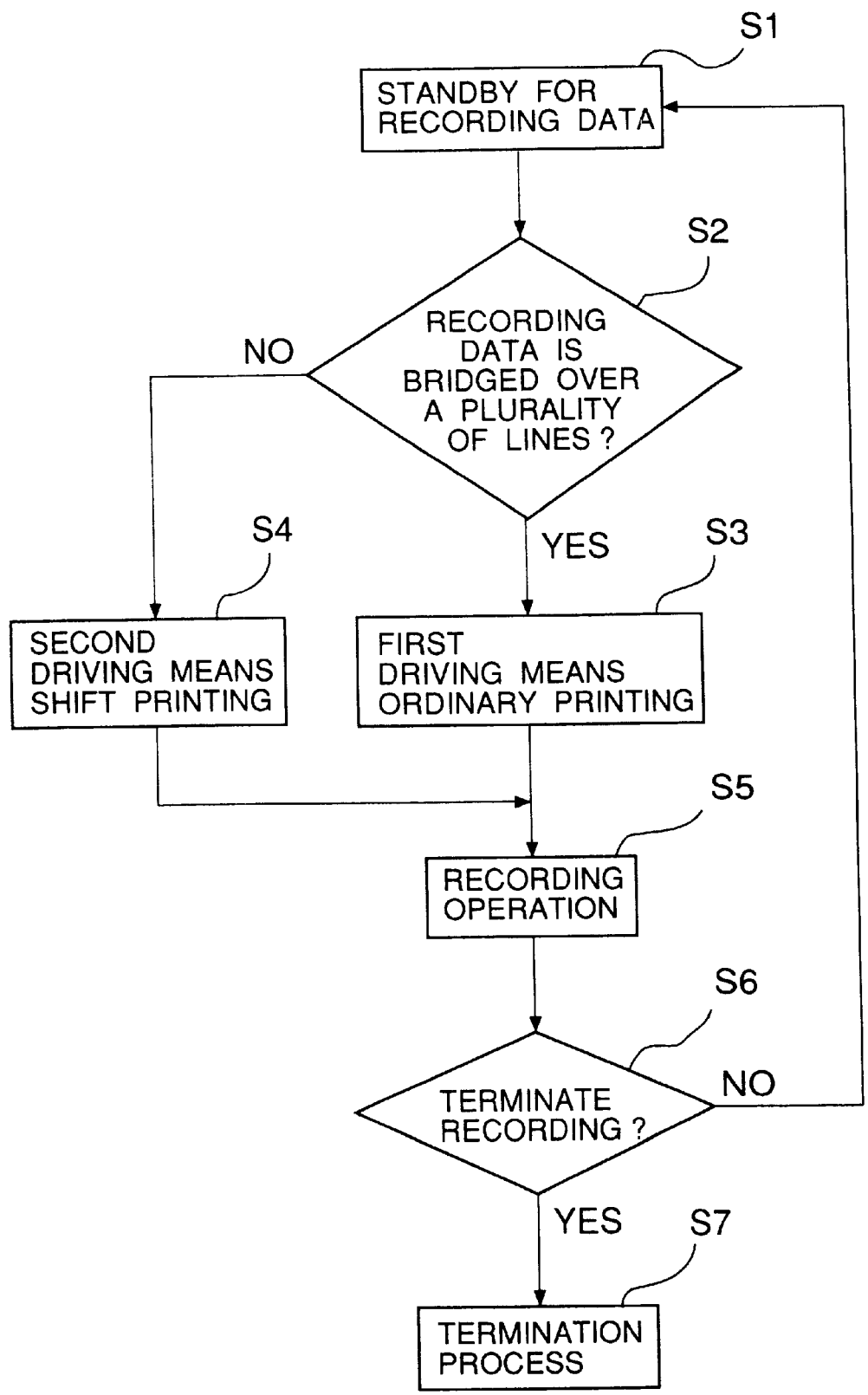
FIG. 33 is a flowchart illustrating the switching of first driving means to and from second driving means in a third embodiment of the present invention.

As the configuration of the apparatus used in this embodiment is similar to what has been described in the first embodiment, the detailed description thereof will be omitted. Referring to FIG. 33 to start with, this embodiment will be described.

As shown in FIG. 33, a decision is made on whether the recording pattern transmitted is bridged over a plurality of lines or whether it is composed of only one line at Step S2 when recording data is transmitted at step S1 and the driving means corresponding to either recording pattern is selected and used for recording.

When the recording pattern is bridged over a plurality of lines in this embodiment, the first driving means for ordinary printing is operated at Step S3. When the recording pattern is not bridged over a plurality of lines, the second driving means for shift printing is operated for recording at Step S4. As shown in FIG. 33, a decision is made on whether recording has been terminated at Step 56 after a recording is made at Step S5. Then Step S1 is followed again when recording data exists and the next recording is made. When the recording has been made, a termination process at Step S7 is performed and the recording operation is terminated.

Since the recording pattern bridged over the plurality of lines is recorded by ordinary printing as described above, a disorder of the image and the difference in level at the joint resulting from the deterioration of the characteristics of the recording head are reducible. Since the recording pattern not bridged over the plurality of lines is recorded by shift printing, moreover, the time required for ink refilling shortens, thus making a good stable image available.

A description will subsequently be given of the apparatus equipped with the first recording mode in which the first and second driving means and the second recording mode in which only the shift printing is used for recording by means of the second driving means, the recording modes being provided in such a way that the user is allowed to select either of them.

Figure 34:
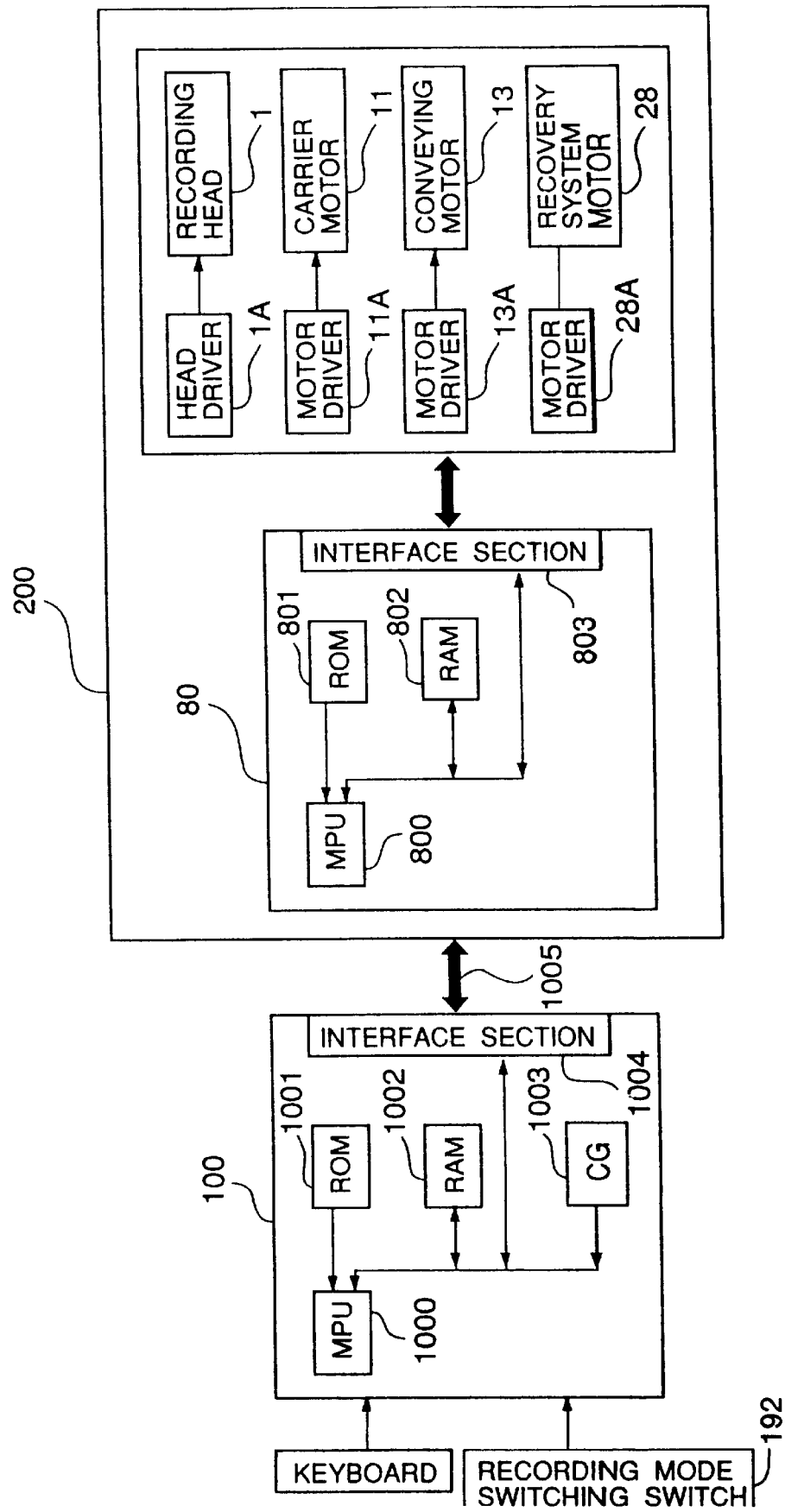
FIG. 34 is a view illustrating a circuit of drive control means in the third embodiment of the present invention.

The recording apparatus is provided with a recording mode switching switch 192 as shown in FIG. 34. When the difference in level is contrasted because of the deterioration of the according characteristics of the recording head at the joint between lines of the recording pattern bridged over the plurality of lines, the selection of either mode is made by the user of the apparatus. While the switch 192 is held ON, for instance, either shift or ordinary printing method for recording is selectable in accordance with the construction of fee recording pattern involve.

Figure 35:
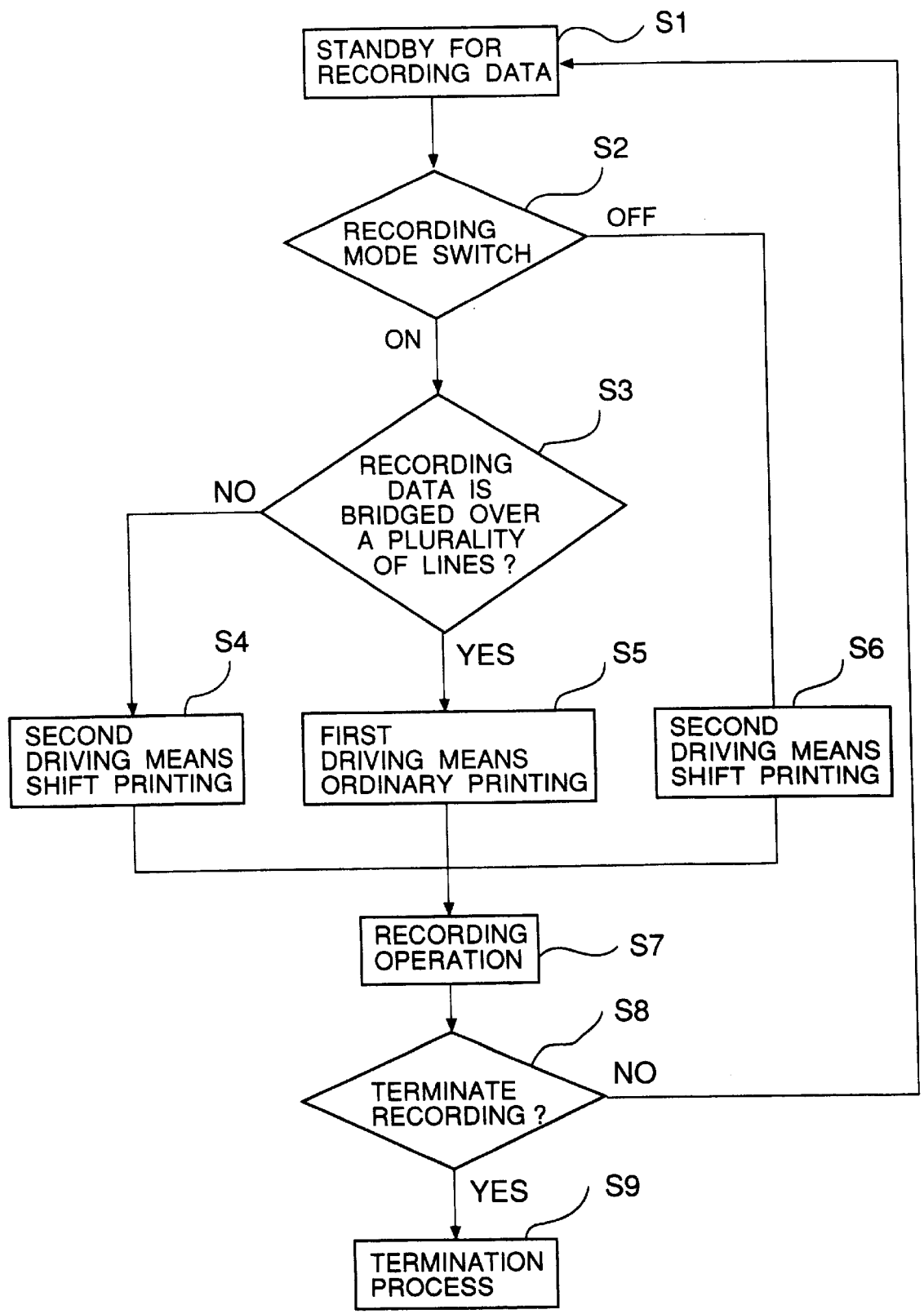
FIG. 35 is a flowchart illustrating the switching of first driving means to and from second driving means in the embodiment 3 of the present invention.

When recording data is transmitted at Step S1 in FIG. 35, a decision is made on whether the recording-mode switching switch 192 is held ON or OFF at the following step S2. While the switch is held OFF, the second driving means is used for recording, without regard to whether the recording pattern is bridged over the plurality of lines or not.

While the switch is held ON, Step S3 is followed and a decision is made on whether the recording data transmitted is bridged over a plurality of lines or is composed of only one line. Then the driving means corresponding to the recording pattern involved is selected and used for recording. In this embodiment, like the first embodiment, the first driving means for ordinary printing is operated with respect to the recording pattern bridged over a plurality of lines, whereas the second driving means for shift printing is operated with respect to the recording pattern not bridged over a plurality of lines.

As set forth above, the ink jet recording apparatus is provided with a recoding mode in which the first and second driving means are combined and the second recording mode in which the second driving means for use mainly in shift printing is used for recording. These recording modes are provided in such a way that the user is allowed to select either of them and when the difference in level is contrasted by the deterioration of a recorded image due to the division of an ink droplet causing a delay in refilling, the difference in level at the joint is made reducible by selecting the second recording mode (shift printing).

Although a description has been given of the apparatus in which switching between modes is effected by the switch, the present invention is not limited to the use of the switch as hardware for switching the recording mode. In other words, such a switch may be implemented by software that is capable of keyboard switching.

(Embodiment 4)

A description will subsequently be given of intermittent printing as one of the methods for obviating the difference in level observed at the joint between lines in tho ink jet recording apparatus capable of shift printing as describe in the embodiment 1.

Figure 37:
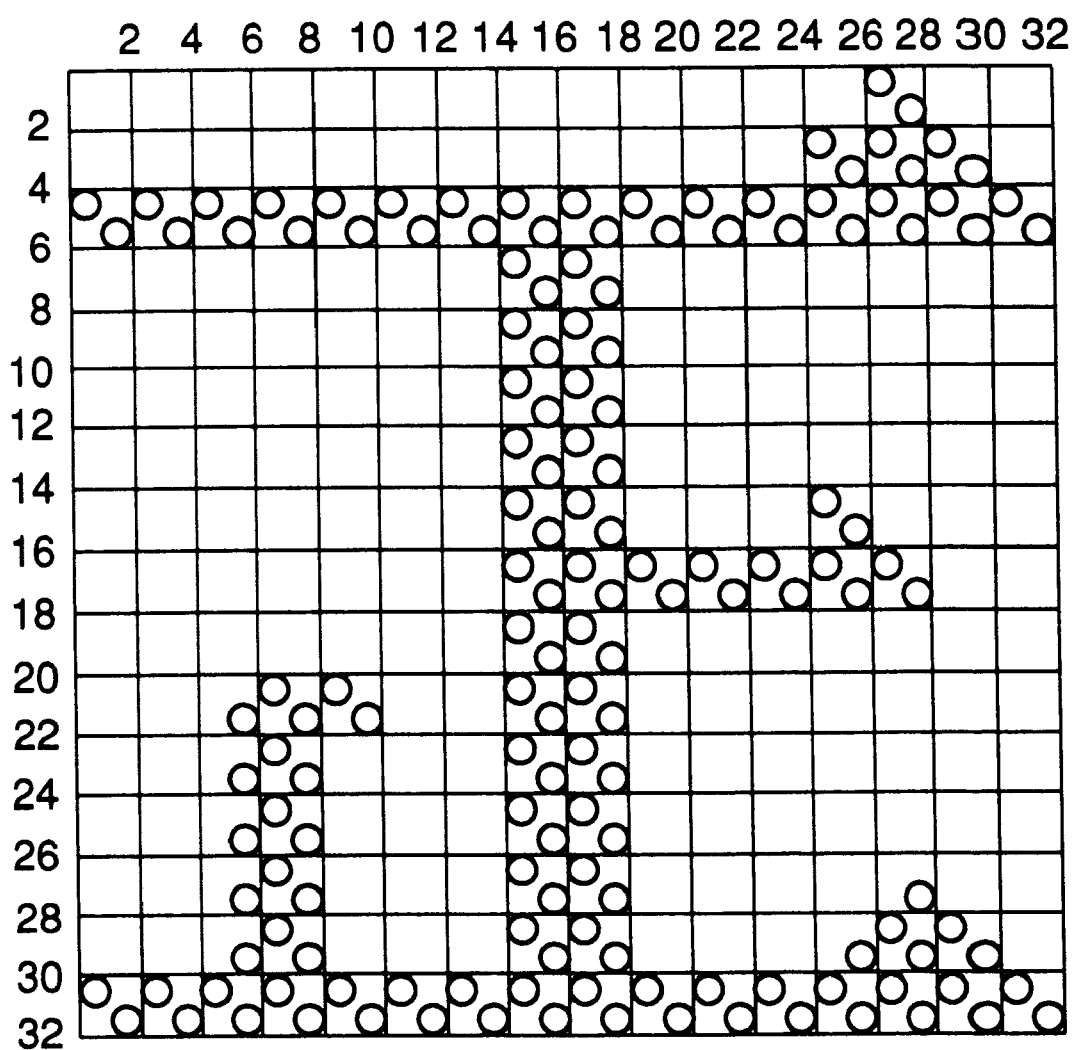
FIG. 37 is a view illustrating a recording pattern in normal recording by thinned-out printing.

Referring to FIG. 36 illustrating a dot matrix of vertical 12 dots by horizontal 12 dots, an example of intermittent printing will be described. (a) exemplifies an ordinary recording pattern by means of the dot matrix. (b) illustrates the recording pattern formed by thinning out diagonally located 2 dots with 4 dots of vertical 2× horizontal 2 as a set. FIGS. 37, 38 exemplify recording patterns thinned out by similar techniques. FIG. 37 shows a thinned ordinary printing pattern of FIG. 2. FIG. 38 shows the recording pattern formed by shifting with the thinning of the same dots as those shown in FIG. 37.

Figure 39:
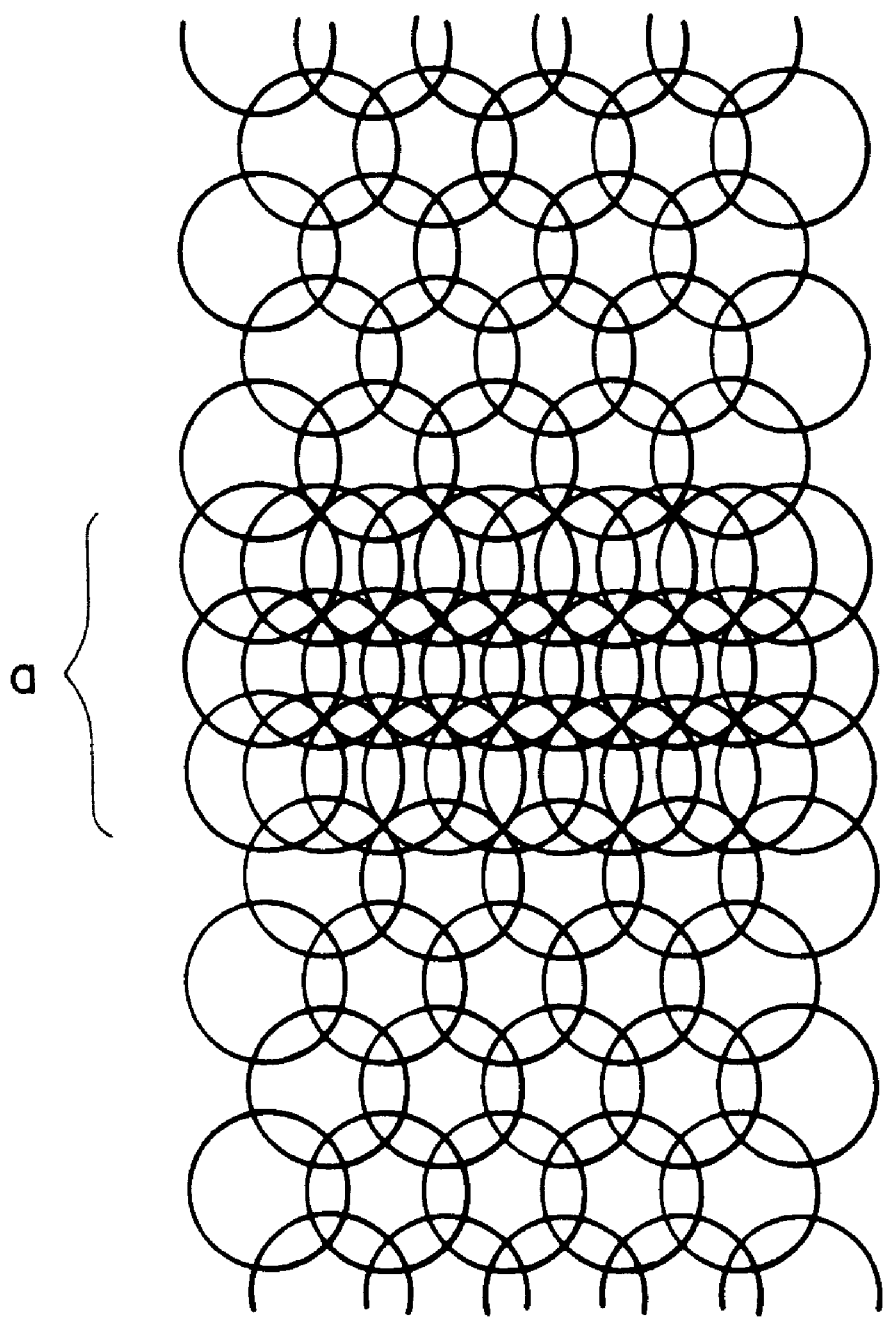
FIG. 39 is a view illustrating superimposed dots at line-to-line joints.
Figure 40A:
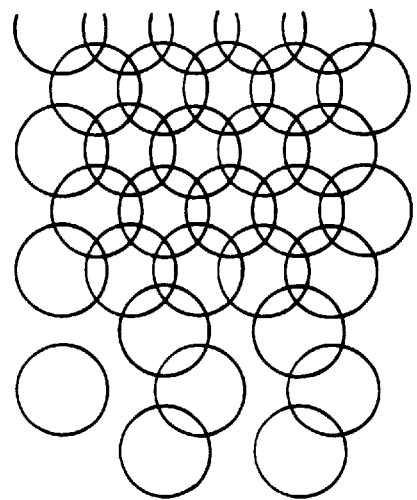
FIGS. 40A and 40B arc views illustrating dots to be thinned out in superimposed parts between lines.
Figure 40B:
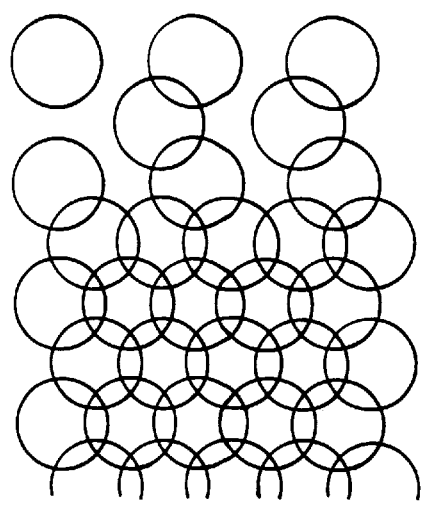
Figure 41:
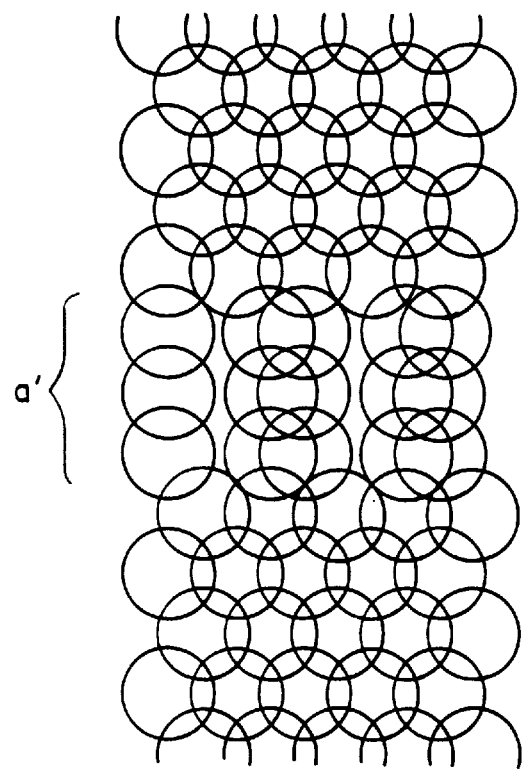
FIG. 41 is a view illustrating superimposed dots recorded when superimposed parts are thinned out.

Taking a rule as an example, the technique of thinning the joint will subsequently be described. FIG. 39 shows a joint section of the rule recorded without thinning. The section where two superimposed lines are recorded is designated by a and 3 dots are superimposed in this embodiment. FIG. 40A refers to a case where these two lines are split so as to thin out lower 3 dots on the initial line to be recorded as in the case of FIG. 38. FIG. 40B also refers to a case where upper 3 dots on the following line to be recorded are thinned out likewise. FIG. 41 illustrates superimposed two lines thus thinned out as shown in FIGS. 40A and 40B. Reference character a' represents a section where the two lines are superimposed. The density of the superimposed section is lower than that of what has been formed without thinning but not lower than that of any section other than the joint. Although there exists a portion where no ink has been typed within a', its range is extremely small and that portion resulting from ink blotting or the shifting of the ink landing position is not externally apparent.

As set forth above, the difference in density between the joint and the other image portion is minimized by recording the thinned joint of the recording pattern bridged over the plurality of lines.

Figure 42A:
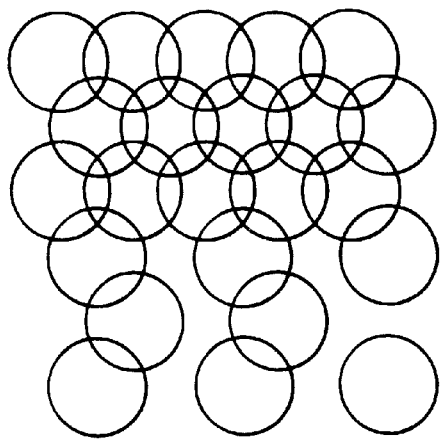
FIGS. 42A to 42C are views illustrating other thinning examples in line-to-line superimposed parts.
Figure 42B:
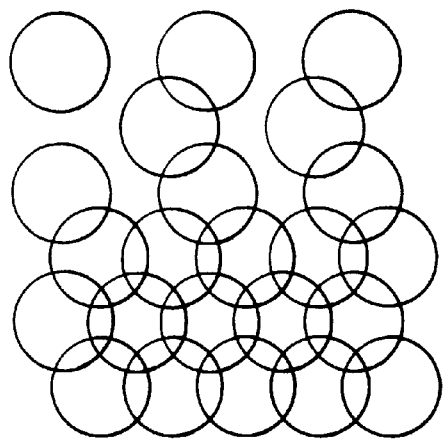
Figure 42C:
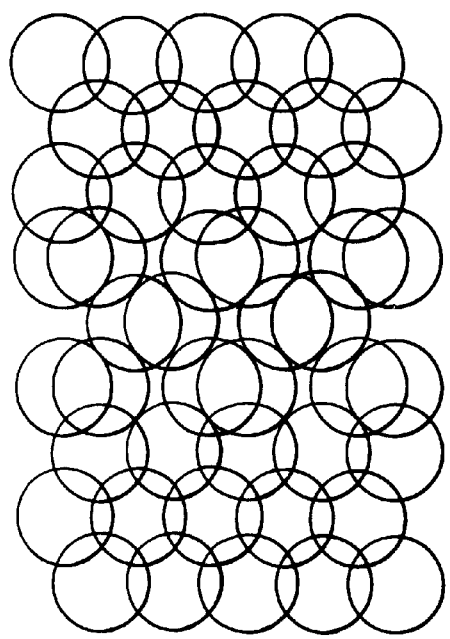

Although an example of thinning out diagonally located 2 dots with 4 dots of vertical 2× horizontal 2 as a set has been cited as a thinned-cut pattern in this embodiment, not only that example but also any other thinned-out pattern may be employed. FIG. 42 illustrates other thinned-out patterns. FIGS. 42A and 42B are magnified views of superimposed sections of recorded rules bridged over the plurality of lines, respectively. FIG. 42A refers to a case where lower 3 dots on a line to be initially recorded are thinned out, whereas FIG. 42B refers to a case where upper 3 dots on the next line to he recorded are thinned out. Although the diagonally located 2 dots with 4 dots of vertical 2× horizontal 2 as a set have been thinned out as in the case of the preceding example, a thinned-out pattern on the initial line to be recorded is made different from that on the following line in an example of FIG. 43. With the thinned-out pattern shown in this example, two lines are superimposed as shown in FIG. 42C, whereby the difference in density between the line-to-line superimposed section and the remaining image portion without being superimposed can be reduced.

Figure 43A:
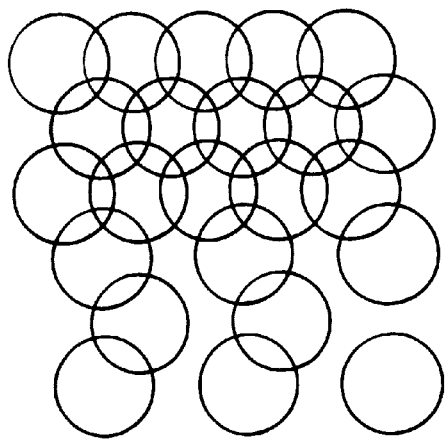
FIGS. 43A to 43C are views illustrating other one-sided thinning examples in line-to-line superimposed parts.
Figure 43C:
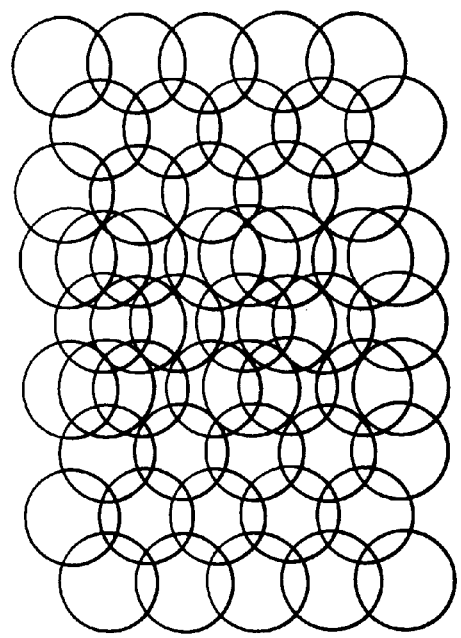
Figure 43B:
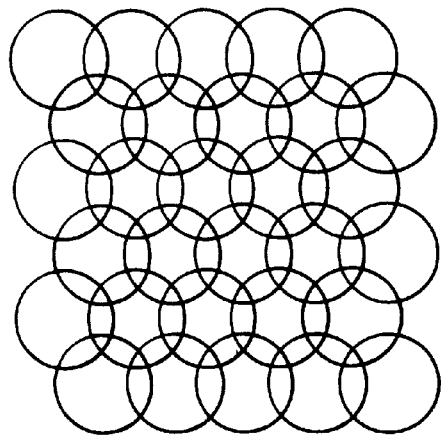

Although two of the lines corresponding to the superimposed section have been thinned out in the examples described above, it is likewise effective to thin out only one of the lines. FIGS. 43A to 43C show examples of thinning out one of the lines. FIGS. 43A and 43B are exploded views of superimposed sections of recorded rules bridged over the plurality of lines, respectively. FIG. 43A refers to a case where lower 3 dots on a line to be initially recorded are thinned out, whereas FIG. 43B refers to a case where no thinning-out is effected on the next line to be recorded. Regarding a thinned-out pattern, the diagonally located 2 dots with 4 dots of vertical 2× horizontal 2 as a set are thinned out as in the case of the preceding example. With the thinned-out pattern shown in this example, two lines are superimposed as shown in FIG. 43C. As a result, the difference in density between the line-to-line superimposed section and tile remaining image portion without being superimposed can be made smaller than that in a case where no thinning-out is effected. Moreover, the same result is obtainable by thinning out upper 3 dots on a line to be recorded later.

Although a description has been given of a case where line-to-line 3 dots are superimposed in this embodiment, the present invention is not restricted to this case. Line-to-line dots, e.g., one dot and two dots, may be superimposed in conformity with a paper feed mechanism. Therefore, the line-to-line superimposed section can be made less conspicuous by thinning out the set number of dots in the superimposed section.

(Embodiment 5)

Figure 44:
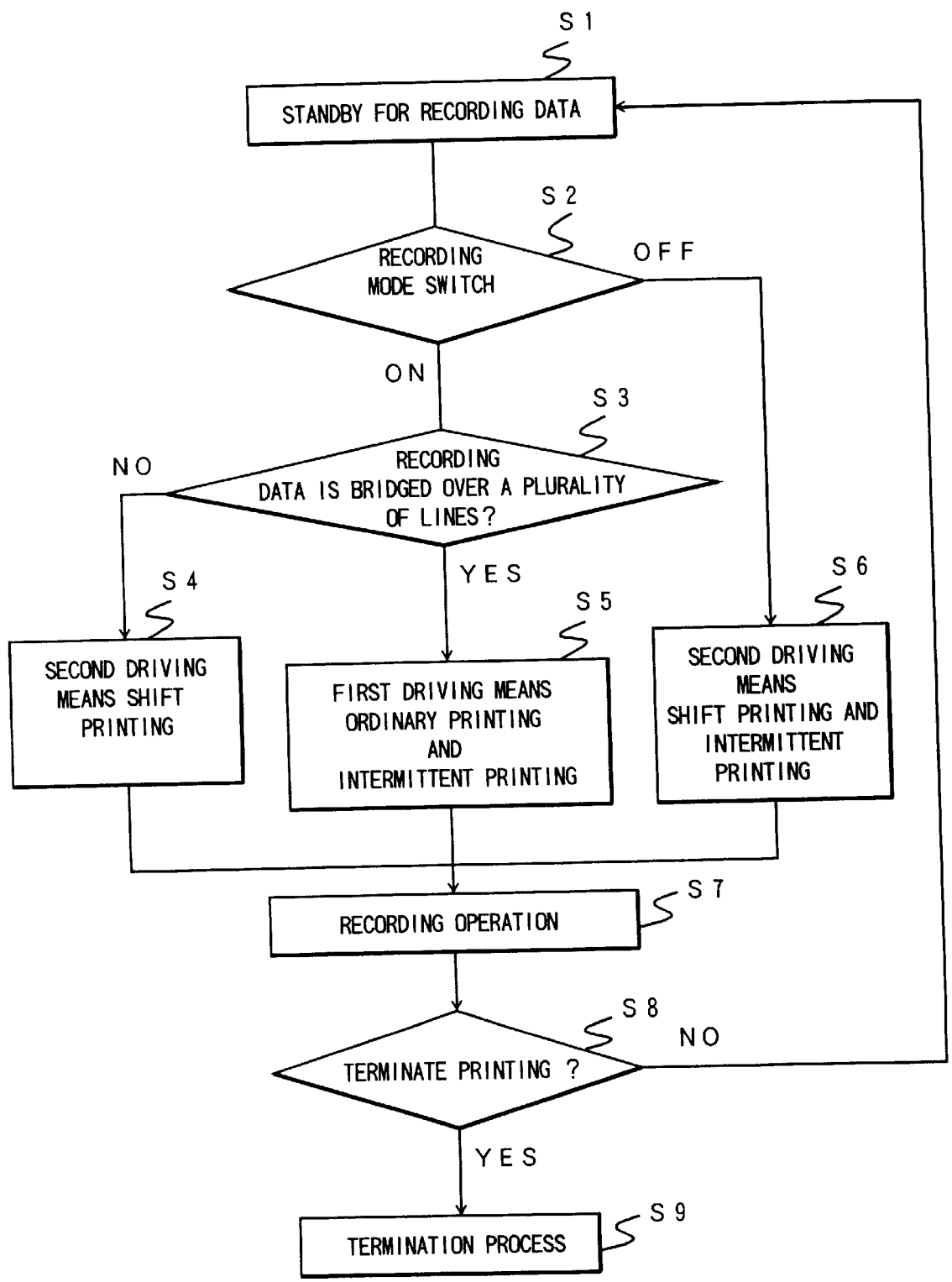
FIG. 44 is a flowchart illustrating a combination of control of driving means and intermittent printing embodying the present invention.

The intermittent printing described in the fourth embodiment is effectively applicable to both shift and ordinary printing. Moreover, an improved image may be obtained with the combination of the inventions described in the embodiments 1 and 2. A description will subsequently be given of an application of the intermittent printing described in the fourth embodiment to the recording control described in the third embodiment. FIG. 44 shows a flowchart for use in applying intermittent printing to the shift and ordinary printing control described in the embodiment 3. In this case, the intermittent printing control is added to the flowchart of FIG. 35. When the recording bridged over the plurality of lines is made at steps S5 and S6, line-to-line joints are partially thinned out for recording purposes. When no recording bridged over the plurality of lines is made, moreover, the intermittent printing is not effected at Step S4 where shift printing is used for printing. With this arrangement, the image quality deterioration of the record bridged over the plurality of lines, the difference in density between the line-to-line joint and the remaining image portion and the line-to-line difference in level are reduced. Therefore, a superior image can be obtained.

Figure 46:
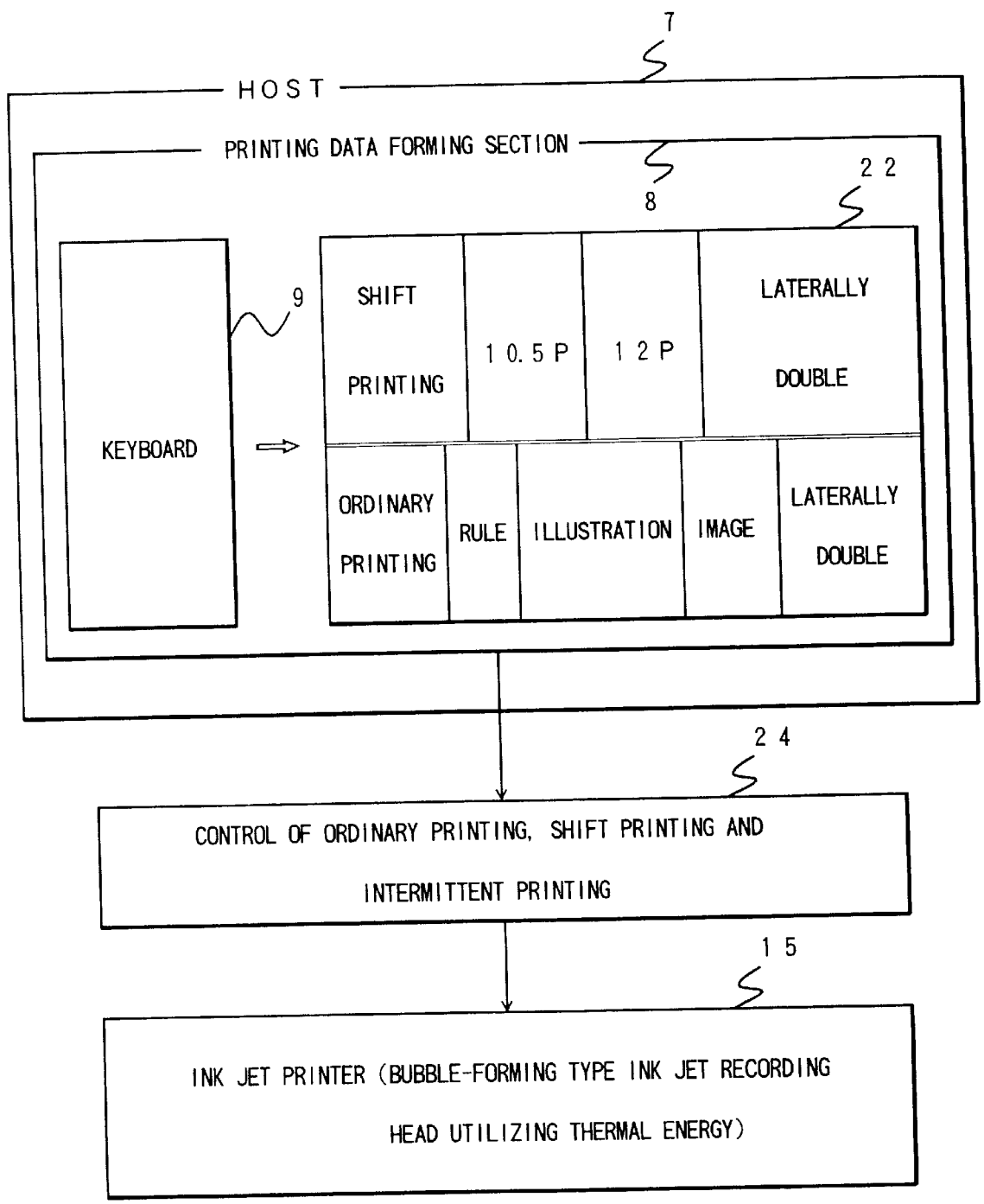
FIG. 46 is a view illustrating the selection of another driving means according to the present invention.

Although a description has been given of rule printing by way of example in the foregoing embodiments, the present invention is still effective in recording data including characters of vertical double size, illustrations and the like that are bridged over the plurality of lines. FIG. 46 is a block diagram illustrating the selection of the driving means depending on the recording pattern. Shift printing is used for recording 10.5 point and 12 point characters, those of horizontal double size and the like which are not bridged over the plurality of lines, whereas ordinary printing is used for recording patterns bridged over the plurality of lines such as rules, characters of vertical double size, pictures and the like. In FIG. 46, like reference characters designate like or corresponding component parts, wherein there is shown a control unit for controlling ordinary, shift and intermittent printing.

Figure 47:
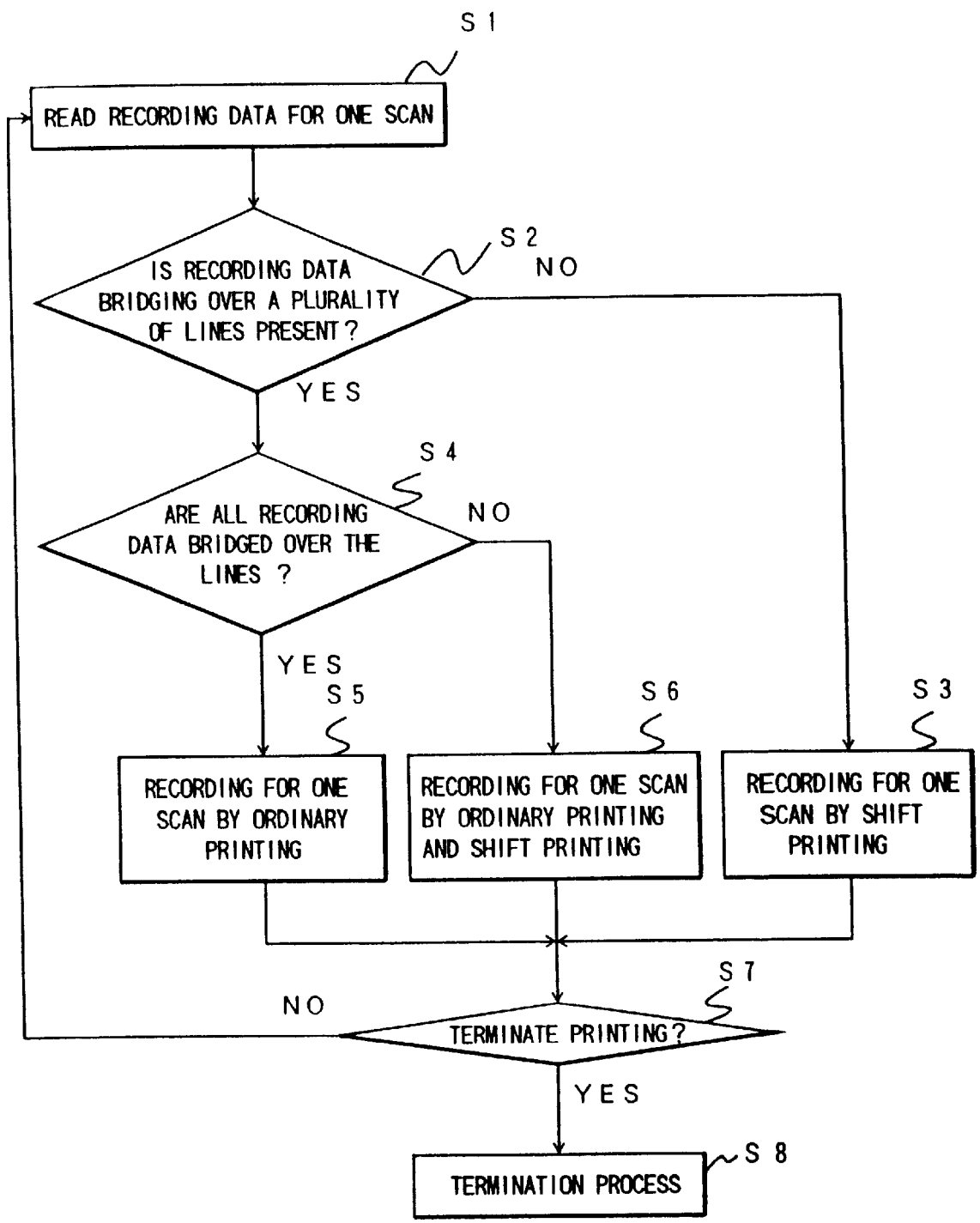
FIG. 47 is another flowchart illustrating the selection of driving means in shift printing and ordinary printing.

Although dot string data is employed to determine whether recording data is bridged over the plurality of lines in the flowcharts of FIGS. 35 in the third and fourth embodiments the present invention is not limited to those examples. As shown in FIG. 47, the driving means may be selected by reading the recording data equivalent to one scanning, for instance. The recording data of one scanning is read at Step S1 of FIG. 47 and it is then examined whether the data includes what is bridged over the plurality of lines at Step S2. If no data bridged over a plurality of lines exists, a recording of one scanning is made by shift printing at step S3. If the data bridged over a plurality of lines exists, it is determined whether all the data are bridged over the plurality of lines at Step S4. If all the data are bridged over a plurality of lines, a recording of one scanning is made by ordinary printing. When the data bridged over the plurality of lines are mixed with those which are not bridged over a plurality of lines, control of shift and ordinary printing shown in the first embodiment is performed at Step S6. The driving means can thus be controlled at high speed by checking the data of one scanning beforehand.

Figure 48:
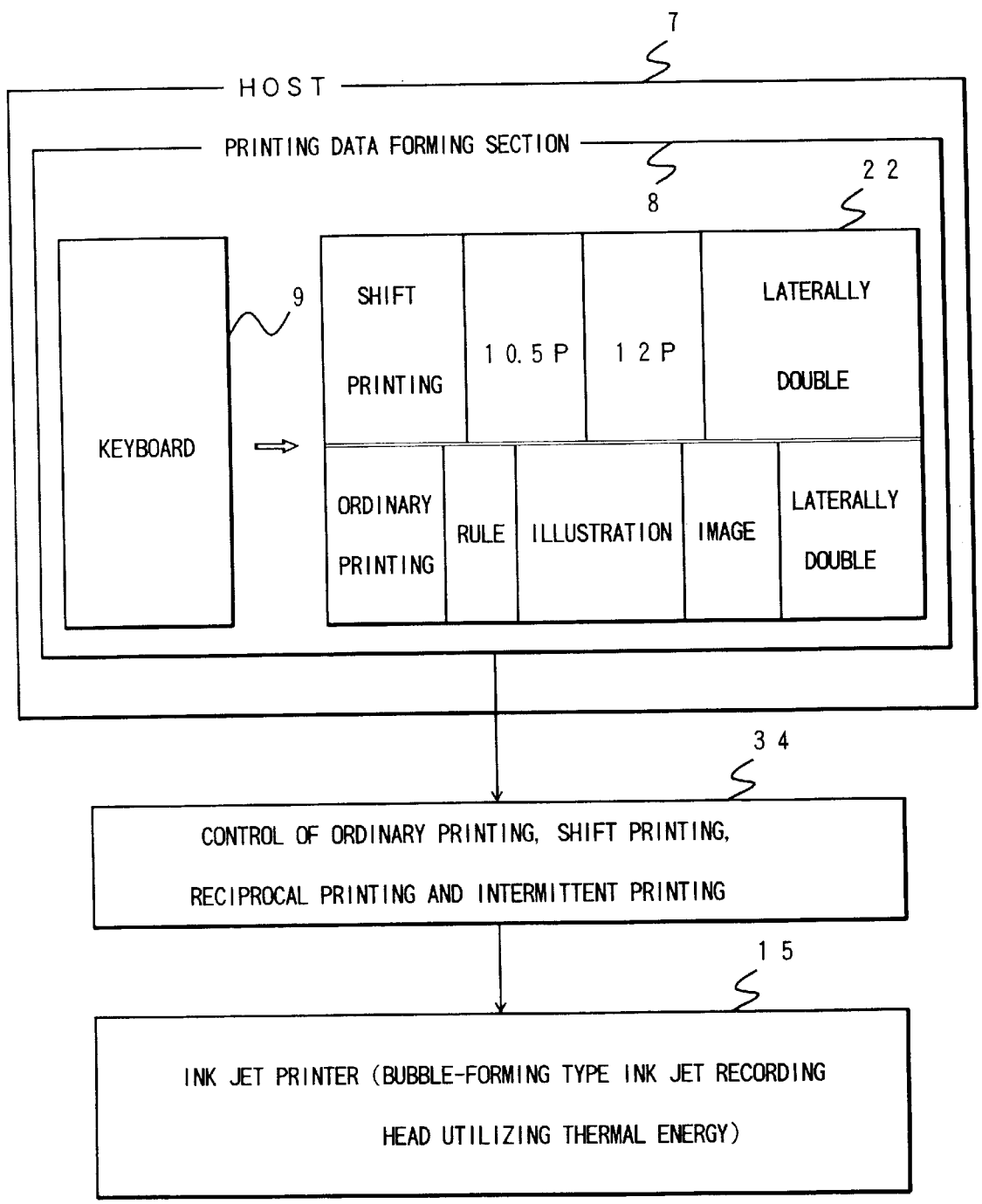
FIG. 48 is a view illustrating the selection of still another driving means according to the present invention.

Control of reciprocal printing may he added to the selection of the driving means shown in FIG. 46. FIG. 48 illustrates the selection of the driving means. As shown in FIG. 40, a control unit 3412 is used for controlling ordinary, shift, reciprocal and intermittent printing.

The present invention is particularly useful in an ink jet recording head and recording apparatus wherein thermal energy from an electrothermal transducer, loser beam or the like is used to cause a change of state of the ink to eject or discharge the ink. This is because the high density of the picture elements and the high resolution of the recording are possible.

The typical structure and the operational principle are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the producing signals. By the production, development and contraction of the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313.124.

The structure of the recording head may be as shown in U.S. Pat. Nos. 4,558,333 and 4,459,600 wherein the heating portion is disposed at a bent portion, as well as the structure of the combination of the election outlet, liquid passage and the electrothermal transducer as disclosed in the above-mentioned patents. In addition, the present invention is applicable to the structure disclosed in Japanese Laid-Open Patent Application No. 59-123670 wherein a common slit is used as the ejection outlet for plural electrothermal transducers, and to the structure disclosed in Japanese Laid-Open Patent Application No. 59-138461 wherein an opening for absorbing pressure wave of the thermal energy is formed corresponding to the ejecting portion. This is because the present invention is effective to perform the recording operation with certainty and at high efficiency irrespective of the type of the recording head.

The present invention is effectively applicable to a so-called full-line type recording head having a length corresponding to the maximum recording width. Such a recording head may comprise a single recording head and plural recording head combined to cover the maximum width.

In addition, the present invention is applicable to a serial type recording head wherein the recording head is fixed on the main assembly, to a replaceable chip type recording head which is connected electrically with the main apparatus and can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. As for such means, there are capping means for the recording head, cleaning means therefor, pressing or sucking means, preliminary heating means which may be the electrothermal transducer, an additional heating element or a combination thereof. Also, means for affecting preliminary ejection (not for the recording operation) can stabilize the recording operation.

As regards the variation of the recording head mountable, it may he a single corresponding to a single color ink, or may be plural corresponding to the plurality of ink materials having different recording color or density. The present invention is effectively applicable to an apparatus having at least one of a monochromatic mode mainly with black, a multi-color mode with different color ink materials and/or a full-color mode using the mixture of the colors, which may be an integrally formed recording unit or a combination of plural recording heads.

Furthermore, in the foregoing embodiment, the ink has been liquid. It may be, however, an ink material which is solidified below the room temperature but liquefied at the room temperature. Since the ink is controlled within the temperature not lower than 30° C. and not higher than 70° C. to stabilize the viscosity of the ink to provide the stabilized ejection in usual recording apparatus of this type, the ink may be such that it is liquid within the temperature range when the recording signal is the present invention is applicable to other types of ink. In one of them, the temperature rise due to the thermal energy is positively prevented by consuming it for the state change of the ink from the solid state to the liquid state. Another ink material is solidified when it is left, to prevent the evaporation of the ink. In either of the cases, the application of the recording signal producing thermal energy, the ink is liquefied, and the liquefied ink may be ejected. Another ink material may start to be solidified at the time when it reaches the recording material. The present invention is also applicable to such an ink material as is liquefied by the application of the thermal energy. Such an ink material may be retained as a liquid or solid material in through holes or recesses formed in a porous sheet as disclosed in Japanese Laid-Open Patent Application No. 54-56847 and Japanese Laid-Open Patent Application No. 60-71260. The sheet is faced to the electrothermal transducers. The most effective one for the ink materials described above is the film boiling system.

The ink jet recording apparatus may be used as an output terminal of an information processing apparatus such as computer or the like, as a copying apparatus combined with an image reader or the like, or as a facsimile machine having information sending and receiving functions.

While the invention has been described with reference to the structures disclosed herein, it is not confined to the details set forth and this application is intended to cover such modifications or changes as may come within the purposes of the improvements or the scope of the following claims.

What is claimed is:

1. An ink jet recording apparatus having a recording head provided with a discharge port array having a plurality of discharge ports for discharging an ink arranged linearly and in a predetermined direction and main scan means for scanning said recording head in a main scan direction which is substantially perpendicular to the predetermined direction, said apparatus driving said recording head to form an image using a recording data corresponding to each of said discharge ports, said image being formed by scanning said recording head in a main scan using said main scan means and driving a plurality of discharge means for discharging the ink corresponding to each of said discharge ports forming said discharge port array at a predetermined driving period, said apparatus comprising:

dividing means for dividing at least said plurality of discharge ports of said discharge port array into a first plurality of discharge ports and a second plurality of discharge ports, each of said first plurality of discharge ports being adjacent to a respective one of said second plurality of discharge ports;

driving means for substantially simultaneously driving, during the main scan performed by said main scan means, said discharge means which correspond to said first plurality of discharge ports and for substantially simultaneously driving said discharge means which correspond to said second plurality of discharge ports such that said discharge means corresponding to said second plurality of discharge ports are not driven simultaneously with said discharge means which correspond to said first plurality of discharge ports, but at a shorter predetermined interval than said predetermined driving period, each of said first plurality of discharge ports and said second plurality of discharge ports comprising a different group of said discharge ports of said discharge port array; and recording control means for recording dots corresponding to one of said first plurality of discharge ports, the dots recorded by said first plurality of discharge ports being recorded in succession, and said second plurality of discharge ports, the dots recorded by said second plurality of discharge ports being recorded in succession, of said discharge port array in the arranging direction and recording a recording area of said recording data by recording said recording data using said first plurality of discharge ports and said second plurality of discharge ports during the main scan by said main scanning means such that a position of a dot recorded by said second plurality of discharge ports in the main scan direction is disposed between dots recorded in succession along the main scan direction by said first plurality of discharge ports.

2. An ink jet recording apparatus according to claim 1, wherein said scanning means reciprocally scans said recording head relative to said recording medium, and said recording control means controls recording on said recording medium by causing said driving means to drive said recording head during reciprocal scanning of said scanning means, and further comprising:

timing control means for relatively advancing by a predetermined interval a timing at which said driving means starts driving said recording head, during one of an advance passage and a return passage of said reciprocal scanning.

3. An ink jet recording apparatuses according to claim 1, further comprising:

scanning means for reciprocally scanning said recording head relative to a recording medium, recording control means for making recordings on said recording medium by causing said driving means to drive said recording head during the reciprocal scanning carried out by said scanning means, and means for altering an order in which said driving means drives said first or second plurality of discharge ports during an advance passage or a return passage of said reciprocal scanning.

4. An ink jet recording apparatus according to claim 1, wherein said scanning means comprises:

primary scanning means for forming a single swath on a recording medium using said driving means while primarily scanning said recording head relative to said recording medium in a primary scanning direction, secondary scanning means for secondarily scanning said recording head relative to said recording medium in a direction different from the primary scanning direction after said single swath is formed by said primary scanning means, line-to-line bridging means for recording a plurality of lines by superimposing a predetermined number of dots as a result of said secondary scanning by said secondary scanning means by a distance shorter than a width of said single swath when recording an image bridged over a plurality of lines, and thinning-out means for driving, using said line-to-line bridging means, to form a thinned-out image to be recorded by said discharge means which correspond to the discharge ports located in portions where the superimposed recording is made, by intermittently driving said discharge means.

5. An ink jet recording apparatus according to claim 4, wherein said driving means drives said discharge means in accordance with thinning out by said thinning-out means, by means of said line-to-line bridging means, for both lines preceding and following a line on which the superimposed recording is made.

6. An ink jet recording apparatus according to claim 5, wherein said thinning-out means sets a plurality of patterns to be thinned-out in such a manner that a recorded pattern on a first line to be recorded differs from an other recorded pattern on a following line.

7. An ink jet recording apparatus according to claim 4, wherein said thinning-out means only thins out dots located in regions where the superimposed recording is made on a given said line to be recorded first, out of at least one line to be superimposed.

8. An ink jet recording apparatus according to claim 4, wherein said thinning-out means only thins out dots located in regions where the superimposed recording is made on a given said line to be recorded last, out of at least one line to be superimposed.

9. An ink jet recording apparatus according to claim 4, wherein the predetermined number of dots for causing a plurality of lines to be superimposed by said line-to-line bridging means is three.

10. An ink jet recording apparatus according to claim 1, further comprising:

block selecting means for sequentially selecting a plurality of blocks, said plurality of blocks being selected by dividing at least some of said first or said second plurality of discharge ports into a plurality of consecutive discharge ports that are drivable simultaneously, wherein said driving means drives those of said blocks sequentially selected by said block selecting means with said discharge means that correspond to said first plurality of discharge ports, and drives those of said blocks sequentially selected by said block selecting means with said discharge means that correspond to said second plurality of discharge ports, those of said second plurality of discharge ports not being driven simultaneously with said discharge means which correspond to said first plurality of discharge ports, but within a driving period with said discharge means which correspond to said second plurality of discharge ports which are adjacent to said first plurality of discharge ports.

11. An ink jet recording apparatus according to claim 10, wherein said scanning means scans the recording head in a scanning direction relative to the recording medium, and wherein said plurality of discharge ports are disposed in a direction different from the scanning direction.

12. An ink jet recording apparatus according to claim 10, wherein said plurality of discharge ports are disposed so that they are inclined at a predetermined degree in a direction perpendicular to the scanning direction.

13. An ink jet recording apparatus according to claim 1, further comprising:

block selecting means for sequentially selecting a plurality of blocks, said plurality of blocks being selected by dividing said plurality of discharge ports into a plurality of consecutive discharge ports that are derivable simultaneously, wherein said driving means drives said discharge means which correspond to said first plurality of discharge ports through said plurality of discharge ports of the blocks selected by said block selecting means, and drives said discharge means which correspond to said second plurality of discharge ports which are adjacent to said first plurality of discharge ports, through said plurality of discharge ports of the block, after having driven said discharge means which correspond to said first plurality of discharge ports.

14. An ink jet recording apparatus according to claim 13, wherein said scanning means scans the recording head in a scanning direction relative to the recording medium, and wherein said plurality of discharge ports are disposed in a direction different from the scanning direction.

15. An ink jet recording apparatus according to claim 13, wherein said plurality of discharge ports are disposed so that they are inclined at a predetermined degree in a direction perpendicular to the scanning direction.

16. An ink jet recording apparatus according to claim 1, wherein said first plurality of discharge ports and said second plurality of discharge ports are each respectively divided into a plurality of blocks each of which are selected from at least some of said first plurality or said second plurality of discharge ports which are adjacent to each other and derivable simultaneously, said apparatus further comprising:

block selecting means for selecting each block from said first plurality of discharge ports and for sequentially selecting each block from said second plurality of discharge ports within a drive period, said block selecting means causing driving of the plurality of discharge ports of each said block sequentially selected.

17. An ink jet recording apparatus according to claim 16, wherein said scanning means scans the recording head in a scanning direction relative to the recording medium, and wherein said plurality of discharge ports are disposed in a direction different from the scanning direction.

18. An ink jet recording apparatus according to claim 16, wherein said plurality of discharge ports are disposed so that they are inclined at a predetermined degree in a direction perpendicular to the scanning direction.

19. An ink jet recording apparatus according to claim 1, wherein said recording head causes a change in conditions including forming ink bubbles by means of thermal energy and bases a discharge of ink on the change of conditions.

20. An ink jet recording apparatus having a recording head provided with a discharge port array having a plurality of discharge ports for discharging an ink arranged linearly and in a predetermined direction and main scan means for scanning said recording head in a main scan direction which is substantially perpendicular to the predetermined direction, said apparatus driving said recording head to form an image using a recording data corresponding to each of said discharge ports, said image being formed by scanning said recording head in a main scan using said main scan means and driving a plurality of discharge means for discharging the ink corresponding to each of said discharge ports forming said discharge port array at a predetermined driving period, said apparatus comprising:

dividing means for dividing at least said plurality of discharge ports of said discharge port array into a first plurality of discharge ports which are not adjacent to each other and a second plurality of discharge ports which are not adjacent to each other, a respective one of said first plurality of discharge ports being adjacent to a respective one of said second plurality of discharge ports; and first driving means for substantially simultaneously driving, during the main scan performed by said main scan means, said discharge means which correspond to said first plurality of discharge ports, and second driving means for driving, during the main scan performed by said main scan means, said discharge means which correspond to said second plurality of discharge ports, not simultaneously with said discharge means which correspond to said first plurality of discharging ports, but at predetermined intervals within a shorter predetermined interval than said predetermined driving period, each of said first plurality of discharge ports and said second plurality of discharge ports comprising a different group of said discharge ports of said discharge port array; and recording control means for recording dots corresponding to one of said first plurality of discharge ports, the dots recorded by said first plurality of discharge ports being recorded in succession, and said second plurality of discharge ports, the dots recorded by said second plurality of discharge ports being recorded in succession, of said discharge port array in the arranging direction and recording a recording area of said recording data by recording said recording data using said first plurality of discharge ports and said second plurality of discharge ports during the main scan by said main scanning means such that a position of a dot recorded by said second plurality of discharge ports in the main scan direction is disposed between dots recorded in succession along the main scan direction by said first plurality of discharge ports.

21. An ink jet recording apparatus according to claim 20, wherein either of the first and second driving means may be selected.

22. An ink jet recording apparatus according to claim 20, wherein said scanning means further comprises:

primary scanning means for forming a single swath on a recording medium using said driving means while primarily scanning said recording head relative to said recording medium in a primary scanning direction, secondary scanning means for secondarily scanning said recording head relative to said recording medium in a direction different from the primary scanning direction after said single swath is formed by said primary scanning means, line-to-line bridging means for recording a plurality of lines by superimposing a predetermined number of as a result of said secondary scanning by said secondary scanning means by a distance shorter than a width of said single swath when recording an image bridged over a plurality of lines, decision means for making a decision as to whether said image is bridged over a plurality of lines, and drive selecting means for selecting either of said first and second driving means to drive said recording head in accordance with the decision made by said decision means.

23. An ink jet recording apparatus according to claim 22, further comprising:

thinning-out means for driving, using said line-to-line bridging means, to form a thinned-out image to be recorded by said discharge means which correspond to the discharge ports located in portions where the superimposed recording is made.

24. An ink jet recording apparatus according to claim 23, wherein said thinning-out means drives said discharge means while thinning out, by means of said line-to-line bridging means, both lines preceding and following a line on which the superimposed recording is made.

25. An ink recording apparatus according to claim 24, wherein said thinning-out means sets a plurality of thinned-out recording patterns in such a manner that a recorded pattern on a first line to be recorded differs from an other recorded pattern on a following line.

26. An ink jet recording apparatus according to claim 23, wherein said thinning-out means only thins out dots located in regions where the superimposed recording is made on a given said line to be recorded first, out of at least one line to be superimposed.

27. An ink jet recording apparatus according to claim 23, wherein said thinning-out means only thins out dots located in parts where the superimposed recording is made on a line to be recorded last, out of a line to be superimposed.

28. An ink jet recording apparatus according to claim 23, wherein the predetermined number of dots for causing a plurality of lines to be superimposed by said line-to-line bridging means is three.

29. An ink jet recording apparatus according to claim 22, wherein said drive selecting means selects said first driving means when said recording data is bridged over a plurality of lines and selects said second driving means when said recording data is not bridged over the plurality of lines.

30. An ink jet recording apparatus according to claim 22 further including:

a first recording mode wherein either of said first and second driving means is selected by said drive selecting means to make a recording, a second recording mode wherein said second driving means is used for recording, and mode switching means for switching between said first and second recording modes.

31. An ink jet recording apparatus according to claim 30, wherein said drive selecting means selects said first driving means when said recording data is bridged over a plurality of lines and selects said second driving means when said recording data is not bridged over a plurality of lines.

32. An ink jet recording apparatus according to claim 30, further comprising:

thinning-out means for driving, using said line-to-line bridging means, to form a thinned-out image to be recorded by said discharge means which correspond to the discharge ports located in portions where the superimposed recording is made.

33. An ink jet recording apparatus according to claim 20, further comprising:

character-font switching means for switching character fonts, said switching means having a plurality of first character fonts corresponding to said first driving means and a plurality of second character fonts which are modified forms of said first character fonts in order to conform to said second driving means, said switching means switching the character fonts in accordance with operation of said first and said second driving means.

34. An ink jet recording apparatus according to claim 20, wherein said recording head causes a change in conditions including forming ink bubbles by means of thermal energy and bases a discharge of ink on the change of conditions.

35. A method of driving a recording head provided with a discharge port array having a plurality of discharge ports for discharging an ink arranged linearly and in a predetermined direction and main scan means for scanning said recording head in a main scan direction which is substantially perpendicular to the predetermined direction, said apparatus driving said recording head to form an image using a recording data corresponding to each of said discharge ports, said image being formed by scanning said recording head in a main scan using said main scan means and driving a plurality of discharge means for discharging the ink corresponding to each of said discharge ports forming said discharge port array at a predetermined driving period, said method comprising the steps of:

dividing at least said plurality of discharge ports of said discharge port array into a first plurality of discharge ports not adjacent to each other and a second plurality of discharge ports not adjacent to each other, a respective one of said first plurality of discharge ports being adjacent to a respective one of said second plurality of discharge ports; and substantially simultaneously driving, during the main scan performed by said main scan means, said discharge means which correspond to said first plurality of discharge ports and then driving, during the main scan performed by said main scan means, said discharge means which correspond to said second plurality of discharge ports, not simultaneously with said discharge means which correspond to said first plurality of discharge ports, but within a shorter predetermined interval than said predetermined driving period, each of said first plurality of discharge ports and said second plurality of discharge ports comprising a different group of said discharge ports of said discharge port array; and recording dots corresponding to one of said first plurality of discharge ports, the dots recorded by said first plurality of discharge ports being recorded in succession, and said second plurality of discharge ports, the dots recorded by said second plurality of discharge ports being recorded in succession, of said discharge port array in the arranging direction and recording a recording area of said recording data by recording said recording data using said first plurality of discharge ports and said second plurality of discharge ports during the main scan in said scanning such that a position of a dot recorded by said second plurality of discharge ports in the main scan direction is disposed between dots recorded in succession along the main scan direction by said first plurality of discharge ports.

36. A method according to claim 35, wherein said recording head causes a change in conditions including forming ink bubbles by means of thermal energy and bases a discharge of ink on the change of conditions.

37. A method of driving a recording head provided with a discharge port array having a plurality of discharge ports for discharging an ink arranged linearly and in a predetermined direction and main scan means for scanning said recording head in a main scan direction which is substantially perpendicular to the predetermined direction, said apparatus driving said recording head to form an image using a recording data corresponding to each of said discharge ports, said image being formed by scanning said recording head in a main scan using said main scan means and driving a plurality of discharge means for discharging the ink corresponding to each of said discharge ports forming said discharge port array at a predetermined driving period, said method comprising the steps of:

sequentially selecting a first plurality of blocks of said discharge port array, having a first plurality of consecutive discharge ports, simultaneously driving, during the main scan performed by said main scan means, said discharge means which correspond to said first plurality of discharge ports, which are not adjacent to each other, in accordance with the blocks thus sequentially selected, then sequentially selecting a second plurality of blocks within said predetermined driving period in which one of said plurality of discharge means is continuously driven, and driving, during the main scan performed by said main scan means, said discharge means which correspond to a second plurality of discharge ports which are adjacent to said first plurality of discharge ports, in accordance with the second plurality of blocks thus sequentially selected, not simultaneously with said discharge means which correspond to said first plurality of discharge ports, but within a shorter predetermined interval than said predetermined driving period, each of said first plurality of discharge ports and said second plurality of discharge ports comprising a different group of said discharge ports of said discharge port array; and recording dots corresponding to one of said first plurality of discharge ports the dots recorded by said first plurality of discharge ports being recorded in succession, and said second plurality of discharge ports, the dots recorded by said second plurality of discharge ports being recorded in succession, of said discharge port array in the arranging direction and recording a recording area of said recording data by recording said recording data using said first plurality of discharge ports and said second plurality of discharge ports during the main scan in said scanning such that a position of a dot recorded by said second plurality of discharge ports in the main scan direction is disposed between dots recorded in succession along the main scan direction by said first plurality of discharge ports.

38. A method according to claim 37, wherein said recording head causes a change in conditions including forming ink bubbles by means of thermal energy and bases a discharge of ink on the change of conditions.

39. A method of driving a recording head provided with a discharge port array having a plurality of discharge ports for discharging an ink arranged linearly and in a predetermined direction and main scan means for scanning said recording head in a main scan direction which is substantially perpendicular to the predetermined direction, said apparatus driving said recording head to form an image using a recording data corresponding to each of said discharge ports, said image being formed by scanning said recording head in a main scan using said main scan means and driving a plurality of discharge means for discharging the ink corresponding to each of said discharge ports forming said discharge port array at a predetermined driving period, said method comprising the steps of:

sequentially selecting a plurality of blocks having a plurality of consecutive discharge ports, simultaneously driving, during the main scan performed by said main scan means, said discharge means which correspond to a first plurality of discharge ports of said discharge port array, and which are not adjacent to each other, in accordance with the blocks thus sequentially selected, and then driving, during the main scan performed by said main scan means, said discharge means which correspond to a second plurality of discharge ports of said discharge port array, adjacent to said first plurality of discharge ports, before a following said block is selected, not simultaneously with said discharge means which correspond to said first plurality of discharge ports, but within a shorter predetermined interval than said predetermined driving period, each of said first plurality of discharge ports and said second plurality of discharge ports comprising a different group of said discharge ports of said discharge port array; and recording dots corresponding to one of said first plurality of discharge ports, the dots recorded by said first plurality of discharge ports being recorded in succession, and said second plurality of discharge ports, the dots recorded by said second plurality of discharge ports being recorded in succession, of said discharge port array in the arranging direction and recording a recording area of said recording data by recording said recording data using said first plurality of discharge ports and said second plurality of discharge ports during the main scan in said scanning such that a position of a dot recorded by said second plurality of discharge ports in the main scan direction is disposed between dots recorded in succession along the main scan direction by said first plurality of discharge ports.

40. A method according to claim 39, wherein said recording head causes a change in conditions including forming ink bubbles by means of thermal energy and bases a discharge of ink on the change of conditions.

41. A method of driving a recording head provided with a discharge port array having a plurality of discharge ports for discharging an ink arranged linearly and in a predetermined direction and main scan means for scanning said recording head in a main scan direction which is substantially perpendicular to the predetermined direction, said apparatus driving said recording head to form an image using a recording data corresponding to each of said discharge ports, said image being formed by scanning said recording head in a main scan using said main scan means and driving a plurality of discharge means for discharging the ink corresponding to each of said discharge ports forming said discharge port array at a predetermined driving period, said method comprising the steps of:

sequentially selecting a first plurality of blocks corresponding to a group of said plurality of discharge ports of said discharge port array which are closely adjacent to each other and simultaneously derivable as a first plurality of discharge ports, said blocks in said first plurality of blocks not being adjacent to each other, simultaneously driving, during the main scan performed by said main scan means, said discharge means which correspond to said plurality of discharge ports in each of said first plurality of blocks thus selected, sequentially selecting a second plurality of blocks, corresponding to a group of said plurality of discharge ports of said discharge port array which are closely adjacent to each other and simultaneously derivable as a second plurality of discharge ports, each of said blocks in said second plurality of blocks being adjacent to a respective one of said first plurality of blocks, within a driving period during which said discharge means corresponding to said first plurality of blocks are driven, and driving, during the main scan performed by said main scan means, said discharge means which correspond to said plurality of discharge ports in each said second block thus selected, not simultaneously with said discharge means which correspond to said first plurality of discharge ports, but within a shorter predetermined interval than said predetermined driving period, each of said first plurality of discharge ports and said second plurality of discharge ports comprising a different group of said discharge ports of said discharge port array;

recording dots corresponding to one of said first plurality of discharge ports, the dots recorded by said first plurality of discharge ports being recorded in succession, and said second plurality of discharge ports, the dots recorded by said second plurality of discharge ports being recorded in succession, of said discharge port array in the arranging direction and recording a recording area of said recording data by recording said recording data using said first plurality of discharge ports and said second plurality of discharge ports during the main scan in said scanning such that a position of a dot recorded by said second plurality of discharge ports in the main scan direction is disposed between dots recorded in succession along the main scan direction by said first plurality of discharge ports.

42. A method according to claim 41, wherein said recording head causes a change in conditions including forming ink bubbles by means of thermal energy and bases a discharge of ink on the change of conditions.

43. An ink recording method for reciprocally scanning a recording head relative to a recording medium, said recording head comprising a discharge port array having a plurality of discharge ports for discharging an ink arranged linearly and in a predetermined direction and main scan means for scanning said recording head in a main scan direction which is substantially perpendicular to the predetermined direction, said apparatus driving said recording head to form an image using a recording data corresponding to each of said discharge ports, said image being formed by scanning said recording head in a main scan using said main scan means and driving a plurality of discharge means for discharging the ink corresponding to each of said discharge ports forming said discharge port array at a predetermined driving period, and a driving means for driving said discharging means, said method comprising the steps of:

substantially simultaneously driving during the main scan performed by said main scan means, said discharge means which correspond to a first plurality of said discharge ports of said discharge port array, which are not adjacent to each other, driving, during the main scan performed by said main scan means, in a driving sequence said discharge means which correspond to a second plurality of said discharge ports of said discharge port array, each of said second discharge ports being adjacent to a respective one of said first plurality of discharge ports, not simultaneously with said discharge means which correspond to said first plurality of discharge ports, but at a shorter predetermined interval than said predetermined driving period, each of said first plurality of discharge ports and said second plurality of discharge ports comprising a different group of said discharge ports of said discharge port array; and recording dots corresponding to one of said first plurality of discharge ports, the dots recorded by said first plurality of discharge ports being recorded in succession, and said second plurality of discharge ports, the dots recorded by said second plurality of discharge ports being recorded in succession, of said discharge port array in the arranging direction and recording a recording area of said recording data by recording said recording data using said first plurality of discharge ports and said second plurality of discharge ports during the main scan by said main scanning means such that a position of a dot recorded by said second plurality of discharge ports in the main scan direction is disposed between dots recorded in succession along the main scan direction by said first plurality of discharge ports; and changing the driving sequence for said driving means corresponding to said first or said second plurality of discharge ports between a forward passage and a return passage of said reciprocal scanning.

44. An ink jet recording method according to claim 43, wherein said recording causes a change in conditions including forming ink bubbles by means of thermal energy and causes a discharge of ink on the change of conditions.

45. An ink jet recording method according to claim 43, wherein the timing of starting said recording is relatively hastened in the advance or return passage of said reciprocal scanning.

46. An ink jet recording method according to claim 45, wherein said recording causes a change in conditions including forming ink bubbles by means of thermal energy and causes a discharge of ink on the change of conditions.

47. An ink jet recording apparatus having a recording head provided with a discharge port array having a plurality of discharge ports for discharging an ink arranged linearly and in a predetermined direction and main scan means for scanning said recording head in a main scan direction which is substantially perpendicular to the predetermined direction, said apparatus driving said recording head to form an image using a recording data corresponding to each of said discharge ports, said image being formed by scanning said recording head in a main scan using said main scan means and driving a plurality of discharge means for discharging the ink corresponding to each of said discharge ports forming said discharge port array at a predetermined driving period, said apparatus comprising:

dividing means for dividing at least said plurality of discharge ports of said discharge port array into a first group of a plurality of said discharge ports which are not adjacent to each other and a second group of a plurality of said discharge ports which are not adjacent to each other, each of said first group being adjacent to a respective one of said second grouped; and driving means for substantially simultaneously driving, during the main scan performed by said main scan means, said discharge means which correspond to said first group and for substantially simultaneously driving said discharge means which correspond to said second group such that said discharge means corresponding to said second plurality of discharge ports are not driven simultaneously with said discharge means which correspond to said first group, but within a shorter predetermined interval than said predetermined driving period, each of said first plurality of discharge ports and said second plurality of discharge ports comprising a different group of said discharge ports of said discharge port array; and recording control means for recording dots corresponding to one of said first plurality of discharge ports, the dots recorded by said first plurality of discharge ports being recorded in succession, and said second plurality of discharge ports, the dots recorded by said second plurality of discharge ports being recorded in succession, of said discharge port array in the arranging direction and recording a recording area of said recording data by recording said recording data using said first plurality of discharge ports and said second plurality of discharge ports during the main scan by said main scanning means such that a position of a dot recorded by said second plurality of discharge ports in the main scan direction is disposed between dots recorded in succession along the main scan direction by said first plurality of discharge ports.

48. An ink jet recording apparatus according to claim 47, wherein each of said first and said second groups has two discharge ports.

49. An ink jet recording apparatus having a recording head provided with a discharge port array having a plurality of discharge ports for discharging an ink arranged linearly and in a predetermined direction and main scan means for scanning said recording head in a main scan direction which is substantially perpendicular to the predetermined direction, said apparatus driving said recording head to form an image using a recording data corresponding to each of said discharge ports, said image being formed by scanning said recording head in a main scan using said main scan means and driving a plurality of discharge means for discharging the ink corresponding to each of said discharge ports forming said discharge port array at a predetermined driving period, said apparatus comprising:

dividing means for dividing at least said plurality of discharge ports of said discharge port array into a first plurality of discharge ports and a second plurality of discharge ports, each of said first plurality of discharge ports being adjacent to a respective one of said second plurality of discharge ports;

driving means for substantially simultaneously driving, during the main scan performed by said main scan means, said discharge means which correspond to said first plurality of discharge ports and for substantially simultaneously driving said discharge means which correspond to said second plurality of discharge ports such that said discharge means corresponding to said second plurality of discharge ports are not driven simultaneously with said discharge means which correspond to said first plurality of discharge ports, but at a shorter predetermined interval than said predetermined driving period, each of said first plurality of discharge ports and said second plurality of discharge ports comprising a different group of said discharge ports of said discharge port array;

recording control means for recording dots corresponding to one of said first plurality of discharge ports, the dots recorded by said first plurality of discharge ports being recorded in succession, and said second plurality of discharge ports, the dots recorded by said second plurality of discharge ports being recorded in succession, of said discharge port array in the arranging direction and recording a recording area of said recording data by recording said recording data using said first plurality of discharge ports and said second plurality of discharge ports during the main scan by said main scanning means such that a position of a dot recorded by said second plurality of discharge ports in the main scan direction is disposed between dots recorded in succession along the main scan direction by said first plurality of discharge ports; and timing control means for relatively advancing by a predetermined interval a timing at which said driving means starts driving said recording head, during one of an advance passage and a return passage of said reciprocal scanning.

50. An ink jet recording apparatus according to claim 49, further comprising:

means for altering an order in which said driving means drives said first or second plurality of discharge ports during the advance or return passage of said reciprocal scanning.

51. An ink jet recording apparatus having a recording head provided with a discharge port array having a plurality of discharge ports for discharging an ink arranged linearly and in a predetermined direction and main scan means for scanning said recording head in a main scan direction which is substantially perpendicular to the predetermined direction, said apparatus driving said recording head to form an image using a recording data corresponding to each of said discharge ports, said image being formed by scanning said recording head in a main scan using said main scan means and driving a plurality of discharge means for discharging the ink corresponding to each of said discharge ports forming said discharge port array at a predetermined driving period, said apparatus comprising:

dividing means for dividing at least said plurality of discharge ports of said discharge port array into a first plurality of discharge ports and a second plurality of discharge ports, each of said first plurality of discharge ports being adjacent to a respective one of said second plurality of discharge ports;

driving means for substantially simultaneously driving, during the main scan performed by said main scan means, said discharge means which correspond to said first plurality of discharge ports and for substantially simultaneously driving said discharge means which correspond to said second plurality of discharge ports such that said discharge means corresponding to said second plurality of discharge portions are not driven simultaneously with said discharge means which correspond to said first plurality of discharge ports, but at a shorter predetermined interval than said predetermined driving period, each of said first plurality of discharge ports and said second plurality of discharge ports comprising a different group of said discharge ports of said discharge port array;

recording control means for recording dots corresponding to one of said first plurality of discharge ports, the dots recorded by said first plurality of discharge ports being recorded in succession, and said second plurality of discharge ports, the dots recorded by said second plurality of discharge ports being recorded in succession, of said discharge port array in the arranging direction and recording a recording area of said recording data by recording said recording data using said first plurality of discharge ports and said second plurality of discharge ports during the main scan by said main scanning means such that a position of a dot recorded by said second plurality of discharge ports in the main scan direction is disposed between dots recorded in succession along the main scan direction by said first plurality of discharge ports; and means for altering an order in which said driving means drives said first or said second plurality of discharge ports during an advance or a return passage of said reciprocal scanning.

52. An ink jet recording apparatus having a recording head provided with a discharge port array having a plurality of discharge ports for discharging an ink arranged linearly and in a predetermined direction and main scan means for scanning said recording head in a main scan direction which is substantially perpendicular to the predetermined direction, said apparatus driving said recording head to form an image using a recording data corresponding to each of said discharge ports, said image being formed by scanning said recording head in a main scan using said main scan means and driving a plurality of discharge means for discharging the ink corresponding to each of said discharge ports forming said discharge port array at a predetermined driving period, said apparatus comprising:

dividing means for dividing at least said plurality of discharge ports of said discharge port array into a first plurality of discharge ports and a second plurality of discharge ports, each of said first plurality of discharge ports being adjacent to a respective one of said second plurality of discharge ports;

driving means for substantially simultaneously driving, during the main scan performed by said main scan means, those of said discharge means which correspond to said first plurality of discharge ports and for substantially simultaneously driving those of said discharge means which correspond to said second plurality of discharge ports such that said discharge means corresponding to said second plurality of discharge ports are not driven simultaneously with said discharge means which correspond to said first plurality of discharge ports, but at a shorter predetermined interval than said predetermined driving period, each of said first plurality of discharge ports and said second plurality of discharge ports comprising a different group of said discharge ports of said discharge port array; and recording control means for recording dots corresponding to one of said first plurality of discharge ports, the dots recorded by said first plurality of discharge ports being recorded in succession, and said second plurality of discharge ports, the dots recorded by said second plurality of discharge ports being recorded in succession, of said discharge port array in the arranging direction and recording a recording area of said recording data by recording said recording data using said first plurality of discharge ports and said second plurality of discharge ports during the main scan by said main scanning means such that a position of a dot recorded by said second plurality of discharge ports in the main scan direction is disposed between dots recorded in succession along the main scan direction by said first plurality of discharge ports; and block selecting means for sequentially selecting a plurality of blocks, said plurality of blocks being selected by dividing at least some of said first plurality or said second plurality of discharge ports into a plurality of consecutive discharge ports that are derivable simultaneously, wherein said driving means drives those of said blocks sequentially selected by said block selecting means with said discharge means that correspond to said first plurality of discharge ports, and drives those of said blocks sequentially selected by said block selecting means with said discharge means that correspond to said second plurality of discharge ports, those of said second plurality of discharge ports not being driven simultaneously with said discharge means which correspond to said first plurality of discharge ports, but within a driving period with said discharge means which correspond to said second plurality of discharge ports which are adjacent to said first plurality of discharge ports.

53. An ink jet recording apparatus having a recording head provided with a discharge port array having a plurality of discharge ports for discharging an ink arranged linearly and in a predetermined direction and main scan means for scanning said recording head in a main scan direction which is substantially perpendicular to the predetermined direction, said apparatus driving said recording head to form an image using a recording data corresponding to each of said discharge ports, said image being formed by scanning said recording head in a main scan using said main scan means and driving a plurality of discharge means for discharging the ink corresponding to each of said discharge ports forming said discharge port array at a predetermined driving period, said apparatus comprising:

dividing means for dividing at least said plurality of discharge ports of said discharge port array into a first plurality of discharge ports and a second plurality of discharge ports, each of said first plurality of discharge ports being adjacent to a respective one of said second plurality of discharge ports;

driving means for substantially simultaneously driving, during the main scan performed by said main scan means, said discharge means which correspond to said first plurality of discharge ports and for substantially simultaneously driving said discharge means which correspond to said second plurality of discharge ports such that said discharge means corresponding to said second plurality of discharge ports are not driven simultaneously with said discharge means which correspond to said first plurality of discharge ports, but at a shorter predetermined interval than said predetermined driving period, each of said first plurality of discharge ports and said second plurality of discharge ports comprising a different group of said discharge ports of said discharge port array; and recording control means for recording dots corresponding to one of said first plurality of discharge ports, the dots recorded by said first plurality of discharge ports being recorded in succession, and said second plurality of discharge ports, the dots recorded by said second plurality of discharge ports being recorded in succession, of said discharge port array in the arranging direction and recording a recording area of said recording data by recording said recording data using said first plurality of discharge ports and said second plurality of discharge ports during the main scan by said main scanning means such that a position of a dot recorded by said second plurality of discharge ports in the main scan direction is disposed between dots recorded continuously along the main scan direction by said first plurality of discharge ports; and block selecting means for sequentially selecting a plurality of blocks, said plurality of blocks being selected by dividing at least some of said first plurality or said second plurality of discharge ports into a plurality of consecutive discharge ports that are derivable simultaneously, wherein said driving means drives those of said discharge means which correspond to said first plurality of discharge ports through said plurality of discharge ports of the blocks selected by said block selecting means, and drives those of said discharge means that correspond to said second plurality of discharge ports which are adjacent to said first plurality of discharge ports, through said plurality of discharge ports of the block, after having driven said discharge means which correspond to said first plurality of discharge ports.

54. An ink jet recording apparatus having a recording head provided with a discharge port array having a plurality of discharge ports for discharging an ink arranged linearly and in a predetermined direction and main scan means for scanning said recording head in a main scan direction which is substantially perpendicular to the predetermined direction, said apparatus driving said recording head to form an image using a recording data corresponding to each of said discharge ports, said image being formed by scanning said recording head in a main scan using said main scan means and driving a plurality of discharge means for discharging the ink corresponding to each of said discharge ports forming said discharge port array at a predetermined driving period, said apparatus comprising:

dividing means for dividing at least said plurality of discharge ports of said discharge port array into a first plurality of discharge ports and a second plurality of discharge ports, each of said first plurality of discharge ports being adjacent to a respective one of said second plurality of discharge ports;

driving means for substantially simultaneously driving, during the main scan performed by said main scan means, said discharge means which correspond to said first plurality of discharge ports and for substantially simultaneously driving said discharge means which correspond to said second plurality of discharge ports such that said discharge means corresponding to said second plurality of discharge ports are not driven simultaneously with said discharge means which correspond to said first plurality of discharge ports, but at a shorter predetermined interval than said predetermined driving period, each of said first plurality of discharge ports and said second plurality of discharge ports comprising a different group of said discharge ports of said discharge port array; and recording control means for recording dots corresponding to one of said first plurality of discharge ports, the dots recorded by said first plurality of discharge ports being recorded in succession, and said second plurality of discharge ports, the dots recorded by said second plurality of discharge ports being recorded in succession, of said discharge port array in the arranging direction and recording a recording area of said recording data by recording said recording data using said first plurality of discharge ports and said second plurality of discharge ports during the main scan by said main scanning means such that a position of a dot recorded by said second plurality of discharge ports in the main scan direction is disposed between dots recorded in succession along the main scan direction by said first plurality of discharge ports; and block selecting means for selecting each block from said first plurality of discharge ports and for sequentially selecting each block from said second plurality of discharge ports within a drive period, said block selecting means making derivable the plurality of discharge ports of each said block sequentially selected, wherein said first plurality of discharge ports and said second plurality of discharge ports are each respectively divided into a plurality of blocks each of which are selected from at least some of said first plurality or said second plurality of discharge ports which are adjacent to each other and derivable simultaneously.

55. An ink jet recording apparatus having a recording head provided with a discharge port array having a plurality of discharge ports for discharging an ink arranged linearly and in a predetermined direction and main scan means for scanning said recording head in a main scan direction which is substantially perpendicular to the predetermined direction, said apparatus driving said recording head to form an image using a recording data corresponding to each of said discharge ports, said image being formed by scanning said recording head in a main scan using said main scan means and driving a plurality of discharge means for discharging the ink corresponding to each of said discharge ports forming said discharge port array at a predetermined driving period, said apparatus comprising:

dividing means for dividing at least said plurality of discharge ports of said discharge port array into a first plurality of discharge ports which are not adjacent to each other and a second plurality of discharge ports which are not adjacent to each other, each of said first plurality of discharge ports being adjacent to a respective one of said second plurality of discharge ports;

first driving means for substantially simultaneously driving, during the main scan performed by said main scan means, said discharge means which correspond to said first plurality of discharge ports;

second driving means for substantially simultaneously driving, during the main scan performed by said main scan means, said discharge means which correspond to said second plurality of discharge ports such that said discharge means corresponding to said second plurality of discharge ports are not driven simultaneously with said discharge means which correspond to said first plurality of discharging ports, but at predetermined intervals within a shorter predetermined interval than said predetermined driving period, each of said first plurality of discharge ports and said second plurality of discharge ports comprising a different group of said discharge ports of said discharge port array;

recording control means for recording dots corresponding to one of said first plurality of discharge ports, the dots recorded by said first plurality of discharge ports being recorded in succession, and said second plurality of discharge ports, the dots recorded by said second plurality of discharge ports being recorded in succession, of said discharge port array in the arranging direction and recording a recording area of said recording data by recording said recording data using said first plurality of discharge ports and said second plurality of discharge ports during the main scan by said main scanning means such that a position of a dot recorded by said second plurality of discharge ports in the main scan direction is disposed between dots recorded in succession along the main scan direction by said first plurality of discharge ports;

line-to-line bridging means for recording a plurality of lines by superimposing a predetermined number of dots as a result of said secondary scanning by said secondary scanning means by a distance shorter than a width of said single swath when recording an image bridged over a plurality of lines;

decision means for making a decision as to whether said image is bridged over a plurality of lines; and drive selecting means for selecting either of said first and said second driving means to drive said recording head in accordance with the decision made by said decision means.

* * * * *